(12) United States Patent    (10) Patent No.:    US 12,572,003 B2

Inomoto    (45) Date of Patent:    Mar. 10, 2026

(54) ZOOM LENS AND IMAGE PICKUP APPARATUS

(71) Applicant: CANON KABUSHIKI KAISHA, Tokyo (JP)

(72) Inventor: Yu Inomoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 18/515,059

(22) Filed: Nov. 20, 2023

(65) Prior Publication Data

US 2024/0176119 A1    May 30, 2024

(30) Foreign Application Priority Data

Nov. 24, 2022    (JP) .................................. 2022-187566

(51) Int. Cl.
G02B 15/173    (2006.01)

(52) U.S. Cl.
CPC ................................... G02B 15/173 (2013.01)

(58) Field of Classification Search
CPC .......................... G02B 15/173; G02B 15/1461
See application file for complete search history.

(56)    References Cited

U.S. PATENT DOCUMENTS

2021/0048654 A1*    2/2021    Ogawa ........... G02B 15/145125
2022/0236543 A1*    7/2022    Ikeda ............. G02B 15/145127

FOREIGN PATENT DOCUMENTS

JP    2016095448 A    5/2016
JP    2021076781 A    5/2021

* cited by examiner

*Primary Examiner* — Mariam Qureshi

(74) *Attorney, Agent, or Firm* — Canon U.S.A., Inc. IP Division

(57)    ABSTRACT

A zoom lens includes, in order from an object side to an image side, a first lens unit with positive refractive power which does not move in zooming, and a plurality of lens units which moves in zooming. Each of intervals between the respective adjacent lens units varies in zooming. The plurality of lens units includes a variable magnification unit consisting of one or a plurality of lens units which monotonously moves toward the image side in zooming from a wide-angle end to a telephoto end. The variable magnification unit includes at least one positive lens and at least one negative lens and has negative refractive power at the wide-angle end. The zoom lens satisfies a specific inequality regarding average values of partial dispersion ratios in the variable magnification unit. The variable magnification unit includes a positive lens satisfying specific inequalities regarding an Abbe number and a partial dispersion ratio.

20 Claims, 25 Drawing Sheets

FIG.3

-0.400        0.400
SPHERICAL
ABERRATION

-0.400        0.400
ASTIGMATISM

-5.000        5.000
DISTORTION (%)

-0.100        0.100
CHROMATIC
ABERRATION

ZOOM LENS AND IMAGE PICKUP APPARATUS

BACKGROUND

Technical Field

Aspects of the embodiments generally relate to a zoom lens and an image pickup apparatus.

Description of the Related Art

As zoom lenses for image pickup apparatuses, a zoom lens having a high zoom ratio and having a small size is required. Moreover, as zoom lenses for monitoring cameras, a zoom lens which has a high optical performance regardless of day or night is required. Monitoring cameras use visible light for daylight image capturing and are able to use near-infrared light for night-time image capturing. Image capturing using near-infrared light is less affected by diffu-sion in dense fog than image capturing using visible light. Therefore, it is favorable that zoom lenses for monitoring cameras are subjected to aberration correction with respect to light in a wide wavelength range from visible light to near-infrared light. Additionally, to enable monitoring in a spatially broad range, zoom lenses for monitoring cameras are required to have a high zoom ratio and a fast lens speed.

Japanese Patent Application Laid-Open No. 2016-95448 discusses a zoom lens having a high zoom ratio including, in order from an object side to an image side, first to fourth lens units with positive, negative, negative, and positive refractive powers, respectively, each of intervals between the respective adjacent lens units varying in zooming. More-over, Japanese Patent Application Laid-Open No. 2021-76781 discusses a zoom lens having a high zoom ratio including, in order from an object side to an image side, first to fourth lens units with positive, negative, positive, and positive refractive powers, respectively, each of intervals between the respective adjacent lens units varying in zoom-ing.

Short wavelength infrared (SWIR) light having wave-lengths of 1,000 nanometers (nm) to 2,500 nm is highly useful for monitoring cameras. Therefore, there is an increasing need for a zoom lens with chromatic aberration corrected with respect to light ranging from a visible range to an SWIR range. Performing aberration correction for such a wide wavelength band may lead to an increase in size of the zoom lens.

SUMMARY

According to an aspect of the embodiments, a zoom lens includes, in order from an object side to an image side, a first lens unit with positive refractive power which does not move for zooming, and a plurality of lens units which moves in zooming, each of intervals between the respective adja-cent lens units varying in zooming, wherein the plurality of lens units includes a variable magnification unit consisting of one or a plurality of lens units which monotonously moves toward the image side in zooming from a wide-angle end to a telephoto end, wherein the variable magnification unit includes at least one positive lens and at least one negative lens and has negative refractive power at the wide-angle end, wherein the zoom lens satisfies the follow-ing inequality:

$$-0.040 < \theta CtVpav - \theta CtVnav < 0.040,$$

where $\theta CtVpav$ denotes an average value of partial disper-sion ratios regarding C-line and t-line of all of the positive lenses included in the variable magnification unit and $\theta CtVnav$ denotes an average value of partial dispersion ratios regarding C-line and t-line of all of the negative lenses included in the variable magnification unit, and wherein the variable magnification unit includes a positive lens satisfy-ing the following inequalities:

$$0.5466 < \theta CtVpx - 0.004693 \times vdVpx < 0.6466, \text{ and}$$

$$24 < vdVpx < 55,$$

where $vdVpx$ denotes an Abbe number regarding d-line of the positive lens included in the variable magnification unit and $\theta CtVpx$ denotes a partial dispersion ratio regarding C-line and t-line of the positive lens included in the variable magnification unit.

Further features of the disclosure will become apparent from the following description of exemplary embodiments with reference to the attached drawings.

BRIEF DESCRIPTION OF THE DRAWINGS

FIG. 3 is a sectional view of a zoom lens in a state of being set at focusing on infinite distance and at the wide-angle end according to an Example 2.

DESCRIPTION OF THE EMBODIMENTS

Figure 1:
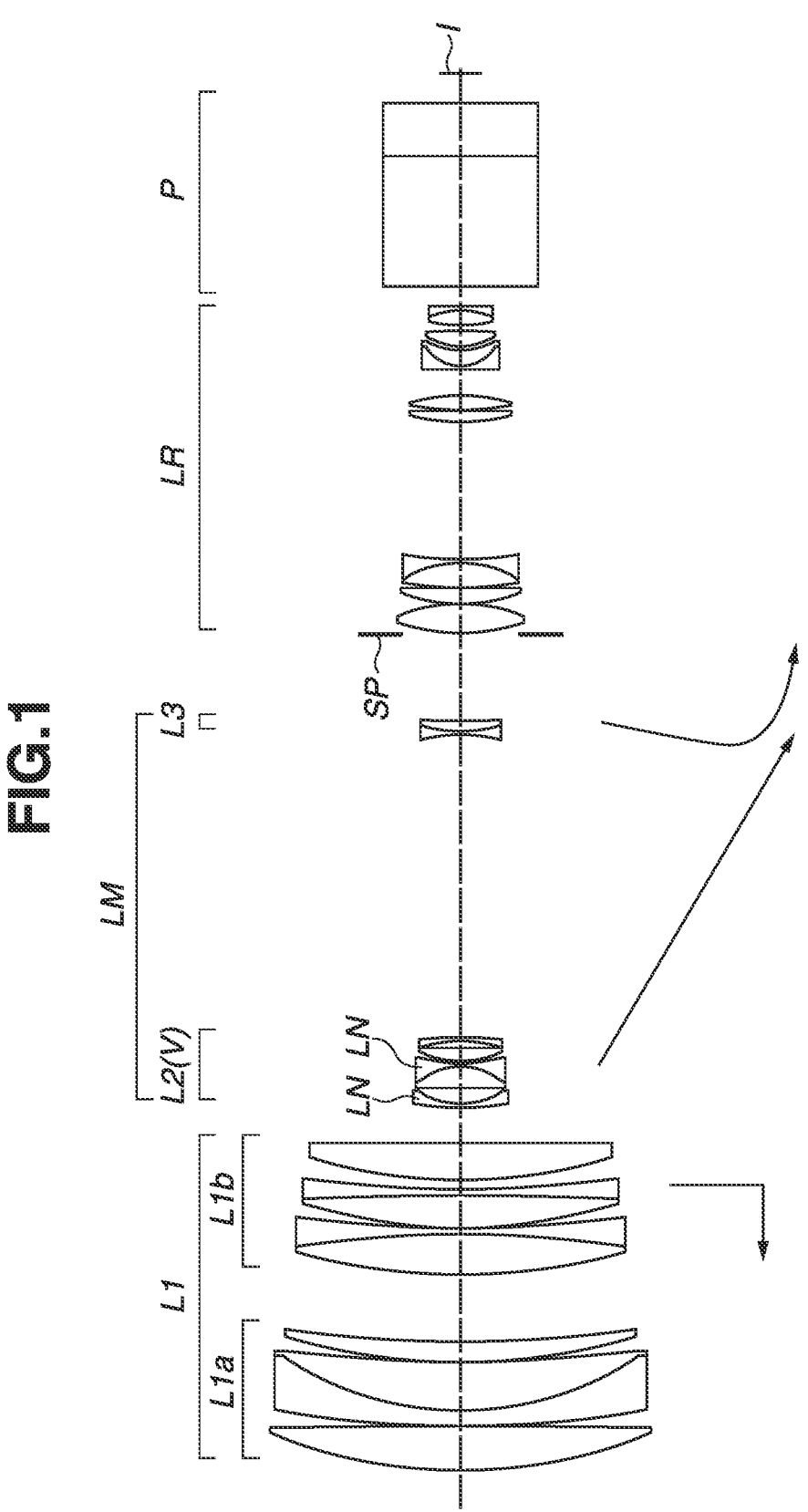
FIG. 1 is a sectional view of a zoom lens in a state of being set at focusing on infinite distance and at the wide-angle end according to an Example 1.

Various exemplary embodiments, features, and aspects of the disclosure will be described in detail below with reference to the drawings. Furthermore, throughout all of the figures used for describing exemplary embodiments, in principle (unless otherwise stated), for example, the same members are assigned the respective same reference characters, and any duplicate description thereof is omitted.

EXEMPLARY EMBODIMENT

Figure 2A:
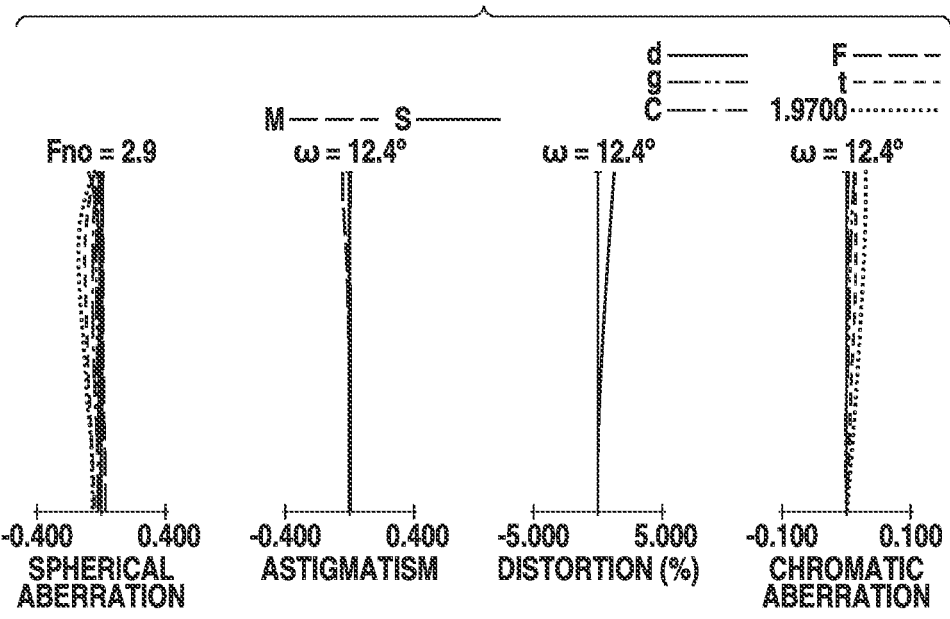
FIGS. 2A, 2B, and 2C are diagrams illustrating aberra-tions of the zoom lens in a state of being set at focusing on infinite distance and at the wide-angle end, at the middle point, and at the telephoto end, respectively, according to the Example 1.
Figure 2B:
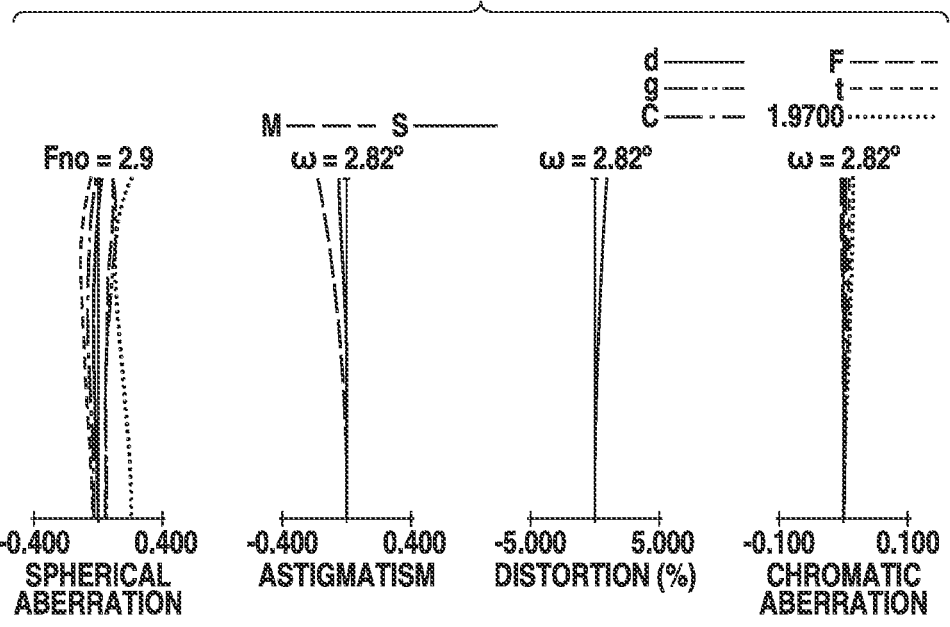
Figure 2C:
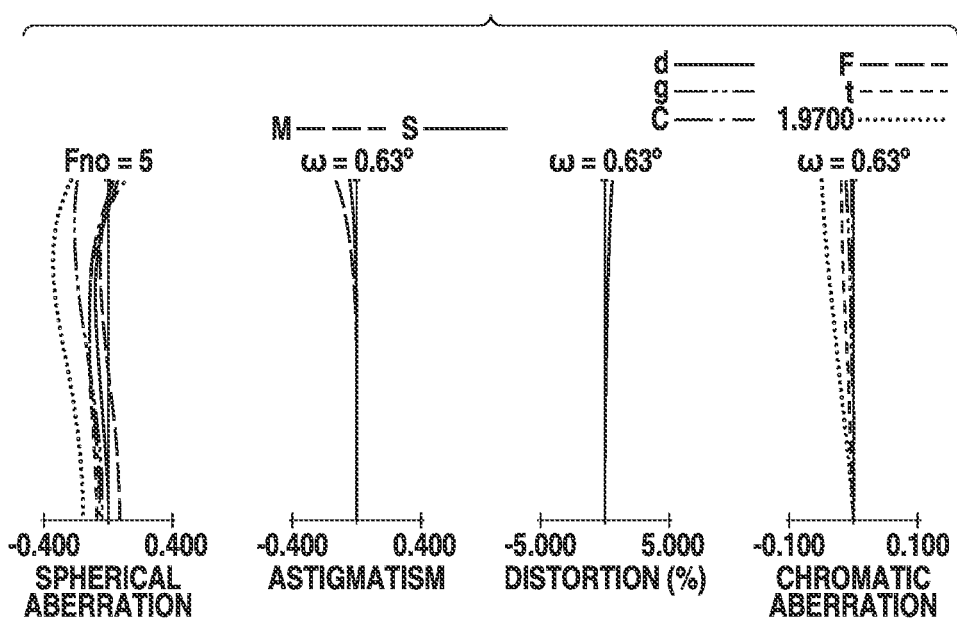

FIG. 1 is a sectional view of a zoom lens in a state of being set at focusing on infinite distance and at the wide-angle end according to an Example 1 described below. The Example 1 corresponds to a numerical example 1 described below. FIGS. 2A, 2B, and 2C are diagrams illustrating aberrations of the zoom lens in a state of being set at focusing on infinite distance and at the wide-angle end, at the middle point, and at the telephoto end, respectively, in the numerical example 1 (with regard to the respective focal lengths, refer to the numerical example 1). In the figures illustrating aberrations, a solid line, a dashed-two dotted line, a dashed-dotted line, a long dashed line, a short dashed line, and a dotted line in spherical aberration correspond to d-line, g-line, C-line, F-line, t-line, and a wavelength of 1970.0 nanometers (nm) (1.9700 micrometers (μm)), respectively. Furthermore, the wavelength of d-line is 587.6 nm), the wavelength of g-line is 435.8 nm, the wavelength of C-line is 656.3 nm, the wavelength of F-line is 486.1 nm, and the wavelength of t-line is 1014.0 nm. A dashed line and a solid line in astigmatism correspond to a meridional image plane and a sagittal image plane, respectively. Distortion corresponds to d-line. A solid line, a dashed-two dotted line, a dashed-dotted line, and a dashed line in lateral chromatic aberration (chromatic aberration of magnification) correspond to d-line, g-line, C-line, and F-line, respectively. "Fno" denotes F-number, and "@" denotes a half angle of view. Spherical aberration is illustrated with a full scale in the horizontal axis set to +0.400 millimeters (mm). Astigmatism is illustrated with a full scale in the horizontal axis set to +0.400 mm. Distortion is illustrated with a full scale in the horizontal axis set to +5.000%. Lateral chromatic aberration is illustrated with a full scale in the horizontal axis set to +0.100 mm.

Referring to FIG. 1, components of the zoom lens are described in order from an object side to an image side. The zoom lens includes a first lens unit L1 with positive refractive power, which does not move for zooming (variation of magnification). The first lens unit L1 includes a first lens subunit L1a, which does not move for focusing (adjustment of focus). The first lens unit L1 further includes a second lens subunit L1b, which moves toward the object side for focusing from an infinite-distance object to a minimum-distance object.

The zoom lens further includes a plurality of lens units LM, which moves in zooming. The plurality of lens units LM includes a second lens unit L2(V) (a variable magnification unit V) with negative refractive power, which moves in zooming, and a third lens unit L3 with negative refractive power, which moves in zooming.

The second lens unit L2(V) moves along the optical axis monotonously toward the image side for zooming from the wide-angle end to the telephoto end.

The third lens unit L3 moves along the optical axis non-monotonously as illustrated in FIG. 1 for zooming from the wide-angle end to the telephoto end. The zoom lens further includes an aperture stop SP, which does not move in zooming. The zoom lens further includes a rear lens unit (relay lens unit) LR with positive refractive power, which does not move for zooming. An image plane I is a plane on which the zoom lens forms an image, which is picked up (captured) by an image sensor. In the zoom lens, each of intervals between the respective adjacent lens units varies in zooming. Furthermore, the aperture stop SP can be arranged between the plurality of lens units LM and the rear lens unit LR (on the image side of the plurality of lens units LM) or between the last lens unit and the last but one lens unit included in the plurality of lens units LM.

In FIG. 1, arrows in the plurality of lens units LM represent movement loci of the respective lens units in zooming from the wide-angle end to the telephoto end, and an L-shaped arrow in the first lens unit L1 represents a movement locus of a lens subunit for focusing from the infinite-distance end to the minimum-distance end (these also applying to sectional views of the other zoom lenses).

A zoom lens according to the present exemplary embodiment includes, in order from an object side to an image side, a first lens unit with positive refractive power which does not move for zooming, and a plurality of lens units which moves in zooming, each of intervals between the respective adjacent lens units varying in zooming. The plurality of lens units includes a variable magnification unit consisting of one or a plurality of lens units which monotonously moves toward the image side in zooming from a wide-angle end to a telephoto end. The variable magnification unit includes at least one positive lens and at least one negative lens and has negative refractive power at the wide-angle end. The zoom lens satisfies the following inequality:

$$-0.040 < \theta CtVpav - \theta CtVnav < 0.040 \qquad (1),$$

where $\theta CtVpav$ denotes an average value of partial dispersion ratios regarding C-line and t-line of all of the positive lenses included in the variable magnification unit and $\theta CtVnav$ denotes an average value of partial dispersion ratios regarding C-line and t-line of all of the negative lenses included in the variable magnification unit. The variable magnification unit includes a positive lens satisfying the following inequalities:

$$0.5466 < \theta CtVpx - 0.004693 \times vdVpx < 0.6466 \qquad (2), \text{ and}$$

$$24 < vdVpx < 55 \qquad (3),$$

5 where vdVpx denotes an Abbe number regarding d-line of the positive lens included in the variable magnification unit and $\theta$CtVpx denotes a partial dispersion ratio regarding C-line and t-line of the positive lens included in the variable magnification unit.

According to the present exemplary embodiment, it is possible to provide a zoom lens in respect of a high optical performance relative to light in a range from visible light to short wavelength infrared (SWIR) light and a reduction in size thereof.

In the Example 1, the second lens unit L2 with negative refractive power is the variable magnification unit V, the variable magnification unit V includes two positive lenses and three negative lenses, and the optical characteristics of the two positive lenses and three negative lenses satisfy the inequality (1). Moreover, the optical characteristic of each of the two positive lenses satisfies the inequalities (2) and (3).

Here, the Abbe number vd and the partial dispersion ratio $\theta$Ct are respectively expressed as follows:

$$vd=(nd-1)/(nF-nC), \text{ and}$$

$$\theta Ct=(nC-nt)/(nF-nC),$$

where nF, nC, nd, and nt denote refractive indices of a material regarding F-line (486.1 nm), C-line (656.3 nm), d-line (wavelength of 587.6 nm), and t-line (1014.0 nm), respectively. Furthermore, the refractive index nd regarding d-line, the Abbe number vd regarding d-line, and the partial dispersion ratio $\theta$Ct regarding C-line and t-line are also referred to simply as "refractive index nd", "Abbe number vd", and "partial dispersion ratio $\theta$Ct".

Here, technical significances of the inequalities (1) to (3) are described. Furthermore, the "inequality" is also referred to as "inequality expression", "conditional expression", or "condition".

The inequalities (1) to (3) signify conditions for attaining a zoom lens in respect of a high optical performance relative to light in a range from visible light to SWIR light and a reduction in size thereof.

If the condition of the inequality (1) is not satisfied with regard to the upper limit value thereof, this leads to at least one of the selection of a material with an excessively high partial dispersion ratio for the material of a positive lens and the selection of a material with an excessively low partial dispersion ratio for the material of a negative lens. As a result, the variation of secondary chromatic aberration in zooming becomes excessively large (over-corrected). If the condition of the inequality (1) is not satisfied with regard to the lower limit value thereof, this leads to at least one of the selection of a material with an excessively low partial dispersion ratio for the material of a positive lens and the selection of a material with an excessively high partial dispersion ratio for the material of a negative lens. As a result, the variation of secondary chromatic aberration in zooming becomes excessively large (under-corrected).

If the condition of the inequality (2) is not satisfied with regard to the upper limit value thereof, this leads to the selection of a material with an excessively high partial dispersion ratio for the material of a positive lens, so that the variation of secondary chromatic aberration in zooming becomes excessively large (over-corrected). If the condition of the inequality (2) is not satisfied with regard to the lower limit value thereof, this leads to the selection of a material with an excessively low partial dispersion ratio for the material of a positive lens, so that the variation of secondary chromatic aberration in zooming becomes excessively large (under-corrected).

6

If the condition of the inequality (3) is not satisfied with regard to the upper limit value thereof, this leads to the selection of a material with an excessively low partial dispersion ratio for the material of a positive lens, so that the variation of chromatic aberration in zooming becomes excessively large (under-corrected). If the condition of the inequality (3) is not satisfied with regard to the lower limit value thereof, this leads to the selection of a material with an excessively high partial dispersion ratio for the material of a positive lens, so that the variation of chromatic aberration in zooming becomes excessively large (over-corrected).

The material satisfying the inequality (2) and the inequality (3) includes, for example, S-NBM51, manufactured by OHARA INC., and E-ADF10 and E-ADF50, manufactured by HOYA CORPORATION.

Moreover, it is favorable that each positive lens included in the variable magnification unit V satisfies the following inequality:

$$-5.0<fVpx/fV<-0.4 \tag{4},$$

where fVpx denotes the focal length of the x-th positive lens included in the variable magnification unit V and fV denotes the focal length (composite focal length) at the wide-angle end of the variable magnification unit V.

If the condition of the inequality (4) is not satisfied with regard to the upper limit value thereof, since the refractive power of the positive lens becomes excessively strong, the variation of aberration in zooming becomes excessively large. If the condition of the inequality (4) is not satisfied with regard to the lower limit value thereof, since the refractive power of the positive lens becomes excessively weak, the variation of chromatic aberration in zooming becomes excessively large.

Moreover, it is favorable that each positive lens included in the variable magnification unit V satisfies the following inequality:

$$0.5200<\theta CtVpx-0.005575\times vdVpx<0.5800 \tag{5}.$$

If the condition of the inequality (5) is not satisfied with regard to the upper limit value thereof, this leads to at least one of the selection of a material with an excessively high partial dispersion ratio for the material of a positive lens and the selection of a material with an excessively low partial dispersion ratio for the material of a negative lens. As a result, the variation of secondary chromatic aberration in zooming becomes excessively large (over-corrected). If the condition of the inequality (5) is not satisfied with regard to the lower limit value thereof, this leads to at least one of the selection of a material with an excessively low partial dispersion ratio for the material of a positive lens and the selection of a material with an excessively high partial dispersion ratio for the material of a negative lens. As a result, the variation of secondary chromatic aberration in zooming becomes excessively large (under-corrected).

It is favorable that the zoom lens according to the present exemplary embodiment includes a negative lens unit (a lens unit with negative refractive power) including a negative lens (a lens with negative refractive power) LN satisfying the following inequalities:

$$1.60<ndLN<2.00 \tag{6},$$

$$25.0<vdLN<60.0 \tag{7}, \text{ and}$$

$$0.490<\theta CtLN-0.00417\times vdLN<0.550 \tag{8},$$

where ndLN denotes a refractive index regarding d-line of the negative lens LN, vdLN denotes an Abbe number regarding d-line of the negative lens LN, and $\theta$CtLN denotes a partial dispersion ratio regarding C-line and t-line of the negative lens LN.

If the condition of the inequality (6) is not satisfied with regard to the upper limit value thereof, the variation of chromatic aberration in zooming becomes excessively large. If the condition of the inequality (6) is not satisfied with regard to the lower limit value thereof, the radius of curvature of the negative lens LN becomes excessively small, so that the zoom lens becomes excessively large. Alternatively, it becomes difficult to attain a zoom lens with high zoom ratio. If the condition of the inequality (7) is not satisfied with regard to the upper limit value thereof, this leads to the selection of an excessively low refractive index for the material of the negative lens LN, so that the zoom lens becomes excessively large. If the condition of the inequality (7) is not satisfied with regard to the lower limit value thereof, this leads to the selection of an excessively high dispersion for the material of the negative lens LN, so that the variation of chromatic aberration in zooming becomes excessively large. Alternatively, it becomes difficult to attain a zoom lens with high zoom ratio. If the condition of the inequality (8) is not satisfied, the variation of secondary chromatic aberration in zooming becomes excessively large.

It is favorable that the zoom lens according to the present exemplary embodiment satisfies the following inequality:

$$0.3 < fLNVm/fV < 4.0 \tag{9},$$

where fLNVm denotes the focal length of a negative lens LNVm with the strongest negative refractive power included in the variable magnification unit V.

If the condition of the inequality (9) is not satisfied with regard to the upper limit value thereof, the refractive power of the negative lens LNVm becomes excessively weak, so that the variation of chromatic aberration in zooming becomes excessively large. If the condition of the inequality (9) is not satisfied with regard to the lower limit value thereof, the refractive power of the negative lens LNVm becomes excessively strong, so that the variation of aberration in zooming becomes excessively large.

It is favorable that the zoom lens according to the present exemplary embodiment satisfies the following inequality:

$$-12.0 < f1/fV < -2.0 \tag{10},$$

where f1 denotes the focal length of the first lens unit L1.

If the condition of the inequality (10) is not satisfied with regard to the upper limit value thereof, the refractive power of the variable magnification unit V becomes excessively weak and the movement amount of the variable magnification unit V becomes excessively large, so that the zoom lens becomes excessively large. Alternatively, it becomes difficult to attain a zoom lens with high zoom ratio. If the condition of the inequality (10) is not satisfied with regard to the lower limit value thereof, the refractive power of the variable magnification unit V becomes excessively strong, so that the variation of aberration in zooming becomes excessively large.

It is favorable that the zoom lens according to the present exemplary embodiment satisfies the following inequality:

$$1.55 < ndVav < 1.9 \tag{11},$$

where ndVav denotes an average value of refractive indices regarding d-line of all of the lenses included in the variable magnification unit V.

If the condition of the inequality (11) is not satisfied with regard to the upper limit value thereof, the material of a lens included in the variable magnification unit V becomes an excessively high dispersive material, so that the variation of chromatic aberration in zooming becomes excessively large. If the condition of the inequality (11) is not satisfied with regard to the lower limit value thereof, the radius of curvature of a lens included in the variable magnification unit V becomes excessively small, so that the zoom lens becomes excessively large. Alternatively, it is difficult to attain a zoom lens with high zoom ratio.

It is favorable that the zoom lens according to the present exemplary embodiment satisfies the following inequality:

$$-40.0 < vdVpav - vdVnav < -5.0 \tag{12},$$

where vdVpav denotes an average value of Abbe numbers regarding d-line of all of the lenses with positive refractive power included in the variable magnification unit V and vdVnav denotes an average value of Abbe numbers regarding d-line of all of the lenses with negative refractive power included in the variable magnification unit V.

If the condition of the inequality (12) is not satisfied with regard to the upper limit value thereof, the variation of chromatic aberration in zooming becomes excessively large. Alternatively, the refractive power of a lens included in the variable magnification unit V becomes excessively strong, so that the variation of other aberration in zooming becomes excessively large. If the condition of the inequality (12) is not satisfied with regard to the lower limit value thereof, the material of a positive lens included in the variable magnification unit V and the material of a negative lens included in the variable magnification unit V become excessively different in partial dispersion ratio $\theta$Ct from each other, so that the variation of secondary chromatic aberration in zooming becomes excessively large.

It is favorable that the zoom lens according to the present exemplary embodiment satisfies the following inequality:

$$0.3 < fLN1/fN1 < 5.0 \tag{13},$$

where fN1 denotes the focal length of a lens unit N1 with the strongest negative refractive power (with the largest absolute value of negative refractive power; hereafter the same) in the plurality of lens units LM and FLN1 denotes the focal length of a negative lens LN1 with the strongest negative refractive power of the negative lenses LN included in the lens unit N1.

If the condition of the inequality (13) is not satisfied with regard to the upper limit value thereof, since the refractive power of the negative lens LN1 becomes excessively weak, the variation of chromatic aberration in zooming becomes excessively large. If the condition of the inequality (13) is not satisfied with regard to the lower limit value thereof, since the refractive power of the negative lens LN1 becomes excessively strong, the variation of aberration in zooming becomes excessively large.

It is favorable that the zoom lens according to the present exemplary embodiment satisfies the following inequality:

$$-12.0 < f1/fN1 < -2.0 \tag{14}.$$

If the condition of the inequality (14) is not satisfied with regard to the upper limit value thereof, the refractive power of the lens unit N1 becomes excessively weak and the movement amount of the lens unit N1 becomes excessively large, so that the zoom lens becomes excessively large.

If the condition of the inequality (14) is not satisfied with regard to the lower limit value thereof, the refractive power of the lens unit N1 becomes excessively strong, so that the variation of aberration in zooming becomes excessively large. Alternatively, it becomes difficult to attain a zoom lens with high zoom ratio.

It is favorable that the zoom lens according to the present exemplary embodiment satisfies the following inequality:

$$1.55 < ndN1av < 1.90 \tag{15},$$

where ndN1av denotes an average value of refractive indices regarding d-line of all of the lenses included in the lens unit N1 with the strongest negative refractive power in the plurality of lens units LM.

If the condition of the inequality (15) is not satisfied with regard to the upper limit value thereof, the material of a lens included in the lens unit N1 becomes an excessively high dispersive material, so that the variation of chromatic aberration in zooming becomes excessively large. If the condition of the inequality (15) is not satisfied with regard to the lower limit value thereof, the radius of curvature of a lens included in the lens unit N1 becomes excessively small, so that the zoom lens becomes excessively large. Alternatively, it becomes difficult to attain a zoom lens with high zoom ratio.

It is favorable that the zoom lens according to the present exemplary embodiment satisfies the following inequality:

$$-40.0 < vdN1pav - vdN1nav < -5.0 \tag{16},$$

where vdN1pav denotes an average value of Abbe numbers regarding d-line of all of the lenses with positive refractive power included in the lens unit N1 with the strongest negative refractive power in the plurality of lens units LM and vdN1nav denotes an average value of Abbe numbers regarding d-line of all of the lenses with negative refractive power included in the lens unit N1.

If the condition of the inequality (16) is not satisfied with regard to the upper limit value thereof, the variation of chromatic aberration in zooming becomes excessively large. Alternatively, the refractive power of a lens included in the lens unit N1 becomes excessively strong, so that the variation of aberration in zooming becomes excessively large. If the condition of the inequality (16) is not satisfied with regard to the lower limit value thereof, the respective materials of a positive lens and a negative lens included in the lens unit N1 become excessively different in partial dispersion ratio θCt from each other, so that the variation of secondary chromatic aberration in zooming becomes excessively large.

It is favorable that the zoom lens according to the present exemplary embodiment satisfies the following inequality:

$$-0.040 < \theta CtN1pav - \theta CtN1nav < 0.040 \tag{17},$$

where θCtN1pav denotes an average value of partial dispersion ratios θCt regarding C-line and t-line of all of the lenses with positive refractive power included in the lens unit N1 with the strongest negative refractive power in the plurality of lens units LM and θCtN1nav denotes an average value of partial dispersion ratios θCt regarding C-line and t-line of all of the lenses with negative refractive power included in the lens unit N1.

If the condition of the inequality (17) is not satisfied, the variation of secondary chromatic aberration in zooming becomes excessively large.

It is favorable that the zoom lens according to the present exemplary embodiment satisfies the following inequality:

$$0.3 < fLNm/fNm < 4.0 \tag{18},$$

where fNm is the focal length of a lens unit Nm including a negative lens LNm with the strongest negative refractive power of the negative lenses LN in the plurality of lens units LM and fLNm is the focal length of the negative lens LNm.

If the condition of the inequality (18) is not satisfied with regard to the upper limit value thereof, since the refractive power of the negative lens LNm becomes excessively weak, the variation of chromatic aberration in zooming becomes excessively large. If the condition of the inequality (18) is not satisfied with regard to the lower limit value thereof, since the refractive power of the negative lens LNm becomes excessively strong, the variation of aberration in zooming becomes excessively large.

It is favorable that the zoom lens according to the present exemplary embodiment satisfies the following inequality:

$$1.55 < ndNmav < 1.90 \tag{19},$$

where ndNmav denotes an average value of refractive indices regarding d-line of all of the lenses included in the lens unit Nm.

If the condition of the inequality (19) is not satisfied with regard to the upper limit value thereof, the material of a lens included in the lens unit Nm becomes an excessively high dispersive material, so that the variation of chromatic aberration in zooming becomes excessively large. If the condition of the inequality (19) is not satisfied with regard to the lower limit value thereof, the radius of curvature of a lens included in the lens unit Nm becomes excessively small, so that the zoom lens becomes excessively large. Alternatively, it becomes difficult to attain a zoom lens with high zoom ratio.

It is favorable that the zoom lens according to the present exemplary embodiment satisfies the following inequality:

$$-40.0 < vdNmpav - vdNmnav < -5.0 \tag{20},$$

where vdNmpav denotes an average value of Abbe numbers regarding d-line of all of the lenses with positive refractive power included in the lens unit Nm and vdNmnav denotes an average value of Abbe numbers regarding d-line of all of the lenses with negative refractive power included in the lens unit Nm.

If the condition of the inequality (20) is not satisfied with regard to the upper limit value thereof, the variation of chromatic aberration in zooming becomes excessively large. Alternatively, the refractive power of a lens included in the lens unit Nm becomes excessively strong, so that the variation of aberration in zooming becomes excessively large. If the condition of the inequality (20) is not satisfied with regard to the lower limit value thereof, the respective materials of a positive lens and a negative lens included in the lens unit Nm become excessively different in partial dispersion ratio θCt from each other, so that the variation of secondary chromatic aberration in zooming becomes excessively large.

It is favorable that the zoom lens according to the present exemplary embodiment satisfies the following inequality:

$$-0.050 < \theta CtNmpav - \theta CtNmnav < 0.040 \tag{21},$$

where θCtNmpav denotes an average value of partial dispersion ratios θCt regarding C-line and t-line of all of the lenses with positive refractive power included in the lens unit Nm and θCtNmnav denotes an average value of partial dispersion ratios θCt regarding C-line and t-line of all of the lenses with negative refractive power included in the lens unit Nm.

If the condition of the inequality (21) is not satisfied, the variation of secondary chromatic aberration in zooming becomes excessively large.

It is favorable that the zoom lens according to the present exemplary embodiment satisfies the following inequality:

$$-0.030 < \theta Ct1pav - \theta Ct1nav < 0.030 \tag{22},$$

where $\theta Ct1pav$ denotes an average value of partial dispersion ratios $\theta Ct$ regarding C-line and t-line of all of the lenses with positive refractive power included in the first lens unit $L1$ and $\theta Ct1nav$ denotes an average value of partial dispersion ratios $Ct$ regarding C-line and t-line of all of the lenses with negative refractive power included in the first lens unit $L1$.

If the condition of the inequality (22) is not satisfied, the secondary longitudinal chromatic aberration at the telephoto end becomes excessively large, so that the variation of secondary chromatic aberration in zooming becomes excessively large.

Furthermore, it is more favorable that the zoom lens according to the present exemplary embodiment is configured to satisfy, instead of the above-mentioned inequalities (1) to (22), the following inequalities (1a) to (22a):

$$-0.035 < \theta CtVpav - \theta CtVnav < 0.035 \tag{1a}$$

$$0.5503 < \theta CtVpx - 0.004693 \times vdVpx < 0.6287 \tag{2a}$$

$$24.3 < vdVpx < 51.5 \tag{3a}$$

$$-4.0 < fVpx/fV < -0.4 \tag{4a}$$

$$0.5244 < \theta CtVpx - 0.005575 \times vdVpx < 0.5712 \tag{5a}$$

$$1.63 < ndLN < 1.95 \tag{6a}$$

$$27.7 < vdLN < 57.0 \tag{7a}$$

$$0.4974 < \theta CtLN - 0.00417 \times vdLN < 0.5493 \tag{8a}$$

$$0.4 < fLNVm/fV < 3.4 \tag{9a}$$

$$-10.7 < f1/fV < -2.4 \tag{10a}$$

$$1.58 < ndVav < 1.85 \tag{11a}$$

$$-33.0 < vdVpav - vdVnav < -6.6 \tag{12a}$$

$$0.4 < fLN1/fN1 < 4.1 \tag{13a}$$

$$-10.7 < f1/fN1 < -2.4 \tag{14a}$$

$$1.58 < ndN1av < 1.89 \tag{15a}$$

$$-33.6 < vdN1pav - vdN1nav < -6.6 \tag{16a}$$

$$-0.035 < \theta CtN1pav - \theta CtN1nav < 0.035 \tag{17a}$$

$$0.4 < fLNm/fNm < 3.1 \tag{18a}$$

$$1.58 < ndNmav < 1.89 \tag{19a}$$

$$-34.7 < vdNmpav - vdNmnav < -6.6 \tag{20a}$$

$$-0.049 < \theta CtNmpav - \theta CtNmnav < 0.035 \tag{21a}$$

$$-0.025 < \theta Ct1pav - \theta Ct1nav < 0.025 \tag{22a}$$

Moreover, it is more favorable that the zoom lens according to the present exemplary embodiment is configured to satisfy, instead of the above-mentioned inequalities (1a) to (22a), the following inequalities (1b) to (22b):

$$-0.025 < \theta CtVpav - \theta CtVnav < 0.025 \tag{1b}$$

$$0.5539 < \theta CtVpx - 0.004693 \times vdVpx < 0.6108 \tag{2b}$$

$$24.5 < vdVpx < 47.9 \tag{3b}$$

$$-2.9 < fVpx/fV < -0.7 \tag{4b}$$

$$0.5288 < \theta CtVpx - 0.005575 \times vdVpx < 0.5625 \tag{5b}$$

$$1.67 < ndLN < 1.91 \tag{6b}$$

$$30.3 < vdLN < 54.1 \tag{7b}$$

$$0.5048 < \theta CtLN - 0.00417 \times vdLN < 0.5486 \tag{8b}$$

$$0.5 < fLNVm/fV < 2.8 \tag{9b}$$

$$-9.4 < f1/fV < -2.8 \tag{10b}$$

$$1.61 < ndVav < 1.80 \tag{11b}$$

$$-26.1 < vdVpav - vdVnav < -8.2 \tag{12b}$$

$$0.5 < fLN1/fN1 < 3.2 \tag{13b}$$

$$-9.4 < f1/fN1 < -2.8 \tag{14b}$$

$$1.61 < ndN1av < 1.87 \tag{15b}$$

$$-27.1 < vdN1pav - vdN1nav < -8.2 \tag{16b}$$

$$-0.030 < \theta CtN1pav - \theta CtN1nav < 0.030 \tag{17b}$$

$$0.5 < fLNm/fNm < 2.2 \tag{18b}$$

$$1.61 < ndNmav < 1.87 \tag{19b}$$

$$-29.4 < vdNmpav - vdNmnav < -8.2 \tag{20b}$$

$$-0.048 < \theta CtNmpav - \theta CtNmnav < 0.030 \tag{21b}$$, and $$-0.015 < \theta Ct1pav - \theta Ct1nav < 0.015 \tag{22b}$$

Exemplary Embodiment Concerning Image Pickup Apparatus

Figure 17:
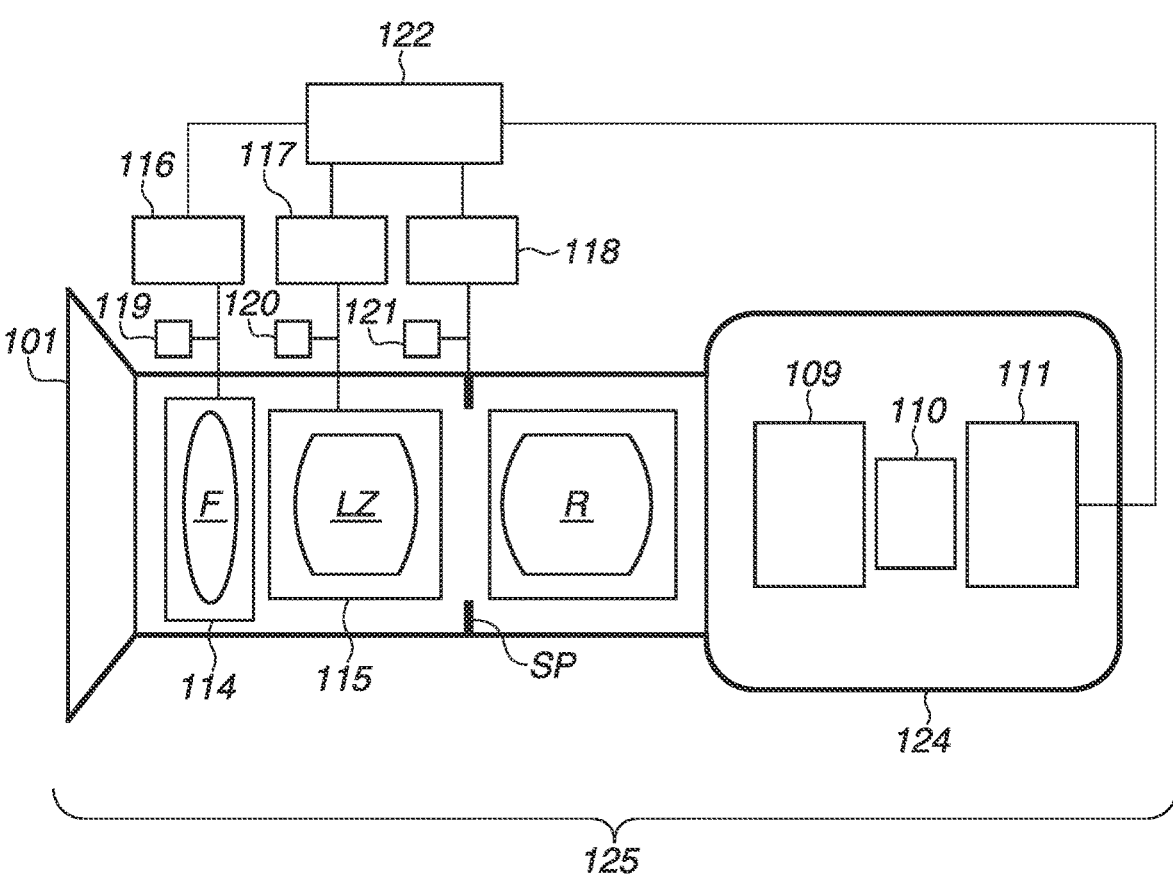
FIG. 17 is a diagram illustrating a configuration example of an image pickup apparatus.

Here, FIG. 17 is a diagram illustrating a configuration example of an image pickup apparatus. The image pickup apparatus 125 illustrated in FIG. 17 includes a zoom lens 101, which corresponds to a zoom lens according to any one of Embodiments 1 to 8. The image pickup apparatus 125 further includes a camera (an image pickup unit or an image pickup apparatus body) 124. The zoom lens 101 is configured to be attachable to and detachable from the camera 124. The image pickup apparatus 125 is configured with the zoom lens 101 attached to the camera 124. The zoom lens 101 includes a first lens unit, a plurality of lens units, which moves in zooming, and a rear lens unit, which does not move for zooming. In the illustration of FIG. 17, the zoom lens 101 includes the first lens unit F, the plurality of lens units LZ, and the rear lens unit R. The first lens unit F can be configured to include a lens subunit which moves for focusing. Moreover, referring to FIG. 17, the zoom lens 101 further includes an aperture stop SP and drive mechanisms 114 and 115, which are configured to drive a lens subunit used for focusing and a lens unit used for zooming, respectively, and include, for example, a helicoid or a cam. Moreover, the zoom lens 101 further includes motors (actuators) 116 to 118, which drive the drive mechanisms 114 and 115 and the aperture stop SP, respectively. The zoom lens 101 further includes detection units 119 to 121, which detect the position of the lens subunit used for focusing, the positions of the lens unit used for zooming, and the aperture diameter of the aperture stop SP, respectively, and include, for example, an encoder, a potentiometer, or a photosensor. The camera 124 includes a glass block 109, which includes, for example, an optical filter, and an image sensor (a photoelectric conversion element) 110, which picks up (captures) an object image formed by the zoom lens 101 and includes, for example, a charge-coupled device (CCD) sensor or a complementary metal-oxide semiconductor (CMOS) sensor. Moreover, the camera 124 further includes processing units 111 and 122, each including a processor such as a central processing unit (CPU), which perform various processing operations and control operations in the camera 124 and the zoom lens 101, respectively. According to the image pickup apparatus in the present exemplary embodiment, it is possible to provide a useful image pickup apparatus to which the above-mentioned effects of the zoom lens according to the above-described exemplary embodiment are applicable.

In the following description, Examples 1 to 8 of the zoom lens according to the above-described exemplary embodiment and numerical examples 1 to 8 corresponding to the Examples 1 to 8, respectively, are described.

Example 1

Referring to FIG. 1, configurations of lens units and lens subunits according to the Example 1 are as described above. In FIG. 1, the first lens unit L1 has the first surface to the fifteenth surface. The first lens subunit L1$a$ has the first surface to the seventh surface, and includes one negative lens and three positive lenses.

The second lens subunit L1$b$ has the eighth surface to the fifteenth surface, and includes two negative lenses and three positive lenses. The plurality of lens units LM includes the second lens unit L2 and the third lens unit L3. The second lens unit L2 has the sixteenth surface to the twenty-fourth surface, and includes three negative lenses and two positive lenses. The third lens unit L3 has the twenty-fifth surface to the twenty-seventh surface, and includes one negative lens and one positive lens. The aperture stop SP has the twenty-eighth surface. The rear lens unit LR has the twenty-ninth surface to the forty-seventh surface, and includes one positive lens the surface on the image side of which is aspheric, three negative lenses, and seven positive lenses. FIGS. 2A, 2B, and 2C are diagrams illustrating aberrations in the numerical example 1 as mentioned above.

In the Example 1, the variable magnification unit V corresponds to the second lens unit L2. In the Example 1, the negative lens LN corresponds to a lens having the sixteenth surface and the seventeenth surface in the second lens unit L2 and a lens having the nineteenth surface and the twentieth surface in the second lens unit L2. In the Example 1, the lens unit with the strongest negative refractive power in the plurality of lens units LM corresponds to the second lens unit L2. In the Example 1, the negative lens LNm with the strongest negative refractive power of the negative lenses LN corresponds to a lens having the nineteenth surface and the twentieth surface in the second lens unit L2.

Values concerning the inequality (1) to the inequality (22) in the Example 1 are shown in Table 1. Furthermore, values of the respective variables included in the inequality (1) to the inequality (22) are shown in Table 2. According to the Example 1, it is possible to provide a zoom lens which satisfies all of the inequality (1) to the inequality (22) and is, therefore, in respect of a high optical performance relative to light in a range from visible light to SWIR light and a reduction in size thereof. Here, the zoom lens is attained by satisfying the inequality (1) to the inequality (3) and does not necessarily need to satisfy the inequality (4) to the inequality (22). Furthermore, in a case where at least any one of the inequality (4) to the inequality (22) is satisfied in addition to the inequality (1) to the inequality (3), a more conspicuous effect or an extraneous effect can be brought about as compared with the other cases. Furthermore, the effects brought about in a case where the respective inequalities are satisfied are as described above.

Example 2

Figure 3:
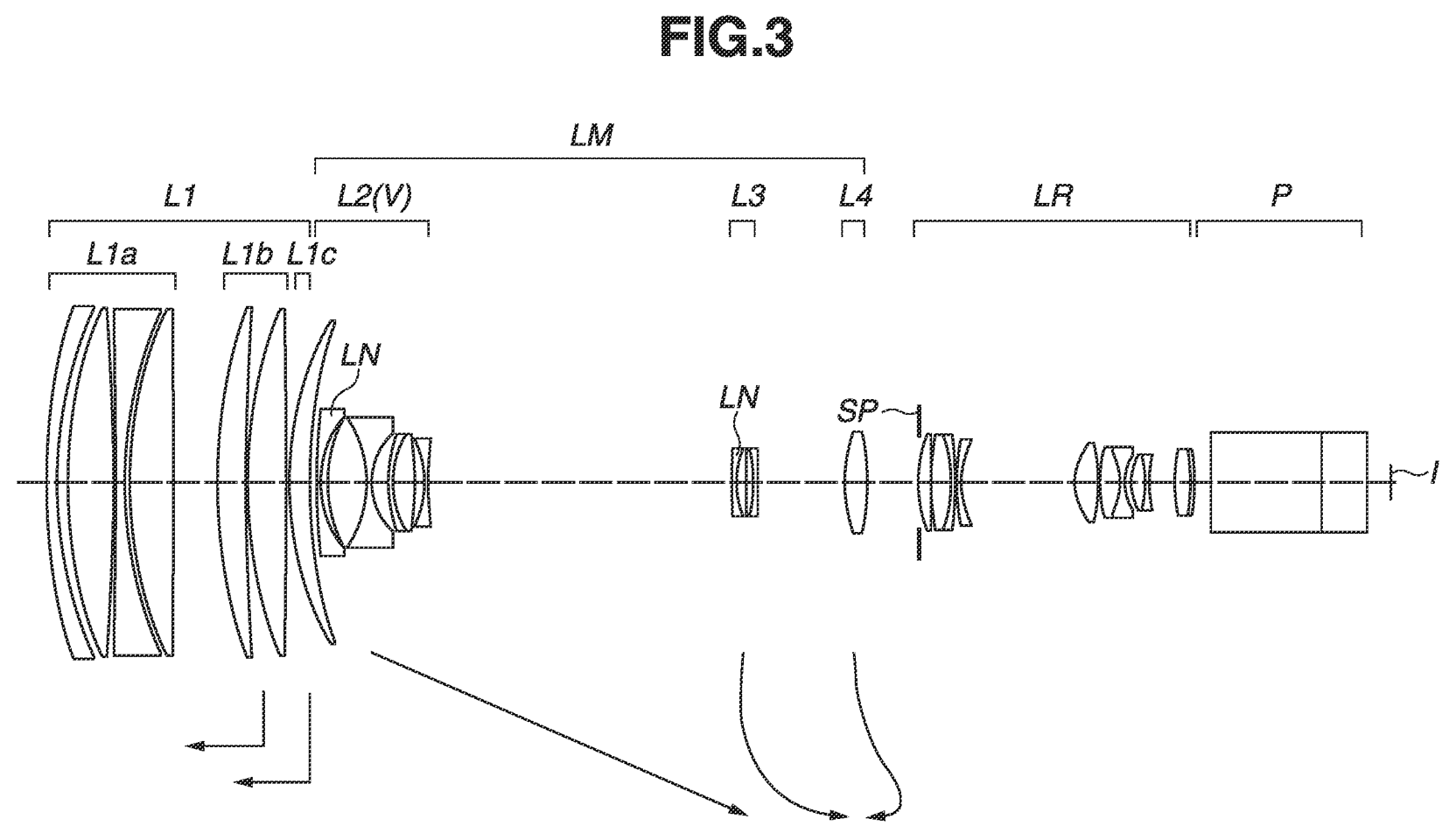

FIG. 3 is a sectional view of a zoom lens in a state of being set at focusing on infinite distance and at the wide-angle end according to the Example 2. Referring to FIG. 3, components of the zoom lens are described in order from an object side to an image side. The zoom lens includes a first lens unit L1 with positive refractive power, which does not move for zooming. The first lens unit L1 includes a first lens subunit L1$a$, which does not move for focusing. The first lens unit L1 further includes a second lens subunit L1$b$, which moves toward the object side for focusing from an infinite-distance object to a minimum-distance object. The first lens unit L1 further includes a third lens subunit L1$c$, which moves toward the object side with a locus different from that of the second lens subunit L1$b$ for focusing from the infinite-distance object to the minimum-distance object. The zoom lens further includes a plurality of lens units LM, which moves in zooming. The plurality of lens units LM includes a second lens unit L2 with negative refractive power, which moves in zooming. The plurality of lens units LM further includes a third lens unit L3 with negative refractive power, which moves in zooming. The plurality of lens units LM further includes a fourth lens unit L4 with positive refractive power, which moves in zooming. The second lens unit L2 moves monotonously toward the image side in zooming from the wide-angle end to the telephoto end. The third lens unit L3 first moves toward the object side and then moves toward the image side in the above-mentioned zooming. The fourth lens unit LA moves (for example, non-monotonously as illustrated in FIG. 3) in the above-mentioned zooming. The zoom lens further includes an aperture stop SP, which does not move in connection with zooming (in conjunction with zooming). The zoom lens further includes a rear lens unit LR with positive refractive power, which does not move for zooming.

Figure 4A:
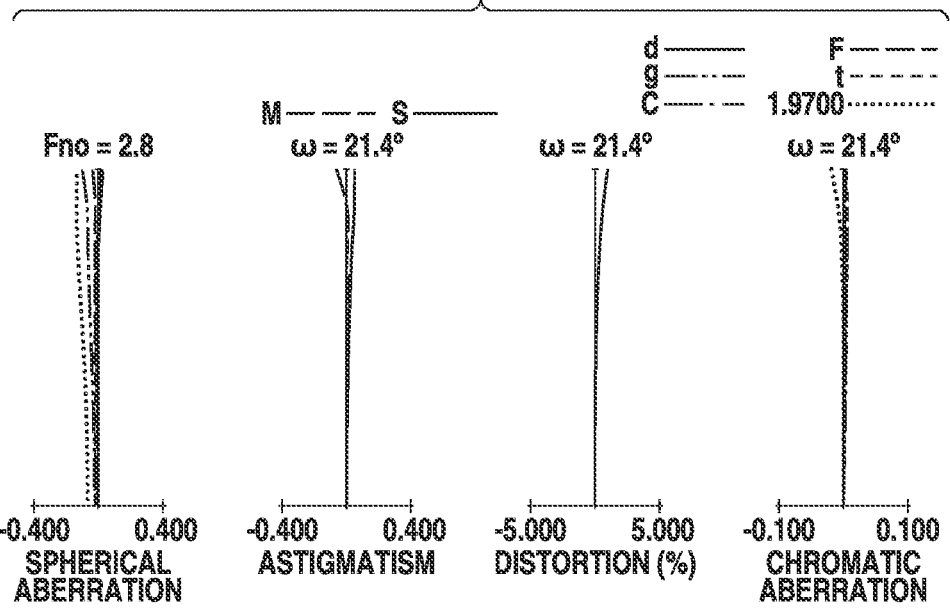
FIGS. 4A, 4B, and 4C are diagrams illustrating aberra-tions of the zoom lens in a state of being set at focusing on infinite distance and at the wide-angle end, at the middle point, and at the telephoto end, respectively, according to the Example 2.
Figure 4B:
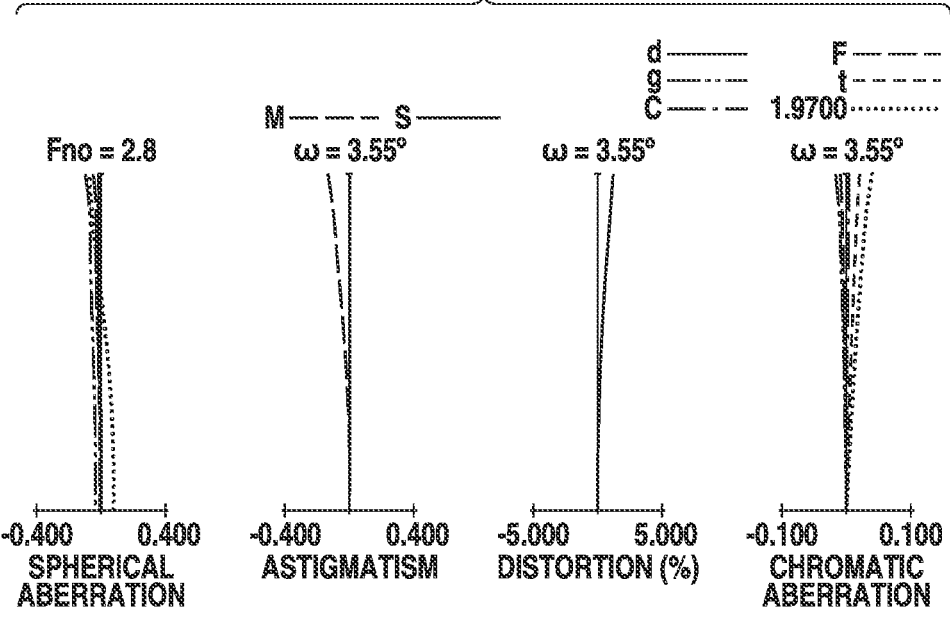
Figure 4C:
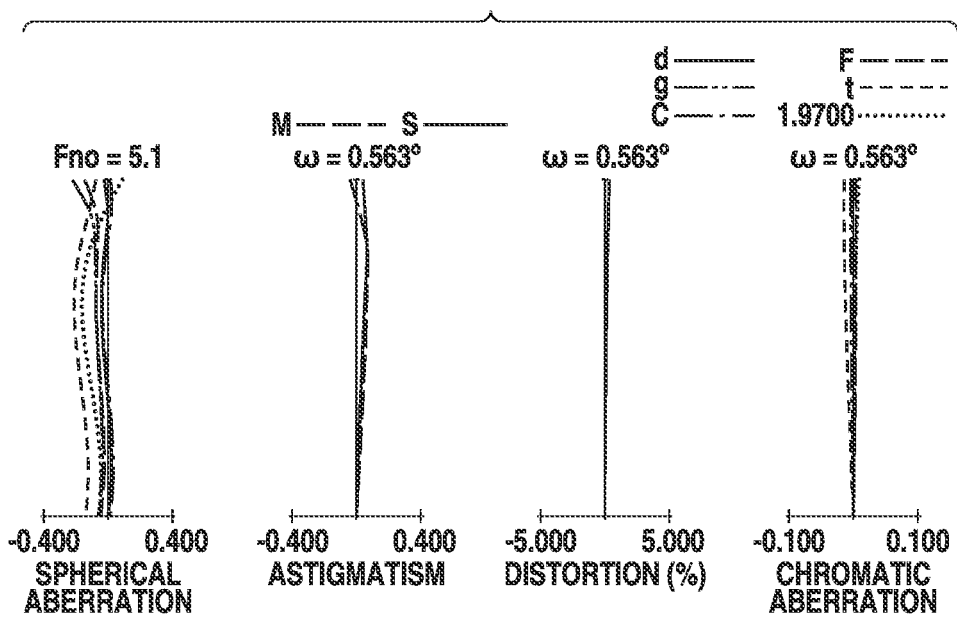

The first lens unit L1 has the first surface to the fourteenth surface. The first lens subunit L1$a$ has the first surface to the eighth surface, and includes two negative lenses and two positive lenses. The second lens subunit L1$b$ has the ninth surface to the twelfth surface, and includes two positive lenses. The third lens subunit L1$c$ has the thirteenth surface and the fourteenth surface, and includes one positive lens. The second lens unit L2 has the fifteenth surface to the twenty-fourth surface, and includes one negative lens the surface on the image side of which is aspheric, two positive lenses, and three negative lenses. The third lens unit L3 has the twenty-fifth surface to the twenty-ninth surface, and includes one positive lens and two negative lenses. The fourth lens unit L4 has the thirtieth surface and the thirty-first surface, and includes one positive lens the surface on the object side of which is aspheric. The aperture stop SP has the thirty-second surface. The rear lens unit LR has the thirty-third surface to the fiftieth surface, and includes five negative lenses and six positive lenses. FIGS. 4A, 4B, and 4C are diagrams illustrating aberrations of the zoom lens in a state of being set at focusing on infinite distance and at the wide-angle end, at the middle point, and at the telephoto end, respectively (with regard to the respective focal lengths, refer to the numerical example 2). Explanatory notes in FIGS. 4A, 4B, and 4C are similar to those described above with reference to FIGS. 2A, 2B, and 2C.

In the Example 2, the variable magnification unit V corresponds to the second lens unit L2. In the Example 2, the negative lens LN corresponds to a lens having the fifteenth surface and the sixteenth surface in the second lens unit L2 and a lens having the twenty-fifth surface and the twenty-sixth surface in the third lens unit L3. In the Example 2, the lens unit with the strongest negative refractive power in the plurality of lens units LM corresponds to the second lens unit L2. In the Example 2, the negative lens LNm with the strongest negative refractive power of the negative lenses LN corresponds to a lens having the twenty-fifth surface and the twenty-sixth surface in the third lens unit L3.

Values concerning the inequality (1) to the inequality (22) in the Example 2 are shown in Table 1. Furthermore, values of the respective variables included in the inequality (1) to the inequality (22) are shown in Table 2. According to the Example 2, it is possible to provide a zoom lens which satisfies all of the inequality (1) to the inequality (22) and is, therefore, in respect of a high optical performance relative to light in a range from visible light to SWIR light and a reduction in size thereof. Here, the zoom lens is attained by satisfying the inequality (1) to the inequality (3) and does not necessarily need to satisfy the inequality (4) to the inequality (22). Furthermore, in a case where at least any one of the inequality (4) to the inequality (22) is satisfied in addition to the inequality (1) to the inequality (3), a more conspicuous effect or an extraneous effect can be brought about as compared with the other cases. Furthermore, the effects brought about in a case where the respective inequalities are satisfied are as described above.

Example 3

Figure 5:
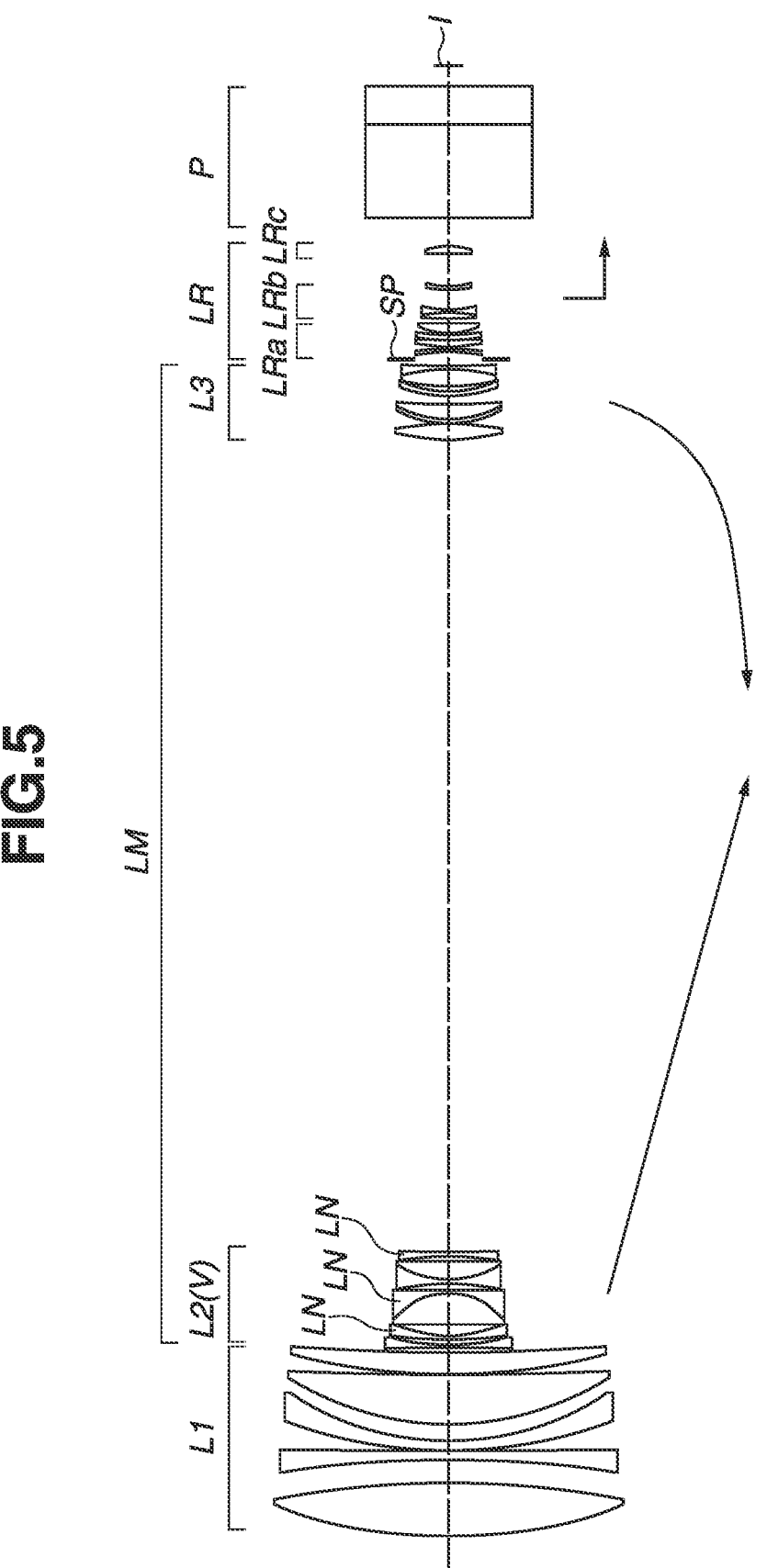
FIG. 5 is a sectional view of a zoom lens in a state of being set at focusing on infinite distance and at the wide-angle end according to an Example 3.

FIG. 5 is a sectional view of a zoom lens in a state of being set at focusing on infinite distance and at the wide-angle end according to the Example 3. Referring to FIG. 5, components of the zoom lens are described in order from an object side to an image side. The zoom lens includes a first lens unit L1 with positive refractive power, which does not move for zooming. The zoom lens further includes a plurality of lens units LM, which moves in zooming. The plurality of lens units LM includes a second lens unit L2 with negative refractive power, which moves in zooming, and the plurality of lens units LM further includes a third lens unit L3 with positive refractive power, which moves in zooming. The second lens unit L2 moves monotonously toward the image side in zooming from the wide-angle end to the telephoto end. The third lens unit L3 moves monotonously toward the object side in zooming from the wide-angle end to the telephoto end. The zoom lens further includes an aperture stop SP, which does not move in connection with zooming. The zoom lens further includes a rear lens unit LR with positive refractive power, which does not move for zooming. The rear lens unit LR includes a first lens subunit LRa, which does not move for focusing. The rear lens unit LR further includes a second lens subunit LRb, which moves toward the image side for focusing from the infinite-distance object to the minimum-distance object. The rear lens unit LR further includes a third lens subunit LRc, which does not move for focusing.

The first lens unit L1 has the first surface to the tenth surface, and includes three positive lenses and two negative lenses. The second lens unit L2 has the eleventh surface to the twenty-second surface, and includes two positive lenses and five negative lenses.

Figure 6A:
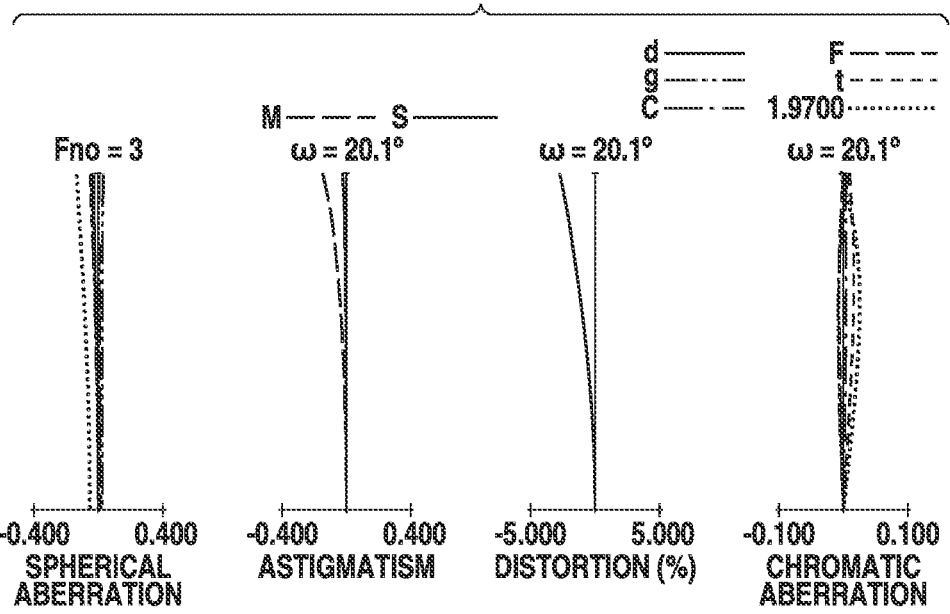
FIGS. 6A, 6B, and 6C are diagrams illustrating aberra-tions of the zoom lens in a state of being set at focusing on infinite distance and at the wide-angle end, at the middle point, and at the telephoto end, respectively, according to the Example 3.
Figure 6B:
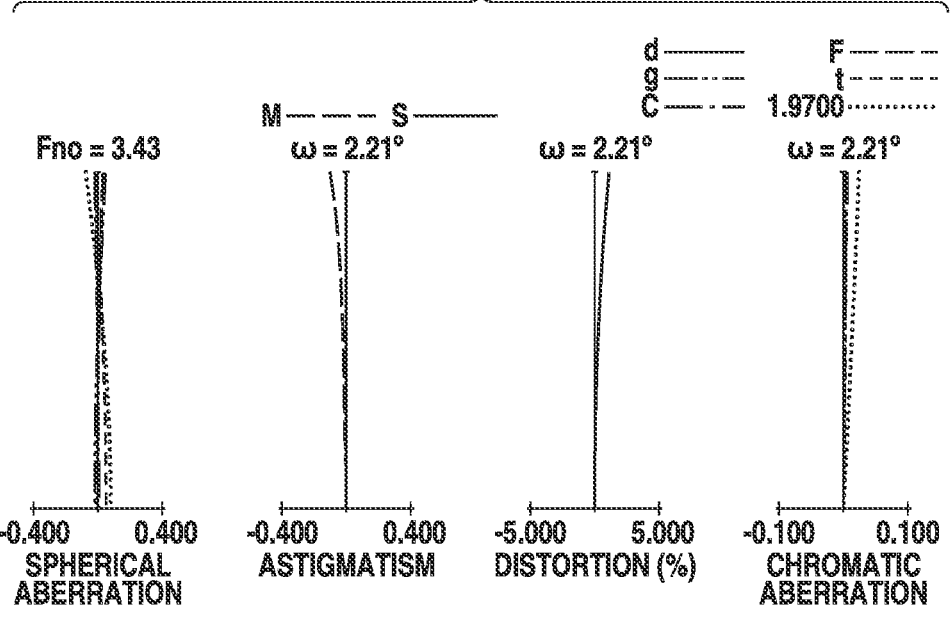
Figure 6C:
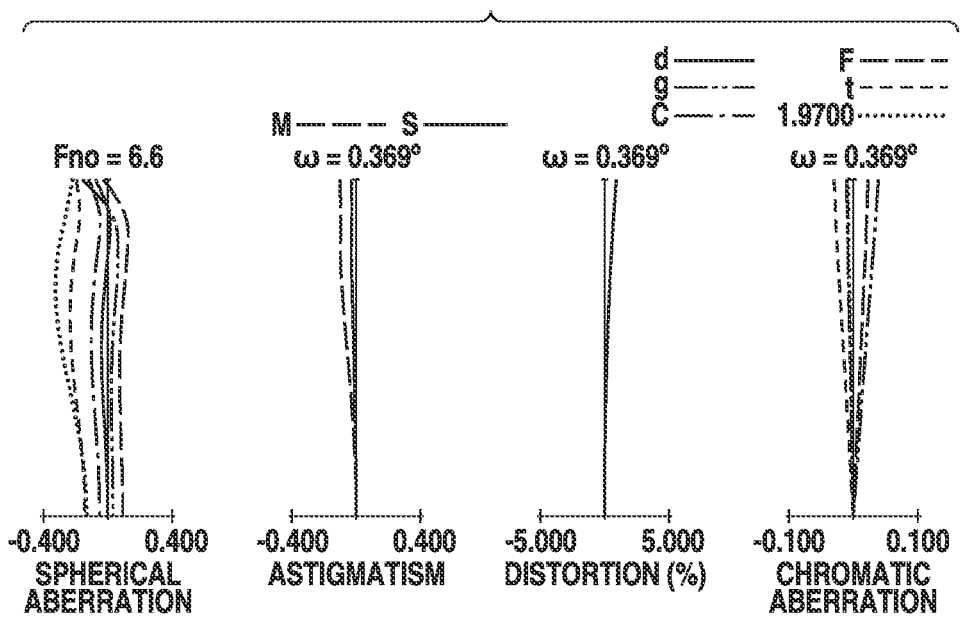

The third lens unit L3 has the twenty-third surface to the thirty-second surface, and includes three positive lenses and three negative lenses. The aperture stop SP has the thirty-third surface. The rear lens unit LR has the thirty-fourth surface to the forty-eighth surface. The first lens subunit LRa has the thirty-fourth surface to the forty-first surface, and includes three positive lenses and one negative lens. The second lens subunit LRb has the forty-second surface to the forty-sixth surface, and includes one positive lens and two negative lens. The third lens subunit LRc has the forty-seventh surface and the forty-eighth surface, and includes one positive lens. FIGS. 6A, 6B, and 6C are diagrams illustrating aberrations of the zoom lens in a state of being set at focusing on infinite distance and at the wide-angle end, at the middle point, and at the telephoto end, respectively (with regard to the respective focal lengths, refer to the numerical example 3). Explanatory notes in FIGS. 6A, 6B, and 6C are similar to those described above with reference to FIGS. 2A, 2B, and 2C.

In the Example 3, the variable magnification unit V corresponds to the second lens unit L2. In the Example 3, the negative lens LN corresponds to a lens having the thirteenth surface and the fourteenth surface in the second lens unit L2, a lens having the sixteenth surface and the seventeenth surface in the second lens unit L2, and a lens having the twenty-first surface and the twenty-second surface in the second lens unit L2. In the Example 3, the lens unit with the strongest negative refractive power in the plurality of lens units LM corresponds to the second lens unit L2. In the Example 3, the negative lens LNm with the strongest negative refractive power of the negative lenses LN corresponds to a lens having the sixteenth surface and the seventeenth surface in the second lens unit L2.

Values concerning the inequality (1) to the inequality (22) in the Example 3 are shown in Table 1. Furthermore, values of the respective variables included in the inequality (1) to the inequality (22) are shown in Table 2. According to the Example 3, it is possible to provide a zoom lens which satisfies all of the inequality (1) to the inequality (22) and is, therefore, in respect of a high optical performance relative to light in a range from visible light to SWIR light and a reduction in size thereof. Here, the zoom lens is attained by satisfying the inequality (1) to the inequality (3) and does not necessarily need to satisfy the inequality (4) to the inequality (22). Furthermore, in a case where at least any one of the inequality (4) to the inequality (22) is satisfied in addition to the inequality (1) to the inequality (3), a more conspicuous effect or an extraneous effect can be brought about as compared with the other cases. Furthermore, the effects brought about in a case where the respective inequalities are satisfied are as described above.

Example 4

Figure 7:
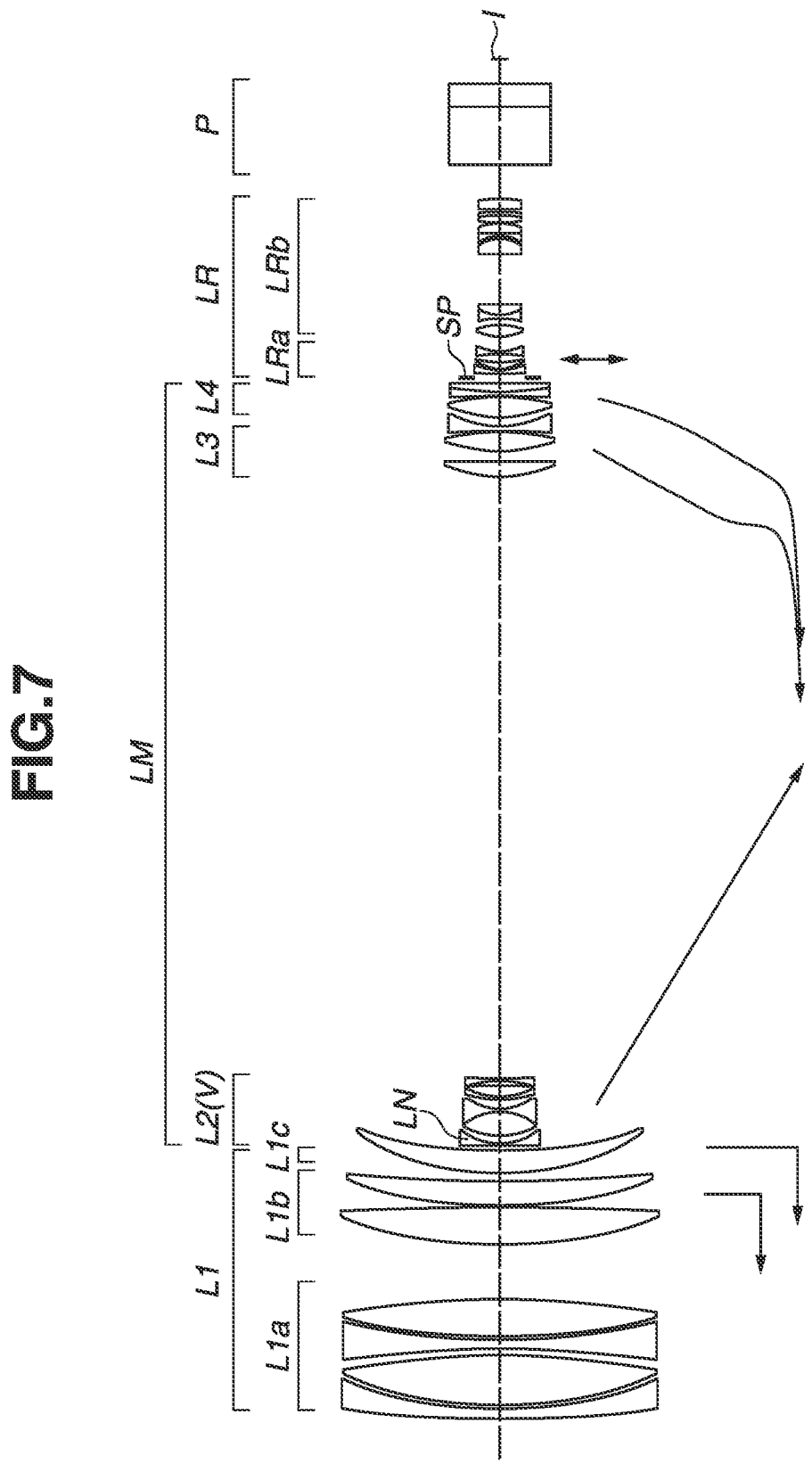
FIG. 7 is a sectional view of a zoom lens in a state of being set at focusing on infinite distance and at the wide-angle end according to an Example 4.

FIG. 7 is a sectional view of a zoom lens in a state of being set at focusing on infinite distance and at the wide-angle end according to the Example 4. Referring to FIG. 7, components of the zoom lens are described in order from an object side to an image side. The zoom lens includes a first lens unit L1 with positive refractive power, which does not move for zooming. The first lens unit L1 includes a first lens subunit L1a, which does not move for focusing. The first lens unit L1 further includes a second lens subunit L1b, which moves toward the object side for focusing from an infinite-distance object to a minimum-distance object. The first lens unit L1 further includes a third lens subunit L1c, which moves toward the object side with a locus different from that of the second lens subunit L1*b* for focusing from the infinite-distance object to the minimum-distance object. The zoom lens further includes a plurality of lens units LM, which moves in zooming. The plurality of lens units LM includes a second lens unit L2 with negative refractive power, which moves in zooming. The plurality of lens units LM further includes a third lens unit L3 with positive refractive power, which moves in zooming. The plurality of lens units LM further includes a fourth lens unit L4 with positive refractive power, which moves in zooming. The second lens unit L2 moves monotonously toward the image side in zooming from the wide-angle end to the telephoto end. The third lens unit L3 moves (for example, non-monotonously as illustrated in FIG. 7) in the above-mentioned zooming. The fourth lens unit L4 moves monotonously toward the object side in the above-mentioned zooming. The zoom lens further includes an aperture stop SP, which does not move in connection with zooming. The zoom lens further includes a rear lens unit LR with positive refractive power, which does not move for zooming. The rear lens unit LR includes a first lens subunit LRa, which moves for image stabilization with a movement amount having components perpendicular to the optical axis. The rear lens unit LR further includes a second lens subunit LRb, which does not move for image stabilization.

Figure 8A:
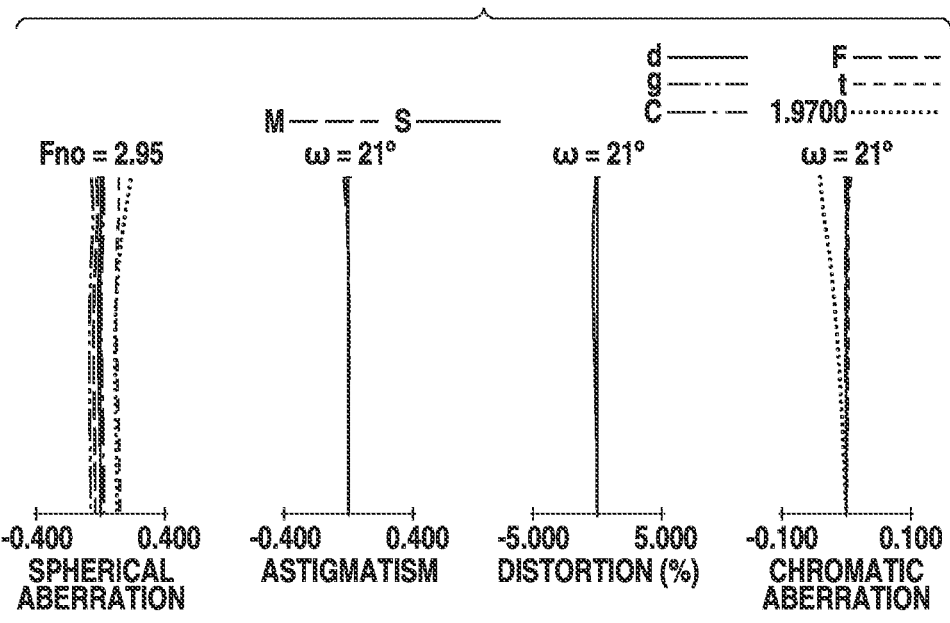
FIGS. 8A, 8B, and 8C are diagrams illustrating aberra-tions of the zoom lens in a state of being set at focusing on infinite distance and at the wide-angle end, at the middle point, and at the telephoto end, respectively, according to the Example 4.
Figure 8B:
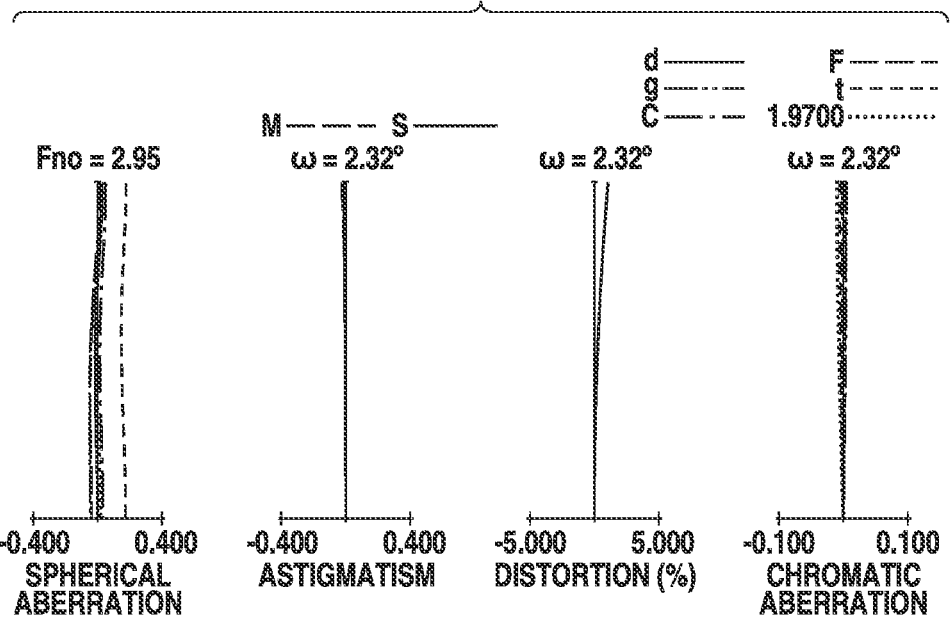
Figure 8C:
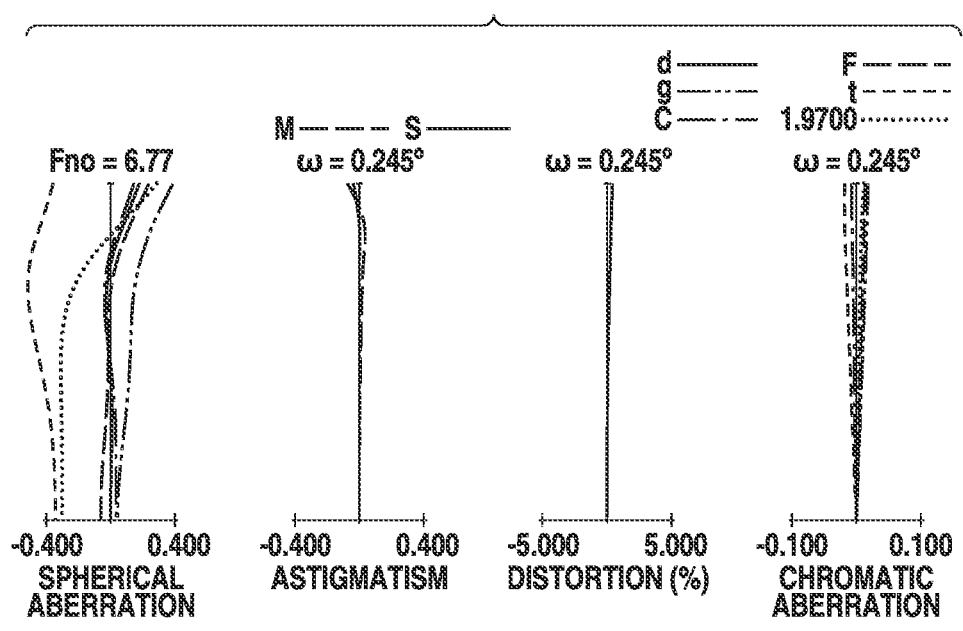

The first lens unit L1 has the first surface to the fourteenth surface. The first lens subunit L1*a* has the first surface to the eighth surface, and includes two negative lenses and two positive lenses. The second lens subunit L1*b* has the ninth surface to the twelfth surface, and includes two positive lenses. The third lens subunit L1*c* has the thirteenth surface and the fourteenth surface, and includes one positive lens. The second lens unit L2 has the fifteenth surface to the twenty-fourth surface, and includes one negative lens the surface on the image side of which is aspheric, two positive lenses, and three negative lenses. The third lens unit L3 has the twenty-fifth surface to the thirtieth surface, and includes one positive lens the surface on the image side of which is aspheric, one positive lens, and one negative lens. The fourth lens unit L4 has the thirty-first surface to the thirty-fifth surface, and includes one positive lens the surface on the image side of which is aspheric, one positive lens, and one negative lens. The aperture stop SP has the thirty-sixth surface. The rear lens unit LR has the thirty-seventh surface to the fifty-seventh surface. The first lens subunit LRa has the thirty-seventh surface to the forty-second surface, and includes one positive lens and two negative lenses. The second lens subunit LRb has the forty-third surface to the fifty-seventh surface, and includes six positive lenses and three negative lens. FIGS. 8A, 8B, and 8C are diagrams illustrating aberrations of the zoom lens in a state of being set at focusing on infinite distance and at the wide-angle end, at the middle point, and at the telephoto end, respectively (with regard to the respective focal lengths, refer to the numerical example 4). Explanatory notes in FIGS. 8A, 8B, and 8C are similar to those described above with reference to FIGS. 2A, 2B, and 2C.

In the Example 4, the variable magnification unit V corresponds to the second lens unit L2. In the Example 4, the negative lens LN corresponds to a lens having the fifteenth surface and the sixteenth surface in the second lens unit L2. In the Example 4, the lens unit with the strongest negative refractive power in the plurality of lens units LM corresponds to the second lens unit L2. In the Example 4, the negative lens LNm with the strongest negative refractive power of the negative lenses LN corresponds to a lens having the fifteenth surface and the sixteenth surface in the second lens unit L2.

Values concerning the inequality (1) to the inequality (22) in the Example 4 are shown in Table 1. Furthermore, values of the respective variables included in the inequality (1) to the inequality (22) are shown in Table 2. According to the Example 4, it is possible to provide a zoom lens which satisfies all of the inequality (1) to the inequality (22) and is, therefore, in respect of a high optical performance relative to light in a range from visible light to SWIR light and a reduction in size thereof. Here, the zoom lens is attained by satisfying the inequality (1) to the inequality (3) and does not necessarily need to satisfy the inequality (4) to the inequality (22). Furthermore, in a case where at least any one of the inequality (4) to the inequality (22) is satisfied in addition to the inequality (1) to the inequality (3), a more conspicuous effect or an extraneous effect can be brought about as compared with the other cases. Furthermore, the effects brought about in a case where the respective inequalities are satisfied are as described above.

Example 5

Figure 9:
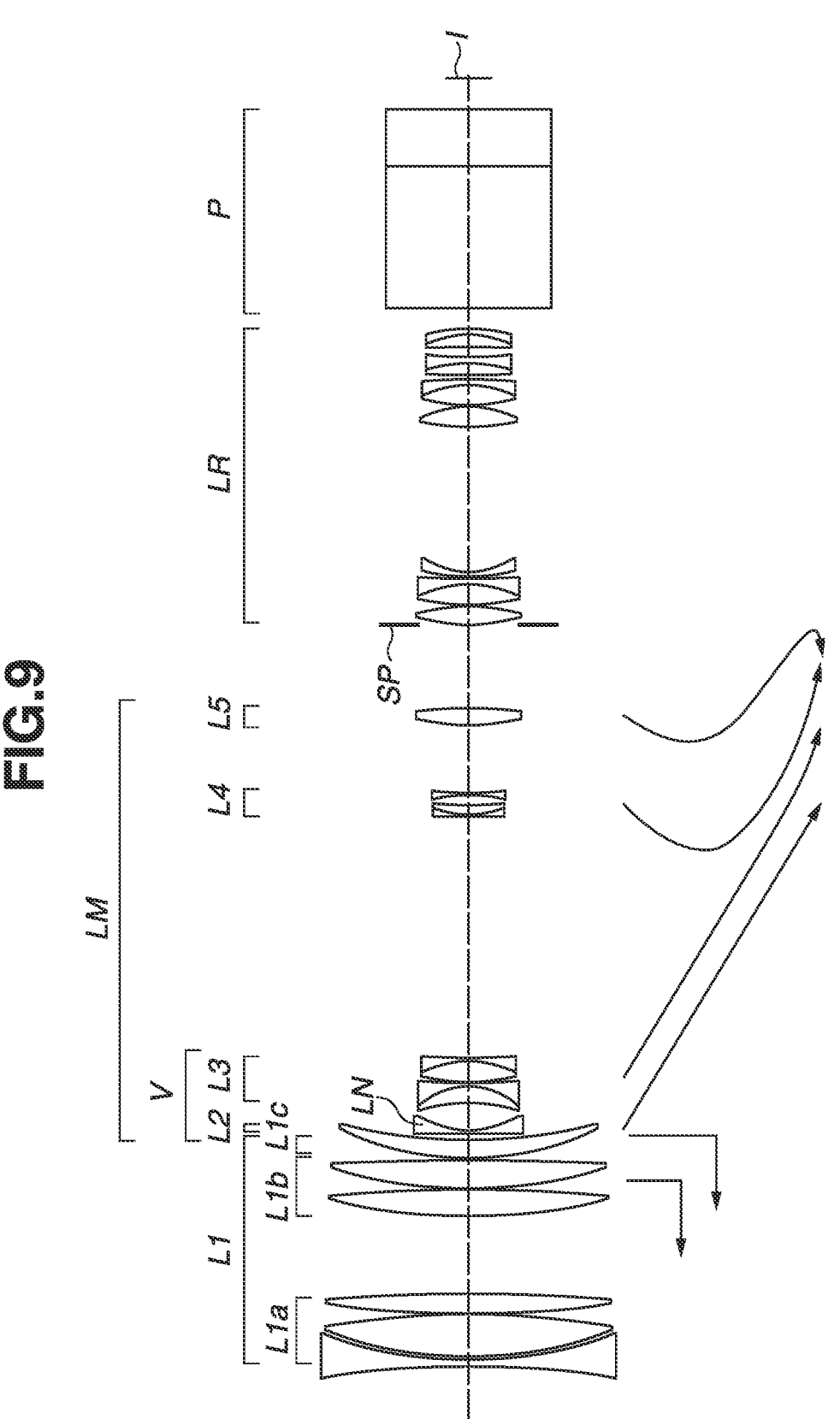
FIG. 9 is a sectional view of a zoom lens in a state of being set at focusing on infinite distance and at the wide-angle end according to an Example 5.

FIG. 9 is a sectional view of a zoom lens in a state of being set at focusing on infinite distance and at the wide-angle end according to the Example 5. Referring to FIG. 9, components of the zoom lens are described in order from an object side to an image side. The zoom lens includes a first lens unit L1 with positive refractive power, which does not move for zooming. The first lens unit L1 includes a first lens subunit L1*a*, which does not move for focusing. The first lens unit L1 further includes a second lens subunit L1*b*, which moves toward the object side for focusing from an infinite-distance object to a minimum-distance object. The first lens unit L1 further includes a third lens subunit L1*c*, which moves toward the object side with a locus different from that of the second lens subunit L1*b* for focusing from the infinite-distance object to the minimum-distance object. The zoom lens further includes a plurality of lens units LM, which moves in zooming. The plurality of lens units LM includes a second lens unit L2 with negative refractive power, which moves in zooming, a third lens unit L3 with negative refractive power, which moves in zooming, a fourth lens unit L4 with negative refractive power, which moves in zooming, and a fifth lens unit L5 with positive refractive power, which moves in zooming. The second lens unit L2 moves monotonously toward the image side in zooming from the wide-angle end to the telephoto end. The third lens unit L3 moves monotonously toward the image side with a locus different from that of the second lens unit L2 in the above-mentioned zooming. The fourth lens unit L4 first moves toward the object side and then moves toward the image side in the above-mentioned zooming. The fifth lens unit L5 moves (for example, non-monotonously as illustrated in FIG. 9) in the above-mentioned zooming.

The zoom lens further includes an aperture stop SP, which does not move in connection with zooming. The zoom lens further includes a rear lens unit LR with positive refractive power, which does not move for zooming.

Figure 10A:
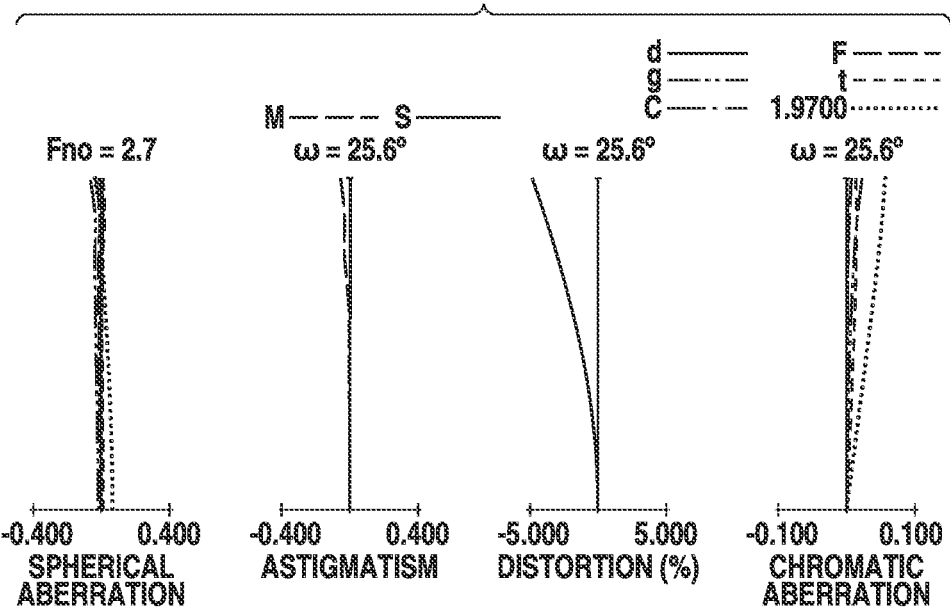
FIGS. 10A, 10B, and 10C are diagrams illustrating aber-rations of the zoom lens in a state of being set at focusing on infinite distance and at the wide-angle end, at the middle point, and at the telephoto end, respectively, according to the Example 5.
Figure 10B:
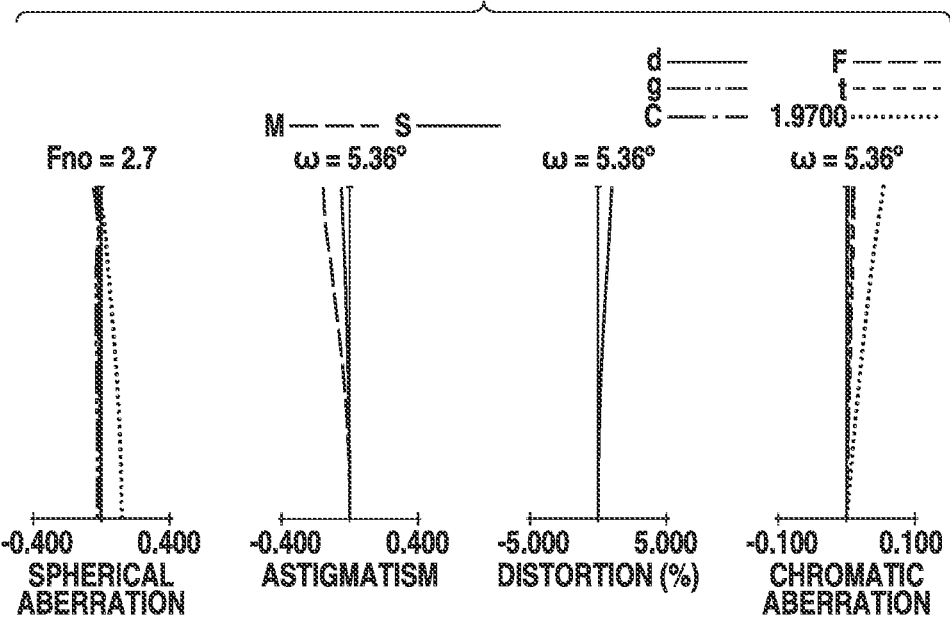
Figure 10C:
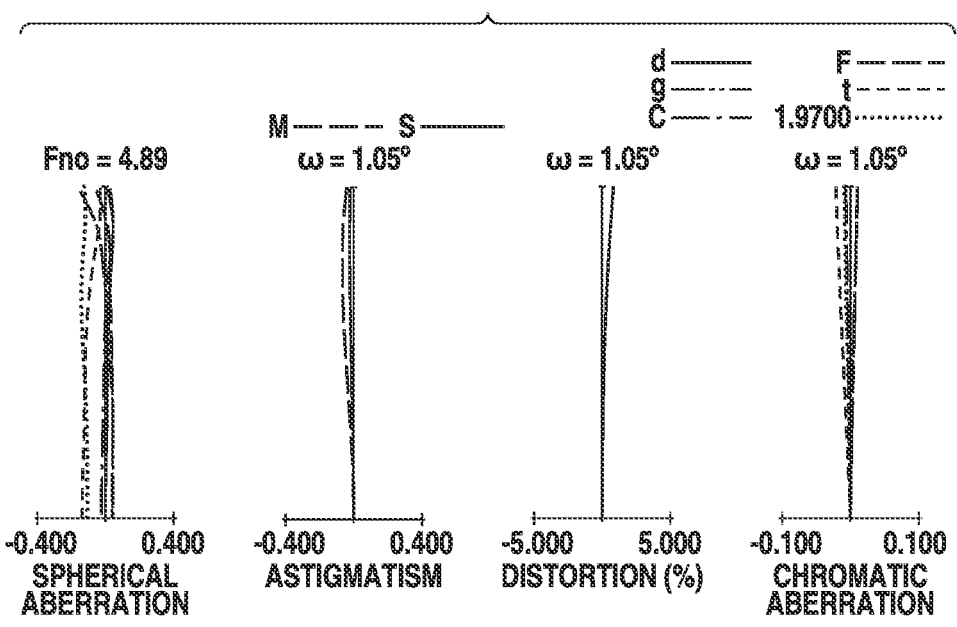

The first lens unit L1 has the first surface to the twelfth surface. The first lens subunit L1*a* has the first surface to the sixth surface, and includes one negative lens and two positive lenses. The second lens subunit L1*b* has the seventh surface to the tenth surface, and includes two positive lenses. The third lens subunit L1*c* has the eleventh surface and the twelfth surface, and includes one positive lens. The second lens unit L2 has the thirteenth surface and the fourteenth surface, and includes one negative lens the surface on the object side of which is aspheric. The third lens unit L3 has the fifteenth surface to the twentieth surface, and includes two positive lenses and two negative lenses. The fourth lens unit L4 has the twenty-first surface to the twenty-fifth surface, and includes one positive lens and two negative lenses. The fifth lens unit L5 has the twenty-sixth surface and the twenty-seventh surface, and includes one positive lens the surface on the object side of which is aspheric. The aperture stop SP has the twenty-eighth surface. The rear lens unit LR has the twenty-ninth surface to the forty-sixth surface, and includes five negative lenses and six positive lenses. FIGS. 10A, 10B, and 10C are diagrams illustrating aberrations of the zoom lens in a state of being set at focusing on infinite distance and at the wide-angle end, at the middle point, and at the telephoto end, respectively (with regard to the respective focal lengths, refer to the numerical example 5). Explanatory notes in FIGS. 10A, 10B, and 10C are similar to those described above with reference to FIGS. 2A, 2B, and 2C.

In the Example 5, the variable magnification unit V corresponds to the second lens unit L2 and the third lens unit L3. In the Example 5, the negative lens LN corresponds to a lens having the thirteenth surface and the fourteenth surface in the second lens unit L2. In the Example 5, the lens unit with the strongest negative refractive power in the plurality of lens units LM corresponds to the second lens unit L2. In the Example 5, the negative lens LNm with the strongest negative refractive power of the negative lenses LN corresponds to a lens having the thirteenth surface and the fourteenth surface in the second lens unit L2.

Values concerning the inequality (1) to the inequality (22) in the Example 5 are shown in Table 1. Furthermore, values of the respective variables included in the inequality (1) to the inequality (22) are shown in Table 2. Here, the mark "-" in Table 1 and Table 2 indicates that there is no numerical value concerned. According to the Example 5, it is possible to provide a zoom lens which satisfies the inequality (1) to the inequality (15), the inequality (18), the inequality (19), and the inequality (22) and is, therefore, in respect of a high optical performance relative to light in a range from visible light to SWIR light and a reduction in size thereof. Here, the zoom lens is attained by satisfying the inequality (1) to the inequality (3) and does not necessarily need to satisfy the inequality (4) to the inequality (15), the inequality (18), the inequality (19), and the inequality (22). Furthermore, in a case where at least any one of the inequality (4) to the inequality (15), the inequality (18), the inequality (19), and the inequality (22) is satisfied in addition to the inequality (1) to the inequality (3), a more conspicuous effect or an extraneous effect can be brought about as compared with the other cases. Furthermore, the effects brought about in a case where the respective inequalities are satisfied are as described above.

Example 6

Figure 11:
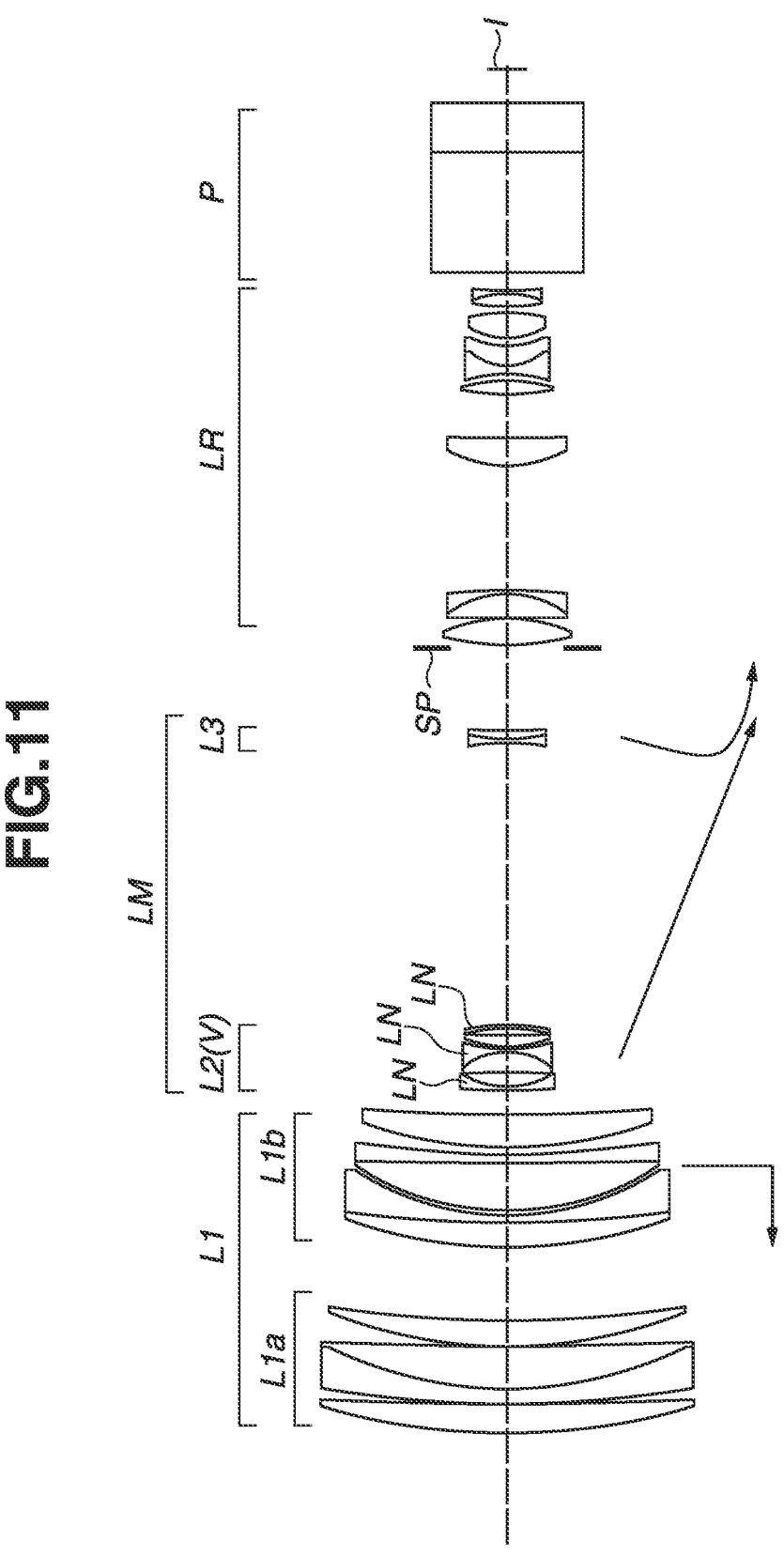
FIG. 11 is a sectional view of a zoom lens in a state of being set at focusing on infinite distance and at the wide-angle end according to an Example 6.

FIG. 11 is a sectional view of a zoom lens in a state of being set at focusing on infinite distance and at the wide-angle end according to the Example 6. Referring to FIG. 11, components of the zoom lens are described in order from an object side to an image side. The zoom lens includes a first lens unit L1 with positive refractive power, which does not move for zooming. The first lens unit L1 includes a first lens subunit L1a, which does not move for focusing. The first lens unit L1 further includes a second lens subunit L1b, which moves toward the object side for focusing from an infinite-distance object to a minimum-distance object. The zoom lens further includes a plurality of lens units LM, which moves in zooming. The plurality of lens units LM includes a second lens unit L2 with negative refractive power, which moves in zooming, and the plurality of lens units LM further includes a third lens unit L3 with negative refractive power, which moves in zooming. The second lens unit L2 moves monotonously toward the image side in zooming from the wide-angle end to the telephoto end. The third lens unit L3 first moves toward the object side and then moves toward the image side in the above-mentioned zooming. The zoom lens further includes an aperture stop SP, which does not move in connection with zooming. The zoom lens further includes a rear lens unit LR with positive refractive power, which does not move for zooming.

Figure 12A:
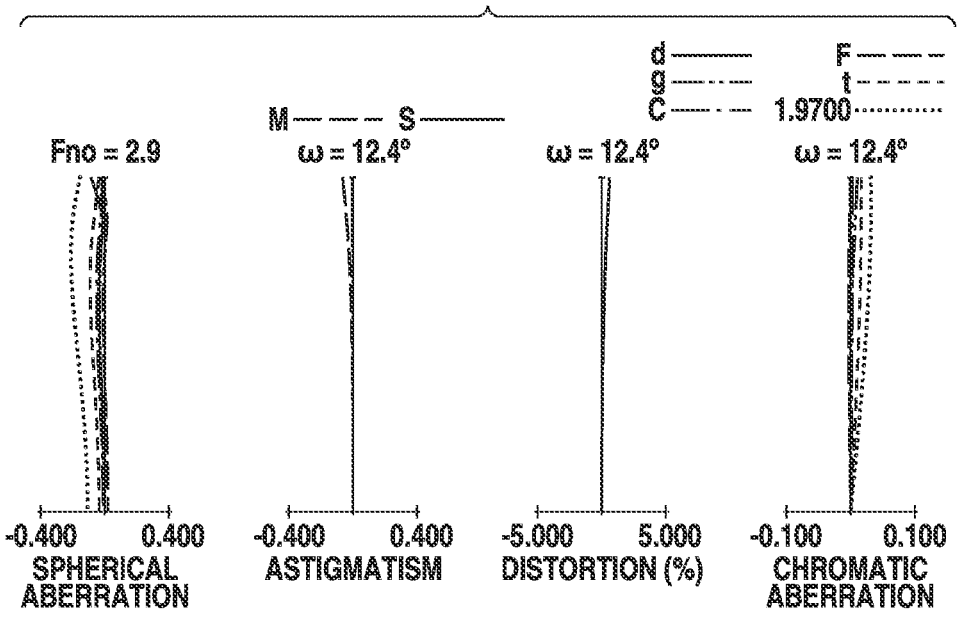
FIGS. 12A, 12B, and 12C are diagrams illustrating aber-rations of the zoom lens in a state of being set at focusing on infinite distance and at the wide-angle end, at the middle point, and at the telephoto end, respectively, according to the Example 6.
Figure 12B:
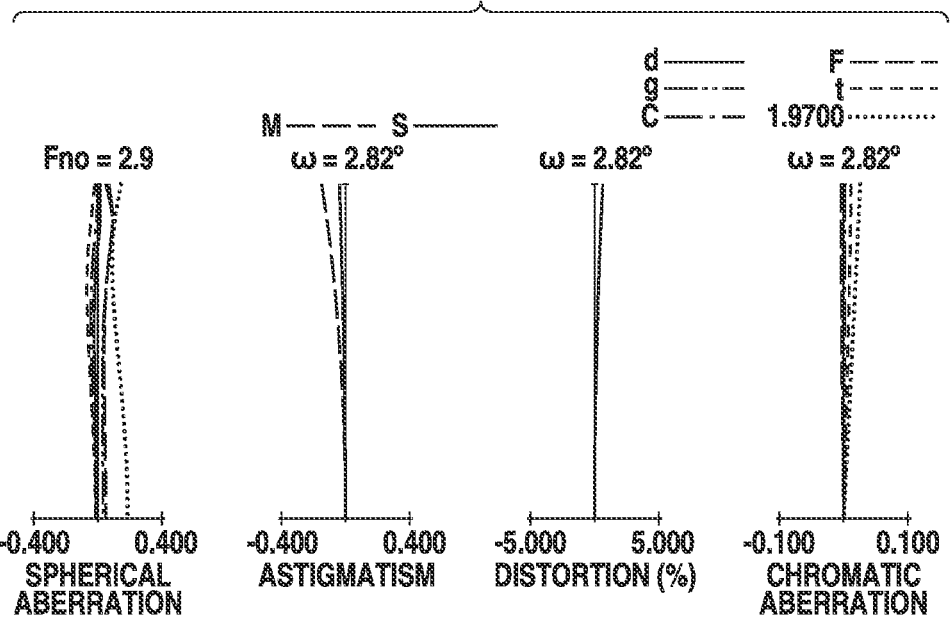
Figure 12C:
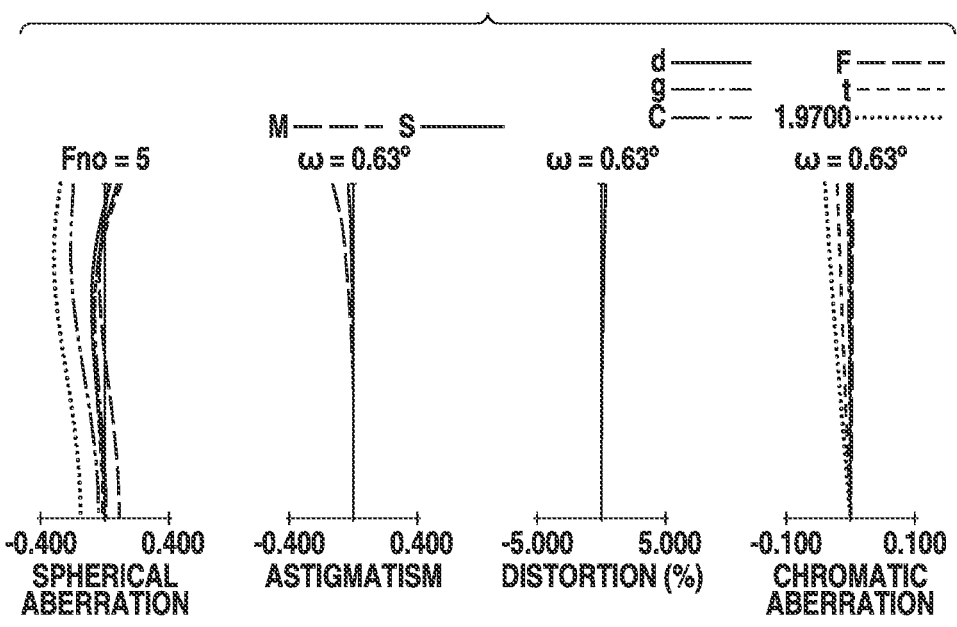

The first lens unit L1 has the first surface to the fifteenth surface. The first lens subunit L1a has the first surface to the seventh surface, and includes one negative lens and three positive lenses. The second lens subunit L1b has the eighth surface to the fifteenth surface, and includes two negative lenses and three positive lenses. The plurality of lens units LM includes the second lens unit L2 and the third lens unit L3. The second lens unit L2 has the sixteenth surface to the twenty-fourth surface, and includes three negative lenses and two positive lenses. The third lens unit L3 has the twenty-fifth surface to the twenty-seventh surface, and includes one negative lens and one positive lens. The aperture stop SP has the twenty-eighth surface. The rear lens unit LR has the twenty-ninth surface to the forty-fifth surface, and includes one positive lens the surface on the image side of which is aspheric, three negative lenses, and six positive lenses. FIGS. 12A, 12B, and 12C are diagrams illustrating aberrations of the zoom lens in a state of being set at focusing on infinite distance and at the wide-angle end, at the middle point, and at the telephoto end, respectively (with regard to the respective focal lengths, refer to the numerical example 6). Explanatory notes in FIGS. 12A, 12B, and 12C are similar to those described above with reference to FIGS. 2A, 2B, and 2C.

In the Example 6, the variable magnification unit V corresponds to the second lens unit L2. In the Example 6, the negative lens LN corresponds to a lens having the sixteenth surface and the seventeenth surface in the second lens unit L2, a lens having the nineteenth surface and the twentieth surface in the second lens unit L2, and a lens having the twenty-third surface and the twenty-fourth surface in the second lens unit L2. In the Example 6, the lens unit with the strongest negative refractive power in the plurality of lens units LM corresponds to the second lens unit L2. In the Example 6, the lens LNm with the strongest negative refractive power of the negative lenses LN corresponds to a lens having the nineteenth surface and the twentieth surface in the second lens unit L2.

Values concerning the inequality (1) to the inequality (22) in the Example 6 are shown in Table 1. Furthermore, values of the respective variables included in the inequality (1) to the inequality (22) are shown in Table 2. According to the Example 6, it is possible to provide a zoom lens which satisfies all of the inequality (1) to the inequality (22) and is, therefore, in respect of a high optical performance relative to light in a range from visible light to SWIR light and a reduction in size thereof. Here, the zoom lens is attained by satisfying the inequality (1) to the inequality (3) and does not necessarily need to satisfy the inequality (4) to the inequality (22). Furthermore, in a case where at least any one of the inequality (4) to the inequality (22) is satisfied in addition to the inequality (1) to the inequality (3), a more conspicuous effect or an extraneous effect can be brought about as compared with the other cases. Furthermore, the effects brought about in a case where the respective inequalities are satisfied are as described above.

Example 7

Figure 13:
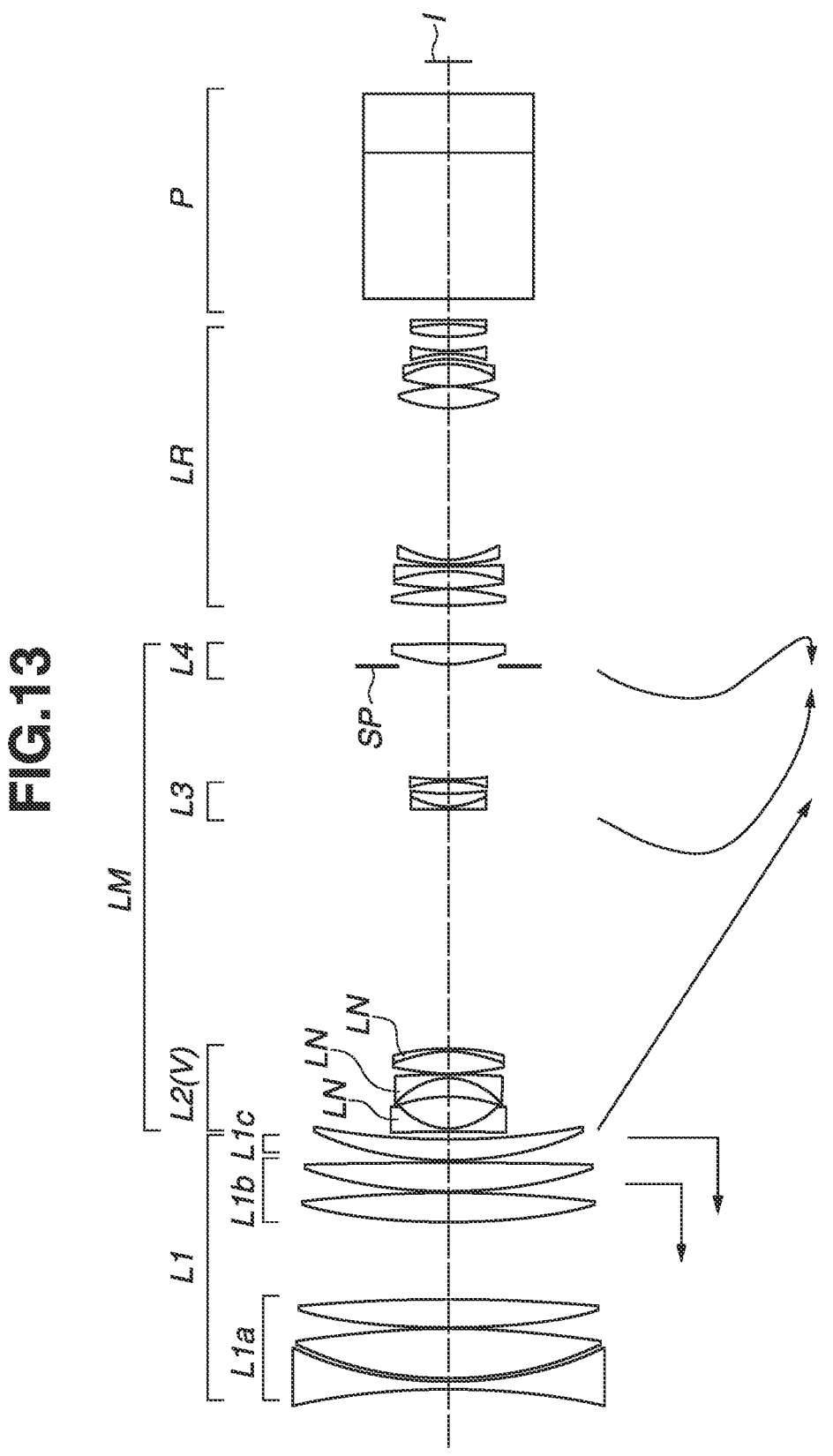
FIG. 13 is a sectional view of a zoom lens in a state of being set at focusing on infinite distance and at the wide-angle end according to an Example 7.

FIG. 13 is a sectional view of a zoom lens in a state of being set at focusing on infinite distance and at the wide-angle end according to the Example 7. Referring to FIG. 13, components of the zoom lens are described in order from an object side to an image side. The zoom lens includes a first lens unit L1 with positive refractive power, which does not move for zooming. The first lens unit L1 includes a first lens subunit L1*a*, which does not move for focusing. The first lens unit L1 further includes a second lens subunit L1*b*, which moves toward the object side for focusing from an infinite-distance object to a minimum-distance object. The first lens unit L1 further includes a third lens subunit L1*c*, which moves toward the object side with a locus different from that of the second lens subunit L1*b* for focusing from the infinite-distance object to the minimum-distance object. The zoom lens further includes a plurality of lens units LM, which moves in zooming. The plurality of lens units LM includes a second lens unit L2 with negative refractive power, which moves in zooming, a third lens unit L3 with negative refractive power, which moves in zooming, and a fourth lens unit LA with positive refractive power, which moves in zooming. The second lens unit L2 moves monotonously toward the image side in zooming from the wide-angle end to the telephoto end. The third lens unit L3 first moves toward the object side and then moves toward the image side in the above-mentioned zooming. The fourth lens unit L4 moves (for example, non-monotonously as illustrated in FIG. 13) in the above-mentioned zooming. The zoom lens further includes an aperture stop SP, which moves in zooming along with the fourth lens unit L4.

The zoom lens further includes a rear lens unit LR with positive refractive power, which does not move for zooming.

Figure 14A:
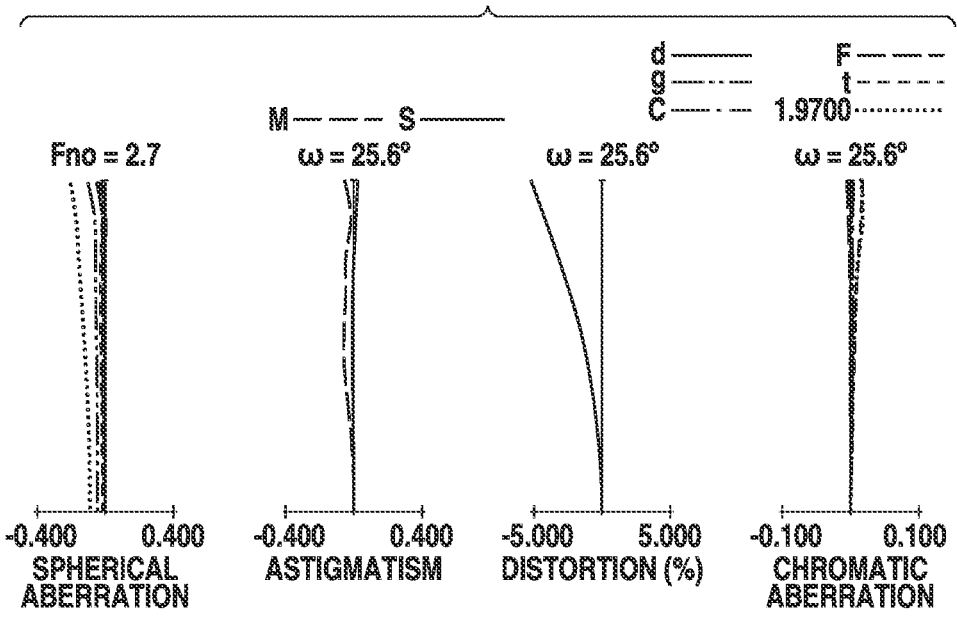
FIGS. 14A, 14B, and 14C are diagrams illustrating aberrations of the zoom lens in a state of being set at focusing on infinite distance and at the wide-angle end, at the middle point, and at the telephoto end, respectively, according to the Example 7.
Figure 14B:
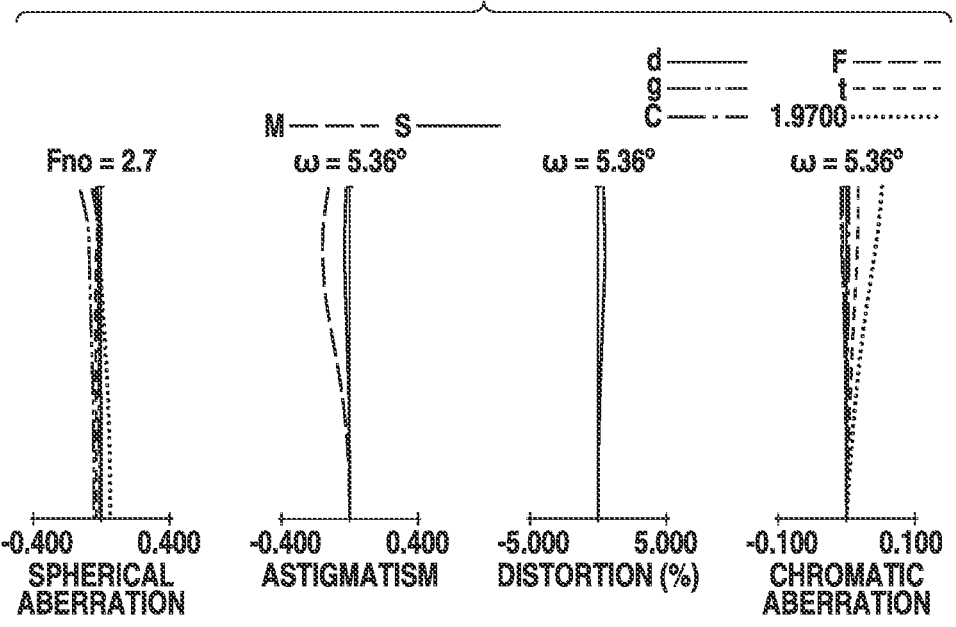
Figure 14C:
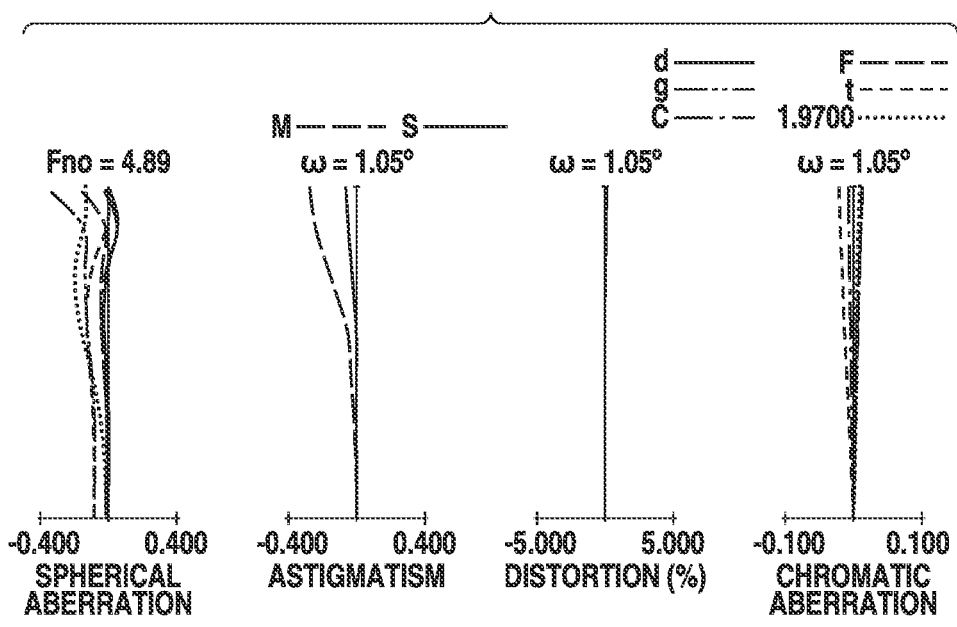

The first lens unit L1 has the first surface to the twelfth surface. The first lens subunit L1*a* has the first surface to the sixth surface, and includes one negative lens and two positive lenses. The second lens subunit L1*b* has the seventh surface to the tenth surface, and includes two positive lenses. The third lens subunit L1*c* has the eleventh surface and the twelfth surface, and includes one positive lens. The second lens unit L2 has the thirteenth surface to the twentieth surface, and includes one negative lens the surface on the object side of which is aspheric, two positive lenses, and two negative lenses. The third lens unit L3 has the twenty-first surface to the twenty-fifth surface, and includes one positive lens and two negative lenses. The aperture stop SP has the twenty-sixth surface. The fourth lens unit L4 has the twenty-seventh surface and the twenty-eighth surface, and includes one positive lens the surface on the object side of which is aspheric. The rear lens unit LR has the twenty-ninth surface to the forty-fifth surface, and includes five negative lenses and five positive lenses. FIGS. 14A, 14B, and 14C are diagrams illustrating aberrations of the zoom lens in a state of being set at focusing on infinite distance and at the wide-angle end, at the middle point, and at the telephoto end, respectively (with regard to the respective focal lengths, refer to the numerical example 7). Explanatory notes in FIGS. 14A, 14B, and 14C are similar to those described above with reference to FIGS. 2A, 2B, and 2C.

In the Example 7, the variable magnification unit V corresponds to the second lens unit L2. In the Example 7, the negative lens LN corresponds to a lens having the thirteenth surface and the fourteenth surface in the second lens unit L2, a lens having the sixteenth surface and the seventeenth surface in the second lens unit L2, and a lens having the nineteenth surface and the twentieth surface in the second lens unit L2. In the Example 7, the lens unit with the strongest negative refractive power in the plurality of lens units LM corresponds to the second lens unit L2. In the Example 7, the lens LNm with the strongest negative refractive power of the negative lenses LN corresponds to a lens having the thirteenth surface and the fourteenth surface in the second lens unit L2.

Values concerning the inequality (1) to the inequality (22) in the Example 7 are shown in Table 1. Furthermore, values of the respective variables included in the inequality (1) to the inequality (22) are shown in Table 2. According to the Example 7, it is possible to provide a zoom lens which satisfies all of the inequality (1) to the inequality (22) and is, therefore, in respect of a high optical performance relative to light in a range from visible light to SWIR light and a reduction in size thereof. Here, the zoom lens is attained by satisfying the inequality (1) to the inequality (3) and does not necessarily need to satisfy the inequality (4) to the inequality (22). Furthermore, in a case where at least any one of the inequality (4) to the inequality (22) is satisfied in addition to the inequality (1) to the inequality (3), a more conspicuous effect or an extraneous effect can be brought about as compared with the other cases. Furthermore, the effects brought about in a case where the respective inequalities are satisfied are as described above.

Example 8

Figure 15:
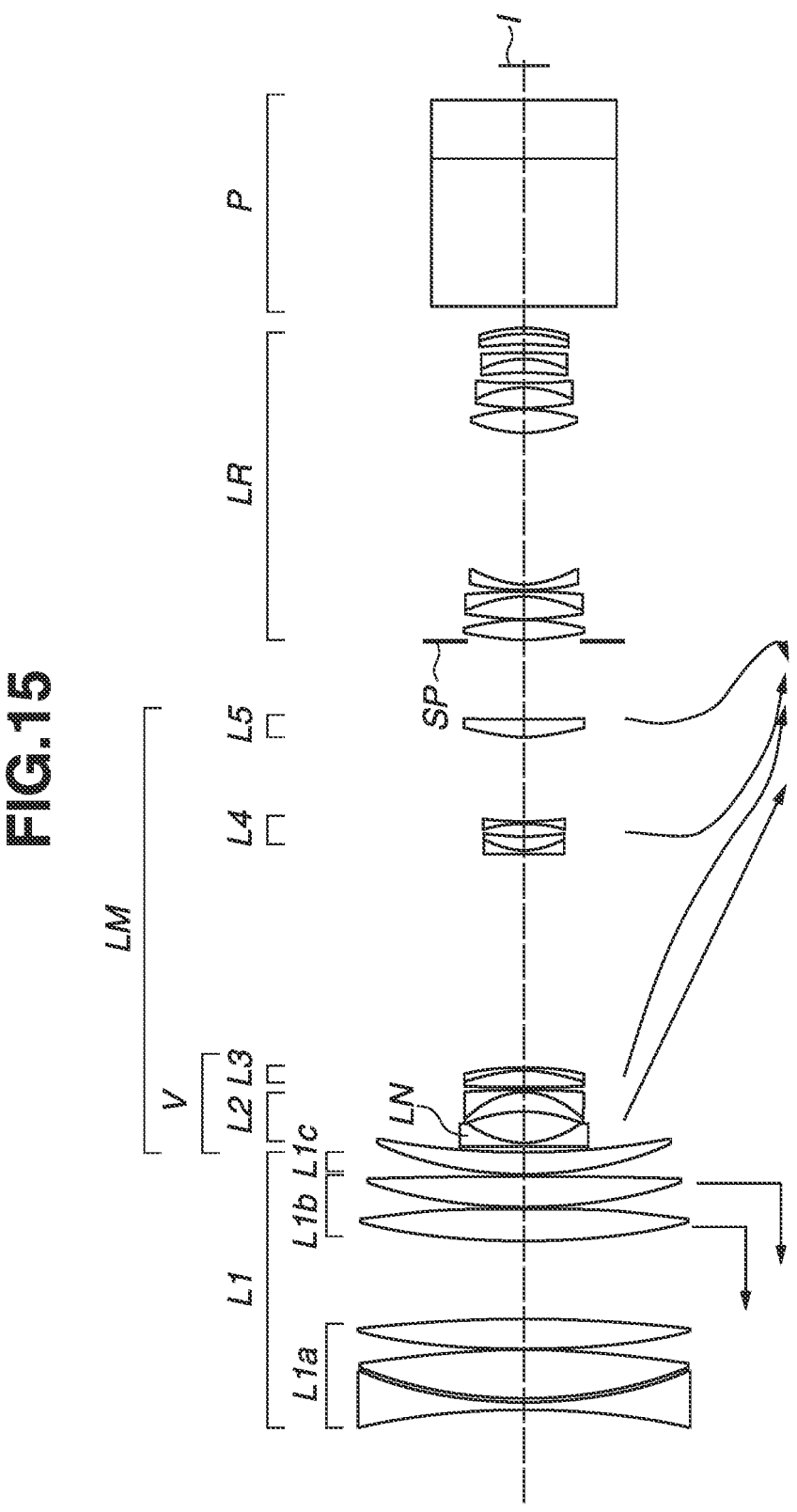
FIG. 15 is a sectional view of a zoom lens in a state of being set at focusing on infinite distance and at the wide-angle end according to an Example 8.

FIG. 15 is a sectional view of a zoom lens in a state of being set at focusing on infinite distance and at the wide-angle end according to the Example 8. Referring to FIG. 15, components of the zoom lens are described in order from an object side to an image side. The zoom lens includes a first lens unit L1 with positive refractive power, which does not move for zooming. The first lens unit L1 includes a first lens subunit L1*a*, which does not move for focusing. The first lens unit L1 further includes a second lens subunit L1*b*, which moves toward the object side for focusing from an infinite-distance object to a minimum-distance object. The first lens unit L1 further includes a third lens subunit L1*c*, which moves toward the object side with a locus different from that of the second lens subunit L1*b* for focusing from the infinite-distance object to the minimum-distance object. The zoom lens further includes a plurality of lens units LM, which moves in zooming. The plurality of lens units LM includes a second lens unit L2 with negative refractive power, which moves in zooming, a third lens unit L3 with positive refractive power, which moves in zooming, a fourth lens unit L4 with negative refractive power, which moves in zooming, and a fifth lens unit L5 with positive refractive power, which moves in zooming. The second lens unit L2 moves monotonously toward the image side in zooming from the wide-angle end to the telephoto end. The third lens unit L3 moves monotonously toward the image side with a movement locus different from that of the second lens unit L2 in the above-mentioned zooming. The fourth lens unit L4 first moves toward the object side and then moves toward the image side in the above-mentioned zooming. The fifth lens unit L5 moves (for example, non-monotonously as illustrated in FIG. 15) in the above-mentioned zooming. The zoom lens further includes an aperture stop SP, which does not move in connection with zooming. The zoom lens further includes a rear lens unit LR with positive refractive power, which does not move for zooming.

Figure 16A:
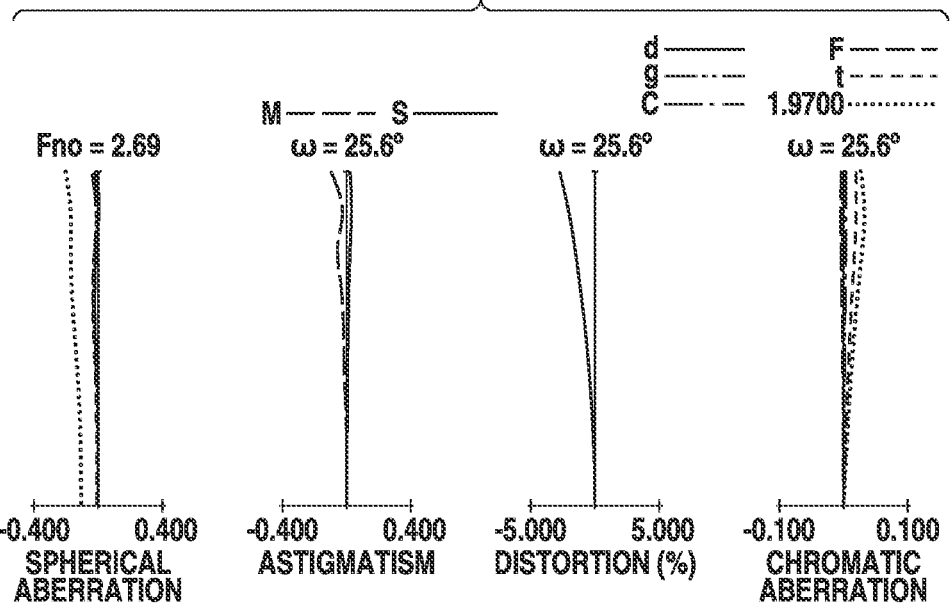
FIGS. 16A, 16B, and 16C are diagrams illustrating aberrations of the zoom lens in a state of being set at focusing on infinite distance and at the wide-angle end, at the middle point, and at the telephoto end, respectively, according to the Example 8.
Figure 16B:
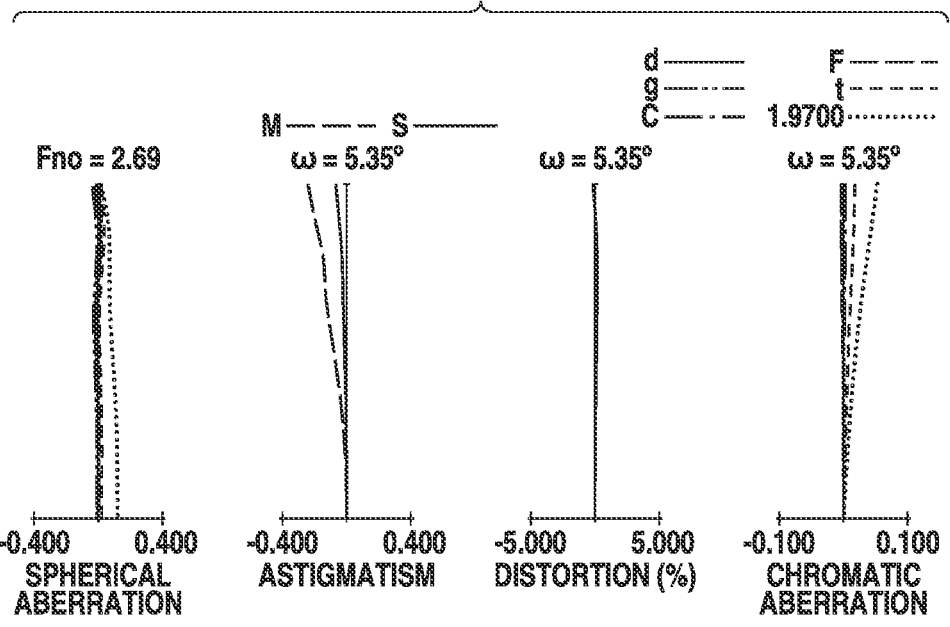
Figure 16C:
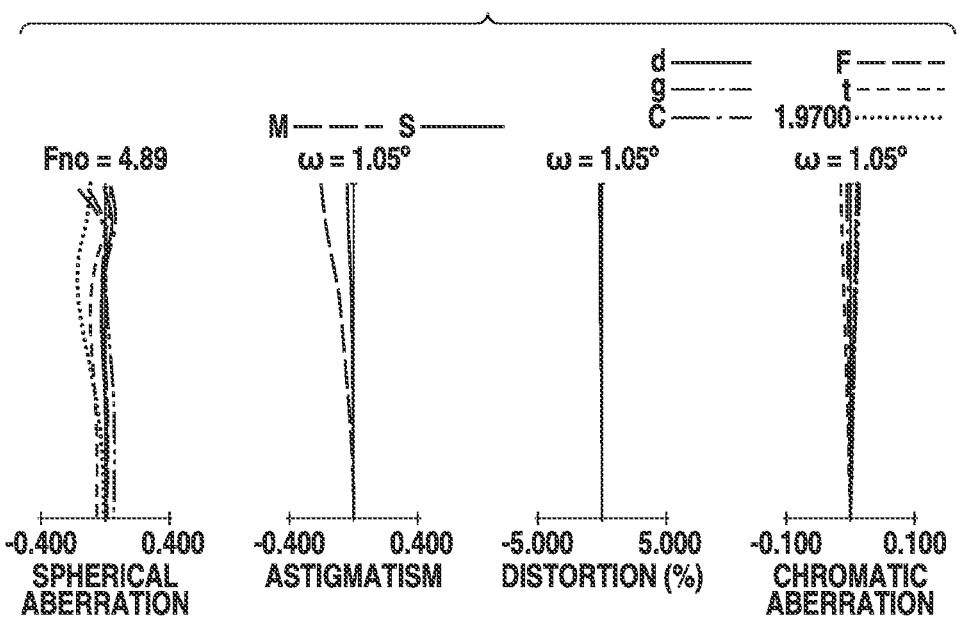

The first lens unit L1 has the first surface to the twelfth surface. The first lens subunit L1a has the first surface to the sixth surface, and includes one negative lens and two positive lenses. The second lens subunit L1b has the seventh surface to the tenth surface, and includes two positive lenses. The third lens subunit L1c has the eleventh surface and the twelfth surface, and includes one positive lens. The second lens unit L2 has the thirteenth surface to the seventeenth surface, and includes one negative lens the surface on the object side of which is aspheric, a positive lens, and a negative lens. The third lens unit L3 has the eighteenth surface to the twentieth surface, and includes one positive lens and one negative lens. The fourth lens unit L4 has the twenty-first surface to the twenty-fifth surface, and includes one positive lens and two negative lenses. The fifth lens unit L5 has the twenty-sixth surface and the twenty-seventh surface, and includes one positive lens the surface on the object side of which is aspheric. The aperture stop SP has the twenty-eighth surface. The rear lens unit LR has the twenty-ninth surface to the forty-sixth surface, and includes five negative lenses and six positive lenses. FIGS. 16A, 16B, and 16C are diagrams illustrating aberrations of the zoom lens in a state of being set at focusing on infinite distance and at the wide-angle end, at the middle point, and at the telephoto end, respectively (with regard to the respective focal lengths, refer to the numerical example 8). Explanatory notes in FIGS. 16A, 16B, and 16C are similar to those described above with reference to FIGS. 2A, 2B, and 2C.

In the Example 8, the variable magnification unit V corresponds to the second lens unit L2 and the third lens unit L3. In the Example 8, the negative lens LN corresponds to a lens having the thirteenth surface and the fourteenth surface in the second lens unit L2 and a lens having the nineteenth surface and the twentieth surface in the third lens unit L3. In the Example 8, the lens unit with the strongest negative refractive power in the plurality of lens units LM corresponds to the second lens unit L2. In the Example 8, the negative lens LNm with the strongest negative refractive power of the negative lenses LN corresponds to a lens having the thirteenth surface and the fourteenth surface in the second lens unit L2.

Values concerning the inequality (1) to the inequality (22) in the Example 8 are shown in Table 1. Furthermore, values of the respective variables included in the inequality (1) to the inequality (22) are shown in Table 2. According to the Example 8, it is possible to provide a zoom lens which satisfies all of the inequality (1) to the inequality (22) and is, therefore, in respect of a high optical performance relative to light in a range from visible light to SWIR light and a reduction in size thereof. Here, the zoom lens is attained by satisfying the inequality (1) to the inequality (3) and does not necessarily need to satisfy the inequality (4) to the inequality (22). Furthermore, in a case where at least any one of the inequality (4) to the inequality (22) is satisfied in addition to the inequality (1) to the inequality (3), a more conspicuous effect or an extraneous effect can be brought about as compared with the other cases. Furthermore, the effects brought about in a case where the respective inequalities are satisfied are as described above.

Furthermore, in the Example 1 to the Example 8, the rear lens unit or a part thereof (a lens subunit or subunits thereof) is configured not to move for other than focusing (changing of object distance), but can be configured to move for other than focusing. Even with such a configuration employed, effects described above can be attained, and, moreover, such an alteration is easy for any person skilled in the art. For example, in the Example 1, portions corresponding to the thirty-sixth surface to the forty-seventh surface in the rear lens unit LR can be configured to move. Since an approximately a focal light flux falls on the thirty-sixth surface from the object side, even if such portions are configured to move, optical characteristics other than back focal distance become almost unvarying. Therefore, such movement enables correcting (compensating for) a change in focus associated with a change in state of a zoom lens concerning, for example, zooming, focusing, an aperture stop, temperature, atmospheric pressure, orientation, or insertion or removal of a variable magnification optical system (such as an extender).

Next, numerical examples are described. The following are details of numerical values employed in the respective numerical examples. In each numerical example, "r" denotes the radius of curvature of each surface, "d" denotes a surface interval between every adjacent surfaces, "nd" denotes an absolute refractive index at 1 atmosphere (atm) regarding d-line of the Fraunhofer lines, and "vd" denotes an Abbe number regarding d-line (based on d-line). The "half angle of view" @ is expressed by an equation of "@=arctan(Y/fw)", where 2Y denotes the diagonal image size of a camera for which the zoom lens is used and fw denotes the focal length of the zoom lens at the wide-angle end. The "maximum image height" is equivalent to half Y (for example, 5.50 mm) of the diagonal image size 2Y (for example, 11.00 mm). BF denotes the back focal distance (length reduced to air). The last three surfaces are surfaces of a glass block such as a filter belonging to the camera. When refractive indices regarding F-line, d-line, C-line, and t-line of the Fraunhofer lines are denoted by nF, nd, nC, and nt, respectively, the Abbe number vd regarding d-line and the partial dispersion ratio θCt regarding C-line and t-line are expressed as follows. These definitions are similar to those generally used.

$$vd = (nd-1)/(nF-nC), \text{ and}$$

$$\theta Ct = (nC-nt)/(nF-nC).$$

The shape of an aspheric surface is expressed with the X-axis taken in the optical axis direction, the H-axis taken in a direction perpendicular to the optical axis direction, and the direction of travel of light regarded as plus. "R" denotes a paraxial radius of curvature, "k" denotes a conic constant, and A3 to A16 denote respective aspheric surface coefficients. The shape of an aspheric surface (the amount of deviation from a reference spherical surface in the optical axis direction) is expressed by the following equation. Furthermore, "e-Z" means "$\times 10^{-Z}$". Moreover, the mark "*" added to the right of a surface number indicates that the surface concerned is an aspheric surface.

$$X = \frac{H^2/R}{1 + \sqrt{1 - (1+k)(H/R)^2}} + A4H^4 +$$

$$A6H^6 + A8H^8 + A10H^{10} + A12H^{12} + A14H^{14} +$$

$$A16H^{16} + A3H^3 + A5H^5 + A7H^7 + A9H^9 + A11H^{11} + A13H^{13} + A15H^{15}.$$

Numerical Example 1

| | | Unit mm Surface Data | | | |
|---|---|---|---|---|---|
| Surface-Number | r | d | nd | vd | θct |
| 1 | 149.055 | 10.71 | 1.48749 | 70.2 | 0.8924 |
| 2 | −16894.196 | 0.19 | | | |
| 3 | 282.981 | 4.00 | 1.69680 | 55.5 | 0.8330 |
| 4 | 92.069 | 12.11 | 1.43875 | 94.9 | 0.8373 |
| 5 | 407.576 | 0.14 | | | |
| 6 | 183.529 | 4.70 | 1.43387 | 95.1 | 0.8092 |
| 7 | 329.164 | 17.08 | | | |
| 8 | 178.056 | 10.07 | 1.43875 | 94.9 | 0.8373 |
| 9 | −327.739 | 1.40 | 1.75500 | 52.3 | 0.8092 |
| 10 | 328.276 | 0.15 | | | |
| 11 | 155.233 | 8.36 | 1.43875 | 94.9 | 0.8373 |
| 12 | −837.452 | 1.40 | 1.64000 | 60.1 | 0.8645 |
| 13 | 318.431 | 2.19 | | | |
| 14 | 149.307 | 9.34 | 1.59522 | 67.7 | 0.7953 |
| 15 | 14023.753 | (variable) | | | |
| 16 | 102.708 | 0.90 | 1.75106 | 43.1 | 0.7097 |
| 17 | 22.063 | 4.08 | | | |
| 18 | −892.708 | 5.35 | 1.73800 | 32.3 | 0.7154 |
| 19 | −19.085 | 0.80 | 1.69930 | 51.1 | 0.7593 |
| 20 | 44.172 | 0.50 | | | |
| 21 | 29.227 | 3.07 | 1.67300 | 38.3 | 0.7481 |
| 22 | 185.970 | 1.96 | | | |
| 23 | −37.284 | 0.80 | 1.59522 | 67.7 | 0.7953 |
| 24 | −140.963 | (variable) | | | |
| 25 | −43.847 | 0.80 | 1.71700 | 47.9 | 0.7629 |
| 26 | 39.590 | 2.52 | 1.84666 | 23.8 | 0.6614 |
| 27 | 200.341 | (variable) | | | |
| 28 (stop) | ∞ | 0.50 | | | |
| 29 | 57.569 | 7.40 | 1.59522 | 67.7 | 0.7953 |
| 30* | −47.593 | 0.09 | | | |
| 31 | 55.727 | 3.73 | 1.43875 | 94.7 | 0.8410 |
| 32 | −5550.259 | 0.11 | | | |
| 33 | 105.240 | 6.21 | 1.43875 | 94.7 | 0.8410 |
| 34 | −30.625 | 0.90 | 1.80610 | 40.9 | 0.7483 |
| 35 | 119.218 | 34.39 | | | |
| 36 | 62.288 | 2.84 | 1.43875 | 94.7 | 0.8410 |
| 37 | −329.012 | 0.18 | | | |
| 38 | 107.801 | 3.58 | 1.43875 | 94.7 | 0.8410 |
| 39 | −50.112 | 6.62 | | | |
| 40 | −234.311 | 0.80 | 1.65160 | 58.5 | 0.8525 |
| 41 | 12.128 | 3.87 | 1.60342 | 38.0 | 0.7353 |
| 42 | 18.638 | 0.84 | | | |
| 43 | 17.657 | 4.06 | 1.56732 | 42.8 | 0.7589 |
| 44 | −368.192 | 1.57 | | | |
| 45 | 44.805 | 3.60 | 1.54072 | 47.2 | 0.7766 |
| 46 | −24.930 | 0.80 | 1.85026 | 32.3 | 0.6942 |
| 47 | 77.632 | 5.00 | | | |
| 48 | ∞ | 33.00 | 1.60859 | 46.4 | 0.7534 |
| 49 | ∞ | 13.20 | 1.51680 | 64.2 | 0.8698 |
| 50 | ∞ | 7.40 | | | |
| Image plane | ∞ | | | | |

Aspheric Surface Data
Thirtieth Surface k = 0.00000e+00 A4 = 7.16035e−07 A6 = −3.49782e−10
A8 = −1.85840e−12 A10 = 1.52258e−15

Various Pieces of Data

| Zoom Ratio | 20.00 | | |
|---|---|---|---|
| | Wide-Angle | Middle | Telephoto |
| Focal Length | 25.00 | 111.80 | 500.00 |
| F-number | 2.90 | 2.90 | 5.00 |
| Half Angle of View | 12.41 | 2.82 | 0.63 |

-continued

| | Wide-Angle | Middle | Telephoto |
|---|---|---|---|
| Maximum Image Height | 5.50 | 5.50 | 5.50 |
| Total Lens Length | 350.00 | 350.00 | 350.00 |
| BF | 7.40 | 7.40 | 7.40 |
| d15 | 8.95 | 68.36 | 93.17 |
| d24 | 76.04 | 11.02 | 11.57 |
| d27 | 21.70 | 27.31 | 1.95 |
| d50 | 7.40 | 7.40 | 7.40 |

Lens Unit Data

| Unit | Beginning Surface | Focal length |
|---|---|---|
| 1 | 1 | 163.84 |
| 2 | 16 | 28.11 |
| 3 | 25 | −57.52 |
| 4 | 29 | 40.69 |

Numerical Example 2

| | | Unit mm Surface Data | | | |
|---|---|---|---|---|---|
| Surface-Number | r | d | nd | vd | θct |
| 1 | 205.860 | 3.00 | 1.75500 | 52.3 | 0.8092 |
| 2 | 141.110 | 3.38 | | | |
| 3 | 162.200 | 13.67 | 1.43387 | 95.1 | 0.8092 |
| 4 | −696.139 | 0.47 | | | |
| 5 | −8368.031 | 3.00 | 1.75500 | 52.3 | 0.8092 |
| 6 | 149.934 | 1.25 | | | |
| 7 | 143.299 | 12.75 | 1.43387 | 95.1 | 0.8092 |
| 8 | −24298.691 | 13.35 | | | |
| 9 | 179.863 | 8.89 | 1.43387 | 95.1 | 0.8092 |
| 10 | 1161.166 | 0.20 | | | |
| 11 | 164.642 | 11.77 | 1.43387 | 95.1 | 0.8092 |
| 12 | −1365.806 | 0.48 | | | |
| 13 | 114.265 | 6.27 | 1.43387 | 95.1 | 0.8092 |
| 14 | 181.786 | (variable) | | | |
| 15 | 176.724 | 1.40 | 1.69930 | 51.1 | 0.7593 |
| 16 | 35.603 | 1.89 | | | |
| 17 | 44.882 | 12.04 | 1.61310 | 44.4 | 0.8010 |
| 18 | −38.744 | 1.30 | 1.59522 | 67.7 | 0.7953 |
| 19 | 23.172 | 5.01 | | | |
| 20 | 53.667 | 1.30 | 1.63858 | 55.2 | 0.7865 |
| 21 | 30.893 | 6.45 | 1.67300 | 38.3 | 0.7481 |
| 22 | −112.312 | 2.91 | | | |
| 23 | −33.250 | 1.20 | 1.59522 | 67.7 | 0.7953 |
| 24* | 89.826 | (variable) | | | |
| 25 | −244.613 | 1.00 | 1.69930 | 51.1 | 0.7593 |
| 26 | 26.463 | 3.02 | 1.74951 | 35.3 | 0.7308 |
| 27 | 148.787 | 2.45 | | | |
| 28 | −41.792 | 1.00 | 1.59522 | 67.7 | 0.7953 |
| 29 | 442.162 | (variable) | | | |
| 30* | 52.312 | 6.45 | 1.59522 | 67.7 | 0.7953 |
| 31 | −83.486 | (variable) | | | |
| 32 (stop) | ∞ | 0.30 | | | |
| 33 | 65.297 | 3.55 | 1.43875 | 94.9 | 0.8373 |
| 34 | −248.716 | 0.20 | | | |
| 35 | 176.843 | 5.81 | 1.43875 | 94.9 | 0.8373 |
| 36 | −43.462 | 1.30 | 1.64000 | 60.1 | 0.8645 |
| 37 | −134.169 | 0.20 | | | |
| 38 | 72.500 | 1.30 | 1.64000 | 60.1 | 0.8645 |
| 39 | 29.388 | 33.97 | | | |
| 40 | 21.422 | 7.08 | 1.43875 | 94.9 | 0.8373 |
| 41 | −52.222 | 0.20 | | | |
| 42 | 45.862 | 6.15 | 1.43875 | 94.9 | 0.8373 |
| 43 | −22.593 | 1.20 | 1.65160 | 58.5 | 0.8270 |

| | r | d | nd | vd | θct |
|---|---|---|---|---|---|
| 44 | 15.929 | 2.15 | | | |
| 45 | 22.421 | 4.13 | 1.51633 | 64.1 | 0.8687 |
| 46 | −34.989 | 1.20 | 2.00100 | 29.1 | 0.6838 |
| 47 | 42.073 | 7.53 | | | |
| 48 | 47.198 | 4.70 | 1.78472 | 25.7 | 0.6702 |
| 49 | −74.967 | 1.20 | 1.85920 | 33.0 | 0.6855 |
| 50 | −60.279 | 4.87 | | | |
| 51 | ∞ | 33.00 | 1.60859 | 46.4 | 0.7534 |
| 52 | ∞ | 13.20 | 1.51680 | 64.2 | 0.8698 |
| 53 | ∞ | 7.40 | | | |
| Image plane | ∞ | | | | |

Aspheric Surface Data

Twenty-fourth Surface $k = 0.00000e+00$ $A4 = −1.39031e−05$ $A6 = 1.23886e−09$
$A8 = 9.99239e−11$ $A10 = −2.79043e−13$ $A12 = 5.26650e−16$
$A3 = 2.82395e−06$ $A5 = −7.46597e−09$ $A7 = −9.43023e−10$ Thirtieth Surface $k = −5.07198e+00$ $A4 = 9.50981e−07$ $A6 = −1.46718e−09$
$A8 = 4.78513e−13$ $A10 = 3.76242e−15$ $A12 = −6.56234e−18$ Various Pieces of Data Zoom Ratio 40.00

| | Wide-Angle | Middle | Telephoto |
|---|---|---|---|
| Focal Length | 14.00 | 88.54 | 560.00 |
| F-number | 2.80 | 2.80 | 5.10 |
| Half Angle of View | 21.45 | 3.55 | 0.56 |
| Maximum Image Height | 5.50 | 5.50 | 5.50 |
| Total Lens Length | 400.00 | 400.00 | 400.00 |
| BF | 7.40 | 7.40 | 7.40 |
| d14 | 1.68 | 87.59 | 114.17 |
| d24 | 90.41 | 11.68 | 8.79 |
| d29 | 26.15 | 31.09 | 1.94 |
| d31 | 15.22 | 3.10 | 8.55 |
| d53 | 7.40 | 7.40 | 7.40 |

Lens Unit Data

| Unit | Beginning Surface | Focal length |
|---|---|---|
| 1 | 1 | 167.49 |
| 2 | 15 | −27.85 |
| 3 | 25 | −45.66 |
| 4 | 30 | 55.01 |
| 5 | 33 | 83.75 |

Numerical Example 3

Unit mm
Surface Data

| Surface-Number | r | d | nd | vd | θct |
|---|---|---|---|---|---|
| 1 | 200.145 | 19.16 | 1.43387 | 95.1 | 0.8092 |
| 2 | −363.568 | 7.89 | | | |
| 3 | −448.706 | 3.00 | 1.75500 | 52.3 | 0.8092 |
| 4 | 5218.354 | 0.40 | | | |
| 5 | 197.361 | 3.00 | 1.69680 | 55.5 | 0.8330 |
| 6 | 113.608 | 5.84 | | | |
| 7 | 116.289 | | 1.43875 | 94.9 | 0.8373 |
| 8 | 1290.516 | 0.40 | | | |
| 9 | 249.182 | 7.29 | 1.43387 | 95.1 | 0.8092 |
| 10 | 753.244 (variable) | | | | |

| | r | d | nd | vd | θct |
|---|---|---|---|---|---|
| 11 | −625.144 | 1.50 | 1.59522 | 67.7 | 0.7953 |
| 12 | 99.991 | 1.33 | | | |
| 13 | 165.266 | 1.50 | 1.69930 | 51.1 | 0.7593 |
| 14 | 57.402 | 3.87 | | | |
| 15 | 661.966 | 11.10 | 1.74951 | 35.3 | 0.7308 |
| 16 | −28.033 | 1.50 | 1.75106 | 43.1 | 0.7097 |
| 17 | −724.442 | 1.81 | | | |
| 18 | −104.405 | 1.50 | 1.49700 | 81.5 | 0.8258 |
| 19 | 38.825 | 6.12 | 1.61340 | 44.3 | 0.7825 |
| 20 | 287.393 | 2.12 | | | |
| 21 | −129.866 | 1.50 | 1.69930 | 51.1 | 0.7593 |
| 22 | 524.710 (variable) | | | | |
| 23 | 87.668 | 5.61 | 1.43875 | 94.9 | 0.8373 |
| 24 | −106.108 | 0.15 | | | |
| 25 | 47.669 | 1.00 | 1.75500 | 52.3 | 0.8092 |
| 26 | 39.815 | 5.65 | 1.43875 | 94.9 | 0.8373 |
| 27 | 227.324 | 3.24 | | | |
| 28 | 71.788 | 1.00 | 1.75500 | 52.3 | 0.8092 |
| 29 | 41.978 | 1.82 | | | |
| 30 | 68.929 | 6.56 | 1.59522 | 67.7 | 0.7953 |
| 31 | −55.032 | 1.00 | 1.75500 | 52.3 | 0.8092 |
| 32 | 596.629 (variable) | | | | |
| 33 (stop) | ∞ | 2.69 | | | |
| 34 | −58.820 | 0.80 | 1.69930 | 51.1 | 0.7593 |
| 35 | −103.684 | 0.67 | | | |
| 36 | 67.895 | 2.53 | 1.85478 | 24.8 | 0.6739 |
| 37 | 204.847 | 0.15 | | | |
| 38 | 98.539 | 2.00 | 1.43875 | 94.9 | 0.8373 |
| 39 | 181.733 | 0.15 | | | |
| 40 | 30.221 | 3.31 | 1.43875 | 94.9 | 0.8373 |
| 41 | 148.416 | 2.19 | | | |
| 42 | 721.103 | 1.93 | 1.83481 | 42.7 | 0.7533 |
| 43 | −65.197 | 0.75 | 1.73400 | 51.5 | 0.8067 |
| 44 | 29.158 | 7.59 | | | |
| 45 | 99.096 | 0.70 | 2.05090 | 26.9 | 0.6726 |
| 46 | 32.244 | 11.55 | | | |
| 47 | 972.991 | 2.66 | 1.72916 | 54.7 | 0.8244 |
| 48 | −32.990 | 10.00 | | | |
| 49 | ∞ | 33.00 | 1.60859 | 46.4 | 0.7534 |
| 50 | ∞ | 13.20 | 1.51633 | 64.2 | 0.8676 |
| 51 | ∞ | 7.40 | | | |
| Image plane | ∞ | | | | |

Various Pieces of Data

Zoom Ratio 57.00

| | Wide-Angle | Middle | Telephoto |
|---|---|---|---|
| Focal Length | 15.00 | 142.30 | 855.00 |
| F-number | 3.00 | 3.43 | 6.60 |
| Half Angle of View | 20.14 | 2.21 | 0.37 |
| Maximum Image Height | 5.50 | 5.50 | 5.50 |
| Total Lens Length | 517.40 | 517.40 | 517.40 |
| BF | 7.40 | 7.40 | 7.40 |
| d10 | 1.75 | 148.55 | 185.06 |
| d22 | 285.74 | 102.70 | 1.48 |
| d32 | 2.22 | 38.46 | 103.17 |
| d51 | 7.40 | 7.40 | 7.40 |

Lens Unit Data

| Unit | Beginning Surface | Focal length |
|---|---|---|
| 1 | 1 | 286.02 |
| 2 | 11 | −38.26 |
| 3 | 23 | 76.84 |
| 4 | 34 | 209.16 |

Numerical Example 4

| Unit mm | | | | |
|---|---|---|---|---|
| Surface Data | | | | |
| Surface-Number | r | d | nd | vd | θct |
| 1 | 726.264 | 6.00 | 1.75500 | 52.3 | 0.8092 |
| 2 | 278.729 | 2.23 | | | |
| 3 | 277.824 | 28.23 | 1.43387 | 95.1 | 0.8092 |
| 4 | −573.275 | 3.81 | | | |
| 5 | −798.431 | 6.00 | 1.72916 | 54.7 | 0.8244 |
| 6 | 468.971 | 1.00 | | | |
| 7 | 419.612 | 21.72 | 1.43387 | 95.1 | 0.8092 |
| 8 | −598.982 | 30.81 | | | |
| 9 | 312.689 | 22.46 | 1.43387 | 95.1 | 0.8092 |
| 10 | −1808.073 | 0.25 | | | |
| 11 | 308.097 | 13.75 | 1.43387 | 95.1 | 0.8092 |
| 12 | 1020.309 | 4.52 | | | |
| 13 | 179.222 | 12.24 | 1.43875 | 94.7 | 0.8410 |
| 14 | 286.822 | (variable) | | | |
| 15 | −651.200 | 1.40 | 1.69930 | 51.1 | 0.7593 |
| 16 | 35.918 | 4.27 | | | |
| 17 | 55.389 | 14.46 | 1.61310 | 44.4 | 0.8010 |
| 18 | −32.695 | 1.30 | 1.59522 | 67.7 | 0.7953 |
| 19 | 40.943 | 4.57 | | | |
| 20 | 71.959 | 1.30 | 1.63858 | 55.2 | 0.7865 |
| 21 | 46.624 | 6.82 | 1.67300 | 38.3 | 0.7481 |
| 22 | −1545.600 | 2.59 | | | |
| 23 | −87.208 | 1.20 | 1.59522 | 67.7 | 0.7953 |
| 24* | 111.316 | (variable) | | | |
| 25 | 86.468 | 9.40 | 1.59522 | 67.7 | 0.7953 |
| 26* | −1557.577 | 5.64 | | | |
| 27 | 110.201 | 10.86 | 1.43875 | 94.9 | 0.8373 |
| 28 | −167.754 | 0.47 | | | |
| 29 | −537.418 | 2.60 | 1.61310 | 44.4 | 0.8010 |
| 30 | 69.114 | (variable) | | | |
| 31 | 84.887 | 11.56 | 1.43875 | 94.9 | 0.8373 |
| 32 | −142.382 | 0.50 | | | |
| 33 | −544.391 | 2.50 | 1.61310 | 44.4 | 0.8010 |
| 34 | 244.251 | 4.47 | 1.59522 | 67.7 | 0.7953 |
| 35* | ∞ | (variable) | | | |
| 36 (stop) | ∞ | 3.16 | | | |
| 37 | 338.696 | 1.40 | 1.43875 | 94.9 | 0.8373 |
| 38 | 32.281 | 0.50 | | | |
| 39 | 24.995 | 4.24 | 1.61340 | 44.3 | 0.7825 |
| 40 | 53.451 | 4.69 | | | |
| 41 | −92.687 | 1.40 | 1.43875 | 94.9 | 0.8373 |
| 42 | 31.092 | 8.62 | | | |
| 43 | 36.989 | 6.98 | 1.43875 | 94.9 | 0.8373 |
| 44 | −42.288 | 3.44 | | | |
| 45 | −47.389 | 1.60 | 2.00100 | 29.1 | 0.6838 |
| 46 | 20.935 | 6.98 | 1.85478 | 24.8 | 0.6739 |
| 47 | −101.285 | 27.92 | | | |
| 48 | −4463.147 | 8.84 | 1.43875 | 94.9 | 0.8373 |
| 49 | −28.182 | 1.47 | | | |
| 50 | −29.887 | 1.80 | 1.64000 | 60.1 | 0.8645 |
| 51 | 125.196 | 5.88 | 1.59522 | 67.7 | 0.7953 |
| 52 | −49.014 | 0.60 | | | |
| 53 | 141.937 | 4.44 | 1.59551 | 39.2 | 0.7402 |
| 54 | −61.689 | 1.80 | 1.95375 | 32.3 | 0.6988 |
| 55 | −302.355 | 1.00 | | | |
| 56 | 207.498 | 6.17 | 1.43875 | 94.9 | 0.8373 |
| 57 | −103.658 | 19.65 | | | |
| 58 | ∞ | 33.00 | 1.60859 | 46.4 | 0.7534 |
| 59 | ∞ | 13.20 | 1.51633 | 64.2 | 0.8676 |
| 60 | ∞ | 13.29 | | | |
| Image plane | ∞ | | | | |

-continued

| Unit mm |
| --- |

| Aspheric Surface Data |
| --- |

| Twenty-fourth Surface |
| --- | k = 1.47809e+01 A4 = −4.82145e−06 A6 = −1.63377e−09 A8 = −7.31291e−13
A10 = −1.04250e−15 A12 = −2.55286e−18
Twenty-sixth Surface k = 2.16390e+02 A4 = 3.40866e−07 A6 = −7.19151e−12 A8 = 1.66846e−14
A10 = −7.74881e−18 A12 = 2.37323e−21
Thirty-fifth Surface k = −9.69844e+12 A4 = 2.83089e−07 A6 = 1.13389e−10 A8 = −1.14330e−13
A10 = 1.18936e−16 A12 = −5.02120e−20

| Various Pieces of Data | | | |
| --- | --- | --- | --- |
| Zoom Ratio | | 90.00 | |
| | Wide-Angle | Middle | Telephoto |
| Focal Length | 14.30 | 135.66 | 1286.99 |
| F-number | 2.95 | 2.95 | 6.77 |
| Half Angle of View | 21.04 | 2.32 | 0.24 |
| Maximum Image Height | 5.50 | 5.50 | 5.50 |
| Total Lens Length | 778.27 | 778.27 | 778.27 |
| BF | 13.29 | 13.29 | 13.29 |
| d14 | 3.81 | 159.26 | 199.11 |
| d24 | 345.01 | 145.23 | 2.00 |
| d30 | 5.50 | 7.31 | 9.23 |
| d35 | 2.96 | 45.47 | 146.93 |
| d60 | 13.29 | 13.29 | 13.29 |

| Lens Unit Data | | |
| --- | --- | --- |
| Unit | Beginning Surface | Focal length |
| 1 | 1 | 282.68 |
| 2 | 15 | −34.71 |
| 3 | 25 | 201.69 |
| 4 | 31 | 143.30 |
| 5 | 37 | 84.86 |

Numerical Example 5

| Unit mm | | | | | |
| --- | --- | --- | --- | --- | --- |
| Surface Data | | | | | |
| Surface-Number | r | d | nd | vd | θct |
| 1 | −252.130 | 1.50 | 1.75500 | 52.3 | 0.8092 |
| 2 | 109.669 | 0.76 | | | |
| 3 | 109.726 | 9.74 | 1.43387 | 95.1 | 0.8092 |
| 4 | −243.203 | 0.20 | | | |
| 5 | 262.783 | 4.73 | 1.43387 | 95.1 | 0.8092 |
| 6 | −473.152 | 17.92 | | | |
| 7 | 153.255 | 6.31 | 1.43387 | 95.1 | 0.8092 |
| 8 | −434.667 | 0.23 | | | |
| 9 | 124.421 | 6.72 | 1.43387 | 95.1 | 0.8092 |
| 10 | −530.710 | 0.29 | | | |
| 11 | 79.139 | 4.33 | 1.43387 | 95.1 | 0.8092 |
| 12 | 135.544 | (variable) | | | |
| 13* | −353.175 | 0.60 | 1.85920 | 33.0 | 0.6855 |
| 14 | 24.649 | (variable) | | | |
| 15 | −43.151 | 4.04 | 1.85478 | 24.8 | 0.6739 |
| 16 | −18.453 | 0.60 | 1.59522 | 67.7 | 0.7953 |
| 17 | 215.047 | 0.18 | | | |
| 18 | 52.294 | 5.02 | 1.61340 | 44.3 | 0.7825 |
| 19 | −27.308 | 0.60 | 1.81600 | 46.6 | 0.7690 |
| 20 | 179.155 | (variable) | | | |
| 21 | −331.471 | 0.50 | 1.59410 | 60.5 | 0.7800 |
| 22 | 29.451 | 2.17 | 1.74951 | 35.3 | 0.7308 |

-continued

| Unit mm | | | | | |
|---|---|---|---|---|---|
| 23 | 151.446 | 2.32 | | | |
| 24 | −40.085 | 0.50 | 1.59522 | 67.7 | 0.7953 |
| 25 | 139.466 | (variable) | | | |
| 26* | 57.222 | 4.02 | 1.72916 | 54.7 | 0.8244 |
| 27 | −127.689 | (variable) | | | |
| 28 (stop) | ∞ | 0.29 | | | |
| 29 | 63.811 | 4.14 | 1.43875 | 94.9 | 0.8373 |
| 30 | −49.740 | 0.20 | | | |
| 31 | 60.087 | 4.86 | 1.43875 | 94.9 | 0.8373 |
| 32 | −29.821 | 1.30 | 1.64000 | 60.1 | 0.8645 |
| 33 | 423.022 | 0.20 | | | |
| 34 | 41.370 | 1.30 | 1.64000 | 60.1 | 0.8645 |
| 35 | 20.883 | 33.97 | | | |
| 36 | 72.044 | 4.70 | 1.43875 | 94.9 | 0.8373 |
| 37 | −28.530 | 0.20 | | | |
| 38 | 48.419 | 4.86 | 1.43875 | 94.9 | 0.8373 |
| 39 | −26.006 | 1.20 | 1.65160 | 58.5 | 0.8525 |
| 40 | −118.676 | 1.04 | | | |
| 41 | 2087.084 | 2.74 | 1.67300 | 38.3 | 0.7481 |
| 42 | −38.379 | 1.20 | 2.00100 | 29.1 | 0.6838 |
| 43 | 61.949 | 2.58 | | | |
| 44 | −124.665 | 2.97 | 1.85478 | 24.8 | 0.6739 |
| 45 | −25.665 | 1.20 | 1.85920 | 33.0 | 0.6855 |
| 46 | −45.233 | 4.87 | | | |
| 47 | ∞ | 33.00 | 1.60859 | 46.4 | 0.7534 |
| 48 | ∞ | 13.20 | 1.51633 | 64.1 | 0.8687 |
| 49 | ∞ | 7.38 | | | |
| Image plane | ∞ | | | | |

Aspheric Surface Data

Thirteenth Surface k = 8.16505e−01 A4 = 1.77105e−06 A6 = 1.42691e−08 A8 = −6.46440e−10
A10 = 1.02519e−11 A12 = −8.25095e−14 A14 = 3.30010e−16 A16 = −5.22438e−19

Twenty-sixth Surface k = −1.84774e+00 A4 = −2.09515e−06 A6 = 1.81035e−09 A8 = 4.21519e−12
A10 = −5.59792e−14 A12 = 1.80787e−16

Various Pieces of Data

| Zoom Ratio | | 26.09 | |
|---|---|---|---|
| | Wide-Angle | Middle | Telephoto |
| Focal Length | 11.50 | 58.64 | 300.00 |
| F-number | 2.70 | 2.70 | 4.89 |
| Half Angle of View | 25.56 | 5.36 | 1.05 |
| Maximum Image Height | 5.50 | 5.50 | 5.50 |
| Total Lens Length | 300.04 | 300.04 | 300.04 |
| BF | 7.38 | 7.38 | 7.38 |
| d12 | 1.49 | 57.43 | 78.08 |
| d14 | 6.51 | 5.41 | 11.42 |
| d20 | 56.31 | 2.43 | 7.22 |
| d25 | 15.71 | 21.73 | 1.02 |
| d27 | 19.34 | 12.36 | 1.62 |
| d49 | 7.38 | 7.38 | 7.38 |

Lens Unit Data

| Unit | Beginning Surface | Focal length |
|---|---|---|
| 1 | 1 | 100.87 |
| 2 | 13 | −26.80 |
| 3 | 15 | −122.98 |
| 4 | 21 | −48.61 |
| 5 | 26 | 54.69 |
| 6 | 29 | 62.51 |

Numerical Example 6

| | Unit mm | | | | |
|---|---|---|---|---|---|
| | | Surface Data | | | |
| Surface-Number | r | d | nd | vd | θct |
| 1 | 185.821 | 7.79 | 1.48749 | 70.2 | 0.8924 |
| 2 | 1166.517 | 0.19 | | | |
| 3 | 330.351 | 4.00 | 1.69680 | 55.5 | 0.8330 |
| 4 | 111.661 | 11.44 | 1.43875 | 94.9 | 0.8373 |
| 5 | 805.025 | 0.14 | | | |
| 6 | 135.575 | 7.21 | 1.43387 | 95.1 | 0.8092 |
| 7 | 333.650 | 19.85 | | | |
| 8 | 130.051 | 6.77 | 1.43875 | 94.9 | 0.8373 |
| 9 | 357.802 | 2.00 | 1.67790 | 55.3 | 0.8045 |
| 10 | 76.721 | 1.13 | | | |
| 11 | 76.220 | 13.23 | 1.49700 | 81.5 | 0.8258 |
| 12 | 2654.533 | 2.00 | 1.64000 | 60.1 | 0.8645 |
| 13 | 231.532 | 2.11 | | | |
| 14 | 122.077 | 9.15 | 1.59522 | 67.7 | 0.7953 |
| 15 | 656.396 | (variable) | | | |
| 16 | 297.239 | 0.90 | 1.75106 | 43.1 | 0.7097 |
| 17 | 22.902 | 3.98 | | | |
| 18 | −1201.004 | 5.69 | 1.73800 | 32.3 | 0.7154 |
| 19 | −18.272 | 0.80 | 1.69930 | 51.1 | 0.7593 |
| 20 | 44.545 | 0.50 | | | |
| 21 | 30.116 | 3.08 | 1.67300 | 38.3 | 0.7481 |
| 22 | 155.852 | 2.08 | | | |
| 23 | −40.686 | 0.80 | 1.71150 | 47.4 | 0.7100 |
| 24 | −62.384 | (variable) | | | |
| 25 | −42.512 | 0.80 | 1.71700 | 47.9 | 0.7629 |
| 26 | 39.139 | 2.49 | 1.84666 | 23.8 | 0.6614 |
| 27 | 192.345 | (variable) | | | |
| 28 (stop) | ∞ | 0.50 | | | |
| 29 | 65.981 | 7.52 | 1.59522 | 67.7 | 0.7953 |
| 30* | −42.115 | 0.09 | | | |
| 31 | 1154.725 | 6.60 | 1.43875 | 94.7 | 0.8410 |
| 32 | −26.504 | 0.90 | 1.80610 | 40.9 | 0.7483 |
| 33 | −130.184 | 0.15 | | | |
| 34 | ∞ | 30.45 | | | |
| 35 | ∞ | 3.45 | | | |
| 36 | 32.676 | 7.69 | 1.43875 | 94.7 | 0.8410 |
| 37 | 716.447 | 12.05 | | | |
| 38 | 87.415 | 3.58 | 1.43875 | 94.7 | 0.8410 |
| 39 | −43.098 | 1.92 | | | |
| 40 | −38.367 | 2.00 | 1.65160 | 58.5 | 0.8525 |
| 41 | 15.124 | 5.52 | 1.60342 | 38.0 | 0.7353 |
| 42 | 22.439 | 2.09 | | | |
| 43 | 22.339 | 7.03 | 1.56732 | 42.8 | 0.7589 |
| 44 | −53.919 | 1.57 | | | |
| 45 | 46.622 | 3.60 | 1.54072 | 47.2 | 0.7766 |
| 46 | −24.930 | 0.80 | 1.85026 | 32.3 | 0.6942 |
| 47 | 77.632 | 5.00 | | | |
| 48 | ∞ | 33.00 | 1.60859 | 46.4 | 0.7534 |
| 49 | ∞ | 13.20 | 1.51680 | 64.2 | 0.8698 |
| 50 | ∞ | (variable) | | | |
| Image plane | ∞ | | | | |

| Aspheric Surface Data |
|---|
| Thirtieth Surface | k = 0.00000e+00 A4 = 8.42560e−08 A6 = −9.83530e−10 A8 = −1.22888e−12
A10 = −1.08680e−15

| | Various Pieces of Data | |
|---|---|---|
| Zoom Ratio | 20.00 | |

| | Wide-Angle | Middle | Telephoto |
|---|---|---|---|
| Focal Length | 25.00 | 111.80 | 500.00 |
| F-number | 2.90 | 2.90 | 5.00 |
| Half Angle of View | 12.41 | 2.82 | 0.63 |
| Maximum Image Height | 5.50 | 5.50 | 5.50 |
| Total Lens Length | 372.14 | 372.14 | 372.14 |
| BF | 8.94 | 8.94 | 8.94 |
| d15 | 6.47 | 68.17 | 93.79 |

-continued

| Unit mm | | | |
|---|---|---|---|
| d24 | 77.22 | 10.98 | 10.62 |
| d27 | 22.68 | 27.21 | 1.96 |
| d50 | 8.94 | 8.94 | 8.94 |

| Lens Unit Data | | |
|---|---|---|
| Unit | Beginning Surface | Focal length |
| 1 | 1 | 168.52 |
| 2 | 16 | −30.20 |
| 3 | 25 | −55.42 |
| 4 | 29 | 45.27 |

Numerical Example 7

| Unit mm | | | | | |
|---|---|---|---|---|---|
| Surface Data | | | | | |
| Surface-Number | r | d | nd | vd | θct |
| 1 | −199.291 | 1.50 | 1.74100 | 52.6 | 0.8155 |
| 2 | 92.793 | 0.75 | | | |
| 3 | 93.134 | 11.35 | 1.43387 | 95.1 | 0.8092 |
| 4 | −232.794 | 0.20 | | | |
| 5 | 175.628 | 6.59 | 1.43387 | 95.1 | 0.8092 |
| 6 | −352.777 | 17.06 | | | |
| 7 | 157.316 | 6.90 | 1.43387 | 95.1 | 0.8092 |
| 8 | −320.965 | 0.23 | | | |
| 9 | 118.129 | 6.64 | 1.43387 | 95.1 | 0.8092 |
| 10 | −936.511 | 0.30 | | | |
| 11 | 85.254 | 4.81 | 1.43387 | 95.1 | 0.8092 |
| 12 | 177.732 | (variable) | | | |
| 13* | −300.301 | 0.60 | 1.78000 | 40.0 | 0.6950 |
| 14 | 17.248 | 7.34 | | | |
| 15 | −35.541 | 4.17 | 1.73800 | 32.3 | 0.7154 |
| 16 | −17.070 | 0.80 | 1.75106 | 43.1 | 0.7097 |
| 17 | −211.013 | 0.18 | | | |
| 18 | 57.943 | 4.98 | 1.73800 | 32.3 | 0.7154 |
| 19 | −39.226 | 0.60 | 1.75106 | 43.1 | 0.7097 |
| 20 | −72.989 | (variable) | | | |
| 21 | −353.750 | 0.50 | 1.59410 | 60.5 | 0.7800 |
| 22 | 17.521 | 3.03 | 1.74951 | 35.3 | 0.7308 |
| 23 | 81.160 | 2.70 | | | |
| 24 | −35.674 | 0.50 | 1.59522 | 67.7 | 0.7953 |
| 25 | 68.500 | (variable) | | | |
| 26 (stop) | ∞ | 0.50 | | | |
| 27* | 36.914 | 4.67 | 1.59522 | 67.7 | 0.7953 |
| 28 | −266.118 | (variable) | | | |
| 29 | 93.731 | 3.66 | 1.43875 | 94.9 | 0.8373 |
| 30 | −61.404 | 0.20 | | | |
| 31 | 84.302 | 3.81 | 1.43875 | 94.9 | 0.8373 |
| 32 | −51.430 | 1.30 | 1.64000 | 60.1 | 0.8645 |
| 33 | 496.250 | 0.20 | | | |
| 34 | 48.219 | 1.30 | 1.64000 | 60.1 | 0.8645 |
| 35 | 24.530 | 33.97 | | | |
| 36 | 30.272 | 5.01 | 1.43875 | 94.9 | 0.8373 |
| 37 | −46.240 | 0.20 | | | |
| 38 | 40.551 | 5.13 | 1.43875 | 94.9 | 0.8373 |
| 39 | −21.793 | 1.00 | 1.65160 | 58.5 | 0.8525 |
| 40 | −33.506 | 1.05 | | | |
| 41 | −40.693 | 0.60 | 1.95375 | 32.3 | 0.6988 |
| 42 | 37.319 | 3.29 | | | |
| 43 | 45.065 | 2.91 | 1.76182 | 26.5 | 0.6757 |
| 44 | −59.647 | 1.00 | 1.88300 | 40.8 | 0.7397 |
| 45 | −672.675 | 4.87 | | | |
| 46 | ∞ | 33.00 | 1.60859 | 46.4 | 0.7534 |
| 47 | ∞ | 13.20 | 1.51633 | 64.1 | 0.8687 |
| 48 | ∞ | 7.39 | | | |
| Image plane | ∞ | | | | |

-continued

| Unit mm |
| --- |

| Aspheric Surface Data |
| --- |

| Thirteenth Surface |
| --- | k = −1.83093e+00 A4 = 9.28166e−06 A6 = 4.57095e−08 A8 = −1.46641e−09
A10 = 1.79202e−11 A12 = −1.15334e−13 A14 = 3.82298e−16 A16 = −5.14147e−19

| Twenty-seventh Surface |
| --- | k = −1.60060e+00 A4 = −2.41963e−06 A6 = 1.17337e−09 A8 = −6.94747e−12
A10 = 1.70256e−14 A12 = −1.33847e−17

| Various Pieces of Data | | | |
| --- | --- | --- | --- |
| Zoom Ratio | | 26.09 | |
| | Wide-Angle | Middle | Telephoto |
| Focal Length | 11.50 | 58.64 | 300.00 |
| F-number | 2.70 | 2.70 | 4.89 |
| Half Angle of View | 25.56 | 5.36 | 1.05 |
| Maximum Image Height | 5.50 | 5.50 | 5.50 |
| Total Lens Length | 300.03 | 300.03 | 300.03 |
| BF | 7.39 | 7.39 | 7.39 |
| d12 | 1.79 | 55.13 | 72.25 |
| d20 | 54.14 | 2.02 | 11.37 |
| d25 | 25.58 | 25.44 | 2.56 |
| d28 | 8.53 | 7.45 | 3.87 |
| d48 | 7.39 | 7.39 | 7.39 |

| Lens Unit Data | | |
| --- | --- | --- |
| Unit | Beginning Surface | Focal length |
| 1 | 1 | 92.49 |
| 2 | 13 | −29.44 |
| 3 | 21 | −36.79 |
| 4 | 27 | 54.78 |
| 5 | 29 | 66.74 |

Numerical Example 8

| Unit mm |
| --- |

| Surface Data | | | | | |
| --- | --- | --- | --- | --- | --- |
| Surface-Number | r | d | nd | vd | θct |
| 1 | −175.323 | 1.50 | 1.75500 | 52.3 | 0.8092 |
| 2 | 100.125 | 0.71 | | | |
| 3 | 100.274 | 11.17 | 1.43387 | 95.1 | 0.8092 |
| 4 | −209.573 | 0.20 | | | |
| 5 | 201.069 | 6.55 | 1.43387 | 95.1 | 0.8092 |
| 6 | −311.613 | 17.37 | | | |
| 7 | 163.967 | 7.49 | 1.43387 | 95.1 | 0.8092 |
| 8 | −264.774 | 0.23 | | | |
| 9 | 116.283 | 6.92 | 1.43387 | 95.1 | 0.8092 |
| 10 | −892.469 | 0.30 | | | |
| 11 | 83.770 | 4.77 | 1.43387 | 95.1 | 0.8092 |
| 12 | 164.088 | (variable) | | | |
| 13* | −357.882 | 0.60 | 1.75106 | 43.1 | 0.7097 |
| 14 | 22.031 | 7.11 | | | |
| 15 | −31.890 | 4.31 | 1.72047 | 34.7 | 0.7267 |
| 16 | −18.139 | 0.60 | 1.59522 | 67.7 | 0.7953 |
| 17 | −216.926 | (variable) | | | |
| 18 | 280.773 | 3.72 | 1.61310 | 44.4 | 0.8010 |
| 19 | −39.712 | 0.60 | 1.80440 | 39.6 | 0.7307 |
| 20 | −71.066 | (variable) | | | |
| 21 | −107.226 | 0.50 | 1.59410 | 60.5 | 0.7800 |
| 22 | 16.738 | 3.51 | 1.74951 | 35.3 | 0.7308 |
| 23 | 717.122 | 2.73 | | | |
| 24 | −24.915 | 0.50 | 1.59522 | 67.7 | 0.7953 |
| 25 | 62.077 | (variable) | | | |
| 26* | 41.153 | 3.84 | 1.72916 | 54.7 | 0.8244 |

-continued

| Unit mm | | | | | |
|---|---|---|---|---|---|
| 27 | 530.792 | (variable) | | | |
| 28 (stop) | ∞ | 0.30 | | | |
| 29 | 49.322 | 4.66 | 1.43875 | 94.9 | 0.8373 |
| 30 | −52.038 | 0.20 | | | |
| 31 | 71.078 | 5.00 | 1.43875 | 94.9 | 0.8373 |
| 32 | −29.847 | 1.30 | 1.64000 | 60.1 | 0.8645 |
| 33 | −114.886 | 0.20 | | | |
| 34 | 61.857 | 1.30 | 1.64000 | 60.1 | 0.8645 |
| 35 | 22.291 | 33.97 | | | |
| 36 | 31.855 | 5.24 | 1.43875 | 94.9 | 0.8373 |
| 37 | −33.471 | 0.20 | | | |
| 38 | 65.083 | 4.39 | 1.43875 | 94.9 | 0.8373 |
| 39 | −24.409 | 1.20 | 1.65160 | 58.5 | 0.8525 |
| 40 | 118.648 | 2.10 | | | |
| 41 | −189.649 | 3.35 | 1.67300 | 38.3 | 0.7481 |
| 42 | −21.241 | 1.20 | 2.00100 | 29.1 | 0.6838 |
| 43 | −175.231 | 2.03 | | | |
| 44 | −55.445 | 2.33 | 1.85478 | 24.8 | 0.6739 |
| 45 | −28.114 | 1.20 | 1.85920 | 33.0 | 0.6855 |
| 46 | −35.078 | 4.87 | | | |
| 47 | ∞ | 33.00 | 1.60859 | 46.4 | 0.7534 |
| 48 | ∞ | 13.20 | 1.51633 | 64.1 | 0.8687 |
| 49 | ∞ | (variable) | | | |
| Image plane | ∞ | | | | |

Aspheric Surface Data

Thirteenth Surface k = −1.85704e+00 A4 = 8.56233e−06 A6 = 2.83619e−08 A8 = −1.00661e−09
A10 = 1.26125e−11 A12 = −8.38405e−14 A14 = 2.83916e−16 A16 = −3.85184e−19

Twenty-sixth Surface k = −2.00060e+00 A4 = −3.03212e−06 A6 = 6.95293e−09 A8 = −6.89371e−11
A10 = 4.39371e−13 A12 = −1.00503e−15

Various Pieces of Data

| Zoom Ratio | | 26.09 | |
|---|---|---|---|
| | Wide-Angle | Middle | Telephoto |
| Focal Length | 11.50 | 58.74 | 300.00 |
| F-number | 2.69 | 2.69 | 4.89 |
| Half Angle of View | 25.56 | 5.35 | 1.05 |
| Maximum Image Height | 5.50 | 5.50 | 5.50 |
| Total Lens Length | 300.02 | 300.02 | 300.02 |
| BF | 7.39 | 7.39 | 7.39 |
| d12 | 1.58 | 54.97 | 73.23 |
| d17 | 0.48 | 3.14 | 9.11 |
| d20 | 47.90 | 1.30 | 1.30 |
| d25 | 18.86 | 19.50 | 0.82 |
| d27 | 17.35 | 7.26 | 1.71 |
| d49 | 7.39 | 7.39 | 7.39 |

Lens Unit Data

| Unit | Beginning Surface | Focal length |
|---|---|---|
| 1 | 1 | 93.16 |
| 2 | 13 | −19.65 |
| 3 | 18 | 115.44 |
| 4 | 21 | −32.92 |
| 5 | 26 | 60.98 |
| 6 | 29 | 58.68 |

TABLE 1

| | | Example | | | |
|---|---|---|---|---|---|
| | Inequality | 1 | 2 | 3 | 4 |
| (1) | θCtVpav − θCtVnav | −0.0230 | −0.0096 | −0.0132 | −0.0096 |
| (2) | θCtVpx − 0.004693 × vdVpx | 0.5636 | 0.5928 | 0.5650 | 0.5928 |
| x = 1 | | | | | |

TABLE 1-continued

| | | | | | |
|---|---|---|---|---|---|
| (2) x = 2 | θCtVpx − 0.004693 × vdVpx | 0.5685 | 0.5685 | 0.5747 | 0.5685 |
| (3) x = 1 | vdVpx | 32.33 | 44.36 | 35.33 | 44.36 |
| (3) x = 2 | vdVpx | 38.26 | 38.26 | 44.27 | 38.26 |
| (4) x = 1 | fVpx/fV | −0.94 | −1.29 | −0.94 | −1.03 |
| (4) x = 2 | fVpx/fV | −1.82 | −1.32 | −1.90 | −1.94 |
| (5) x = 1 | θCtVpx − 0.005575 × vdVpx | 0.5351 | 0.5537 | 0.5338 | 0.5537 |
| (5) x = 2 | θCtVpx − 0.005575 × vdVpx | 0.5348 | 0.5348 | 0.5357 | 0.5348 |
| (6) | ndLN | 1.69930 | 1.69930 | 1.75106 | 1.69930 |
| (7) | vdLN | 51.11 | 51.11 | 43.10 | 51.11 |
| (8) | θCtLN − 0.00417 × vdLN | 0.5462 | 0.5462 | 0.5300 | 0.5462 |
| (9) | fLNVm/fV | 1.34 | 2.30 | 1.02 | 1.40 |
| (10) | f1/fV | −5.83 | −6.01 | −7.48 | −8.15 |
| (11) | ndVav | 1.69132 | 1.63574 | 1.65783 | 1.63574 |
| (12) | vdVpav − vdVnav | −18.69 | −19.13 | −19.12 | −19.13 |
| (13) | fLN1/fN1 | 1.34 | 2.30 | 1.02 | 1.40 |
| (14) | f1/fN1 | −5.83 | −6.01 | −7.48 | −8.15 |
| (15) | ndN1av | 1.69132 | 1.63574 | 1.65783 | 1.63574 |
| (16) | vdN1pav − vdN1nav | −18.69 | −19.13 | −19.12 | −19.13 |
| (17) | θCtN1pav − θCtN1nav | −0.0230 | −0.0096 | −0.0132 | −0.0096 |
| (18) | fLNm/fNm | 1.34 | 0.75 | 1.02 | 1.40 |
| (19) | ndNmav | 1.69132 | 1.68134 | 1.65783 | 1.63574 |
| (20) | vdNmpav − vdNmnav | −18.69 | −24.10 | −19.12 | −19.13 |
| (21) | θCtNmpav − θCtNmnav | −0.0230 | −0.0465 | −0.0132 | −0.0096 |
| (22) | θCt1pav − θCt1nav | 0.0071 | −0.0001 | −0.0026 | −0.0013 |

| | | Example | | | |
|---|---|---|---|---|---|
| Inequality | | 5 | 6 | 7 | 8 |
| (1) | θCtVpav − θCtVnav | −0.0217 | 0.0054 | 0.0106 | 0.0186 |
| (2) x = 1 | θCtVpx − 0.004693 × vdVpx | 0.5576 | 0.5636 | 0.5636 | 0.5638 |
| (2) x = 2 | θCtVpx − 0.004693 × vdVpx | 0.5747 | 0.5685 | 0.5636 | 0.5928 |
| (3) x = 1 | vdVpx | 24.80 | 32.33 | 32.33 | 34.71 |
| (3) x = 2 | vdVpx | 44.27 | 38.26 | 32.33 | 44.36 |
| (4) x = 1 | fVpx/fV | −1.68 | −0.83 | −1.38 | −1.92 |
| (4) x = 2 | fVpx/fV | −1.44 | −1.82 | −1.10 | −2.12 |
| (5) x = 1 | θCtVpx − 0.005575 × vdVpx | 0.5357 | 0.5351 | 0.5351 | 0.5332 |
| (5) x = 2 | θCtVpx − 0.005575 × vdVpx | 0.5357 | 0.5348 | 0.5351 | 0.5537 |
| (6) | ndLN | 1.85920 | 1.71150 | 1.78000 | 1.75106 |
| (7) | vdLN | 33.00 | 47.43 | 40.00 | 43.10 |
| (8) | θCtLN − 0.00417 × vdLN | 0.5479 | 0.5122 | 0.5282 | 0.5300 |
| (9) | fLNVm/fV | 1.00 | 0.61 | 0.71 | 1.03 |
| (10) | f1/fV | −4.84 | −5.58 | −3.14 | −3.47 |
| (11) | ndVav | 1.74772 | 1.71457 | 1.75162 | 1.69685 |
| (12) | vdVpav − vdVnav | −14.59 | −11.92 | −9.74 | −10.61 |
| (13) | fLN1/fN1 | 1.00 | 0.61 | 0.71 | 1.40 |
| (14) | f1/fN1 | −3.76 | −5.58 | −3.14 | −4.74 |
| (15) | ndN1av | 1.85920 | 1.71457 | 1.75162 | 1.68892 |
| (16) | vdN1pav − vdN1nav | — | −11.92 | −9.74 | −20.71 |
| (17) | θCtN1pav − θCtN1nav | — | 0.0054 | 0.0106 | −0.0258 |
| (18) | fLNm/fNm | 1.00 | 0.61 | 0.71 | 1.40 |
| (19) | ndNmav | 1.85920 | 1.71457 | 1.75162 | 1.68892 |
| (20) | vdNmpav − vdNmnav | — | −11.92 | −9.74 | −20.71 |
| (21) | θCtNmpav − θCtNmnav | — | 0.0054 | 0.0106 | −0.0258 |
| (22) | θCt1pav θct1nav | −0.0001 | −0.0011 | −0.0064 | 0.0000 |

45

TABLE 2

| Variable | Example | | | |
|---|---|---|---|---|
| | 1 | 2 | 3 | 4 |
| θCtVpav | 0.7317 | 0.7745 | 0.7566 | 0.7745 |
| θCtVnav | 0.7548 | 0.7841 | 0.7699 | 0.7841 |
| θCtVp1 | 0.7154 | 0.8010 | 0.7308 | 0.8010 |
| θCtVp2 | 0.7481 | 0.7481 | 0.7825 | 0.7481 |
| vdVp1 | 32.33 | 44.36 | 35.33 | 44.36 |
| vdVp2 | 38.26 | 38.26 | 44.27 | 38.26 |
| fVp1 | 26.36 | 35.88 | 36.13 | 35.76 |
| fVp2 | 51.12 | 36.67 | 72.50 | 67.37 |
| fV | −28.11 | −27.85 | −38.26 | −34.71 |
| ndLN | 1.69930 | 1.69930 | 1.75106 | 1.69930 |
| vdLN | 51.11 | 51.11 | 43.10 | 51.11 |
| θCtLN | 0.7593 | 0.7593 | 0.7097 | 0.7593 |
| fLNVm | −37.59 | −64.02 | −38.86 | −48.64 |
| ndVav | 1.69132 | 1.63574 | 1.65783 | 1.63574 |
| vdVpav | 35.30 | 41.31 | 39.80 | 41.31 |
| vdVnav | 53.98 | 60.44 | 58.92 | 60.44 |
| fLN1 | −37.59 | −64.02 | −38.86 | −48.64 |
| fN1 | −28.11 | −27.85 | −38.26 | −34.71 |
| f1 | 163.84 | 167.49 | 286.02 | 282.68 |
| ndN1av | 1.69132 | 1.63574 | 1.65783 | 1.63574 |
| vdN1pav | 35.30 | 41.31 | 39.80 | 41.31 |
| vdN1nav | 53.98 | 60.44 | 58.92 | 60.44 |
| θCtN1pav | 0.7317 | 0.7745 | 0.7566 | 0.7745 |
| θCtN1nav | 0.7548 | 0.7841 | 0.7699 | 0.7841 |
| fLNm | −37.59 | −34.10 | −38.86 | −48.64 |
| fNm | −28.11 | −45.66 | −38.26 | −34.71 |
| ndNmav | 1.69132 | 1.68134 | 1.65783 | 1.63574 |
| vdNmpav | 35.30 | 35.33 | 39.80 | 41.31 |
| vdNmnav | 53.98 | 59.43 | 58.92 | 60.44 |
| θCtNmpav | 0.7317 | 0.7308 | 0.7566 | 0.7745 |
| θCtNmnav | 0.7548 | 0.7773 | 0.7699 | 0.7841 |
| θCt1pav | 0.8427 | 0.8092 | 0.8185 | 0.8155 |
| θCt1nav | 0.8356 | 0.8092 | 0.8211 | 0.8168 |

| Variable | Example | | | |
|---|---|---|---|---|
| | 5 | 6 | 7 | 8 |
| θCtVpav | 0.7282 | 0.7317 | 0.7154 | 0.7638 |
| θCtVnav | 0.7499 | 0.7263 | 0.7048 | 0.7452 |
| θCtVp1 | 0.6739 | 0.7154 | 0.7154 | 0.7267 |
| θCtVp2 | 0.7825 | 0.7481 | 0.7154 | 0.8010 |
| vdVp1 | 24.80 | 32.33 | 32.33 | 34.71 |
| vdVp2 | 44.27 | 38.26 | 32.33 | 44.36 |
| fVp1 | 35.08 | 25.09 | 40.61 | 51.62 |
| fVp2 | 29.97 | 54.93 | 32.40 | 57.00 |
| fV | −20.86 | −30.20 | −29.44 | −26.86 |
| ndLN | 1.85920 | 1.71150 | 1.78000 | 1.75106 |
| vdLN | 33.00 | 47.43 | 40.00 | 43.10 |
| θCtLN | 0.6855 | 0.7100 | 0.6950 | 0.7097 |
| fLNVm | −20.86 | −18.43 | −20.89 | −27.61 |
| ndVav | 1.74772 | 1.71457 | 1.75162 | 1.69685 |
| vdVpav | 34.54 | 35.30 | 32.33 | 39.54 |
| vdVnav | 49.12 | 47.21 | 42.07 | 50.14 |
| fLN1 | −26.80 | −18.43 | −20.89 | −27.61 |
| fN1 | −26.80 | −30.20 | −29.44 | −19.65 |
| f1 | 100.87 | 168.52 | 92.49 | 93.16 |
| ndN1av | 1.85920 | 1.71457 | 1.75162 | 1.68892 |
| vdN1pav | — | 35.30 | 32.33 | 34.71 |
| vdN1nav | — | 47.21 | 42.07 | 55.42 |
| θCtN1pav | — | 0.7317 | 0.7154 | 0.7267 |
| θCtN1nav | — | 0.7263 | 0.7048 | 0.7525 |
| fLNm | −26.80 | −18.43 | −20.89 | −27.61 |
| fNm | −26.80 | −30.20 | −29.44 | −19.65 |
| ndNmav | 1.85920 | 1.71457 | 1.75162 | 1.68892 |
| vdNmpav | — | 35.30 | 32.33 | 34.71 |
| vdNmnav | — | 47.21 | 42.07 | 55.42 |
| θCtNmpav | — | 0.7317 | 0.7154 | 0.7267 |
| θCtNmnav | — | 0.7263 | 0.7048 | 0.7525 |
| θCt1pav | 0.8092 | 0.8329 | 0.8092 | 0.8092 |
| θCt1nav | 0.8092 | 0.8340 | 0.8155 | 0.8092 |

While exemplary embodiments of the disclosure have been described above, the disclosure is not limited to these exemplary embodiments and can be modified or altered in various manners within the range of the gist thereof.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-187566 filed Nov. 24, 2022, which is hereby incorporated by reference herein in its entirety.

What is claimed is:

1. A zoom lens comprising, in order from an object side to an image side:

a first lens unit with positive refractive power which does not move for zooming; and a plurality of lens units which moves in zooming, each of intervals between the respective adjacent lens units varying in zooming, wherein the plurality of lens units includes a variable magnification unit consisting of one or a plurality of lens units which monotonously moves toward the image side in zooming from a wide-angle end to a telephoto end, wherein the variable magnification unit includes at least one positive lens and at least one negative lens and has negative refractive power at the wide-angle end, wherein the zoom lens satisfies the following inequality:

$$-0.040 < \theta CtVpav - \theta CtVnav < 0.040,$$

where θCtVpav denotes an average value of partial dispersion ratios regarding C-line and t-line of all of the positive lenses included in the variable magnification unit and θCtVnav denotes an average value of partial dispersion ratios regarding C-line and t-line of all of the negative lenses included in the variable magnification unit, and wherein the variable magnification unit includes a positive lens satisfying the following inequalities:

$$0.5466 < \theta CtVpx - 0.004693 \times vdVpx < 0.6466, \text{ and}$$

$$24 < vdVpx < 55,$$

where vdVpx denotes an Abbe number regarding d-line of the positive lens included in the variable magnification unit and θCtVpx denotes a partial dispersion ratio regarding C-line and t-line of the positive lens included in the variable magnification unit.

2. The zoom lens according to claim 1, wherein the variable magnification unit includes a positive lens satisfying the following inequality:

$$-5.0 < fVpx/fV < -0.4,$$

where fVpx denotes a focal length of the positive lens included in the variable magnification unit and fV denotes a focal length at the wide-angle end of the variable magnification unit.

3. The zoom lens according to claim 1, wherein the variable magnification unit includes a positive lens satisfying the following inequality:

$$0.5200 < \theta CtVpx - 0.005575 \times vdVpx < 0.5800.$$

4. The zoom lens according to claim 1, wherein the plurality of lens units includes a lens unit with negative refractive power including a negative lens LN satisfying the following inequalities:

$$1.60 < ndLN < 2.00,$$

$$25.0 < vdLN < 60.0, \text{ and}$$

$$0.490 < \theta CtLN - 0.00417 \times vdLN < 0.550,$$

where ndLN denotes a refractive index regarding d-line of the negative lens LN, vdLN denotes an Abbe number regarding d-line of the negative lens LN, and θCtLN denotes a partial dispersion ratio regarding C-line and t-line of the negative lens LN.

5. The zoom lens according to claim 1, wherein the zoom lens satisfies the following inequality:

$$0.3 < fLNVm/fV < 4.0,$$

where fLNVm denotes a focal length of a negative lens LNVm with the strongest negative refractive power included in the variable magnification unit and fV denotes a focal length at the wide-angle end of the variable magnification unit.

6. The zoom lens according to claim 1, wherein the zoom lens satisfies the following inequality:

$$-12.0 < f1/fV < -2.0,$$

where f1 denotes a focal length of the first lens unit and fV denotes a focal length at the wide-angle end of the variable magnification unit.

7. The zoom lens according to claim 1, wherein the zoom lens satisfies the following inequality:

$$1.55 < ndVav < 1.9,$$

where ndVav denotes an average value of refractive indices regarding d-line of all of the lenses included in the variable magnification unit.

8. The zoom lens according to claim 1, wherein the zoom lens satisfies the following inequality:

$$-40.0 < vdVpav - vdVnav < -5.0,$$

where vdVpav denotes an average value of Abbe numbers regarding d-line of all of the lenses with positive refractive power included in the variable magnification unit and vdVnav denotes an average value of Abbe numbers regarding d-line of all of the lenses with negative refractive power included in the variable magnification unit.

9. The zoom lens according to claim 1, wherein the zoom lens satisfies the following inequality:

$$0.3 < fLN1/fN1 < 5.0,$$

where fN1 denotes a focal length of a lens unit N1 with the strongest negative refractive power in the plurality of lens units and FLN1 denotes a focal length of a negative lens LN1 with the strongest negative refractive power of the negative lenses included in the lens unit N1.

10. The zoom lens according to claim 1, wherein the zoom lens satisfies the following inequality:

$$-12.0 < f1/fN1 < -2.0,$$

where f1 denotes a focal length of the first lens unit and fN1 denotes a focal length of a lens unit N1 with the strongest negative refractive power in the plurality of lens units.

11. The zoom lens according to claim 1, wherein the zoom lens satisfies the following inequality:

$$1.55 < ndN1av < 1.90,$$

where ndN1av denotes an average value of refractive indices regarding d-line of all of the lenses included in a lens unit N1 with the strongest negative refractive power in the plurality of lens units.

12. The zoom lens according to claim 1, wherein the zoom lens satisfies the following inequality:

$$-40.0 < vdN1pav - vdN1nav < -5.0,$$

where vdN1pav denotes an average value of Abbe numbers regarding d-line of all of the lenses with positive refractive power included in a lens unit N1 with the strongest negative refractive power in the plurality of lens units and vdN1nav denotes an average value of Abbe numbers regarding d-line of all of the lenses with negative refractive power included in the lens unit N1.

13. The zoom lens according to claim 1, wherein the zoom lens satisfies the following inequality:

$$-0.040 < \theta CtN1pav - \theta CtN1nav < 0.040,$$

where θCtN1pav denotes an average value of partial dispersion ratios regarding C-line and t-line of all of the lenses with positive refractive power included in a lens unit N1 with the strongest negative refractive power in the plurality of lens units and θCtN1nav denotes an average value of partial dispersion ratios regarding C-line and t-line of all of the lenses with negative refractive power included in the lens unit N1.

14. The zoom lens according to claim 1, wherein the zoom lens satisfies the following inequality:

$$0.3 < fLNm/fNm < 4.0,$$

where fNm is a focal length of a lens unit Nm including a negative lens LNm with the strongest negative refractive power of the negative lenses in the plurality of lens units and fLNm is a focal length of the negative lens LNm.

15. The zoom lens according to claim 1, wherein the zoom lens satisfies the following inequality:

$$1.55 < ndNmav < 1.90,$$

where ndNmav denotes an average value of refractive indices regarding d-line of all of the lenses included in a lens unit Nm including a negative lens with the strongest negative refractive power of the negative lenses in the plurality of lens units.

16. The zoom lens according to claim 1, wherein the zoom lens satisfies the following inequality:

$$-40.0 < vdNmpav - vdNmnav < -5.0,$$

where vdNmpav denotes an average value of Abbe numbers regarding d-line of all of the lenses with positive refractive power included in a lens unit Nm including a negative lens with the strongest negative refractive power of the negative lenses in the plurality of lens units and vdNmnav denotes an average value of Abbe numbers regarding d-line of all of the lenses with negative refractive power included in the lens unit Nm.

17. The zoom lens according to claim 1, wherein the zoom lens satisfies the following inequality:

$$-0.050 < \theta CtNmpav - \theta CtNmnav < 0.040,$$

where θCtNmpav denotes an average value of partial dispersion ratios regarding C-line and t-line of all of the lenses with positive refractive power included in a lens unit Nm including a negative lens with the strongest negative refractive power of the negative lenses in the plurality of lens units and θCtNmnav denotes an average value of partial dispersion ratios regarding C-line and t-line of all of the lenses with negative refractive power included in the lens unit Nm.

18. The zoom lens according to claim 1, wherein the zoom lens satisfies the following inequality:

$$-0.030 < \theta Ct1pav - \theta Ct1nav < 0.030,$$

where θCt1pav denotes an average value of partial dispersion ratios regarding C-line and t-line of all of the lenses with positive refractive power included in the first lens unit and Ct1nav denotes an average value of partial dispersion ratios regarding C-line and t-line of all of the lenses with negative refractive power included in the first lens unit.

19. The zoom lens according to claim 1, further comprising, on the image side of the plurality of lens units, a rear lens unit which does not move for zooming.

20. An image pickup apparatus comprising:

the zoom lens according to claim 1; and an image sensor configured to pick up an image formed by the zoom lens.

\*   \*   \*   \*   \*